United States Patent
Dulski et al.

(10) Patent No.: US 12,073,616 B2
(45) Date of Patent: Aug. 27, 2024

(54) SYSTEM FOR INTEGRATED DEVICE CONNECTIVITY AND AGILE DEVICE CONTROL FOR DYNAMIC OBJECT TRACKING AND MANAGEMENT

(71) Applicant: ELECTROLUX HOME PRODUCTS, INC., Charlotte, NC (US)

(72) Inventors: Sara Dulski, Huntersville, NC (US); Brian Roderman, Plano, TX (US); David Singer, Austin, TX (US); Jason Gossiaux, Austin, TX (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 619 days.

(21) Appl. No.: 17/295,708

(22) PCT Filed: Nov. 20, 2019

(86) PCT No.: PCT/US2019/062444
§ 371 (c)(1),
(2) Date: May 20, 2021

(87) PCT Pub. No.: WO2020/106863
PCT Pub. Date: May 28, 2020

(65) Prior Publication Data
US 2021/0406545 A1 Dec. 30, 2021

Related U.S. Application Data

(60) Provisional application No. 62/770,014, filed on Nov. 20, 2018.

(51) Int. Cl.
*G06V 20/20* (2022.01)
*G06Q 30/0601* (2023.01)
(Continued)

(52) U.S. Cl.
CPC ......... *G06V 20/20* (2022.01); *G06Q 30/0633* (2013.01); *G06V 30/2247* (2022.01);
(Continued)

(58) Field of Classification Search
CPC .............. G06V 20/20; G06V 30/2247; G06Q 30/0633; H04L 12/2816; H04L 12/2829; H04L 2012/285
See application file for complete search history.

(56) References Cited

U.S. PATENT DOCUMENTS

| 6,668,240 B2 | 12/2003 | Singh et al. |
| 6,811,516 B1 | 11/2004 | Dugan |

(Continued)

FOREIGN PATENT DOCUMENTS

| EP | 3021269 A1 | 5/2016 |
| WO | 2018068754 A1 | 4/2018 |

OTHER PUBLICATIONS

Electrolux Home Products, Inc., European Patent Application No. 19817558.0, Communication pursuant to Article 94(3) EPC, Jun. 12, 2023.
(Continued)

*Primary Examiner* — Sumati Lefkowitz
*Assistant Examiner* — Michael Adam Shariff
(74) *Attorney, Agent, or Firm* — Moore & Van Allen PLLC; Vaidehi Bachoti

(57) ABSTRACT

Embodiments of the invention are directed to systems, methods, and computer program products for integrated device connectivity and agile device control for dynamic object tracking and management. In this regard, embodiments of the invention provide provides a comprehensive integrated platform for dynamic inventory construction and tracking, dynamic food item identification, expiration tracking, dynamic inventory construction, recipe generation,
(Continued)

interactive meal planning and guided cooking, in real-time. The system is also configured for establishing operative communication with a plurality of auxiliary devices for achieving the foregoing. The system may initiate a presentation of parameters identified by the auxiliary devices on a user interface associated with a user device.

19 Claims, 39 Drawing Sheets

(51) Int. Cl.
    *G06V 30/224*     (2022.01)
    *H04L 12/28*     (2006.01)

(52) U.S. Cl.
    CPC ...... *H04L 12/2816* (2013.01); *H04L 12/2829* (2013.01); *H04L 2012/285* (2013.01)

(56) References Cited

U.S. PATENT DOCUMENTS

| | | | |
|---|---|---|---|
| 6,919,795 B2 | 7/2005 | Roseen |
| 6,950,095 B2 | 9/2005 | Kim et al. |
| 6,982,640 B2 | 1/2006 | Lindsay et al. |
| 7,027,958 B2 | 4/2006 | Singh et al. |
| 7,117,051 B2 | 10/2006 | Andry et al. |
| 7,135,982 B2 | 11/2006 | Lee |
| 7,212,955 B2 | 5/2007 | Kirshenbau et al. |
| 7,278,569 B2 | 10/2007 | Cohen et al. |
| 7,292,146 B1 | 11/2007 | Nguyen |
| 7,295,099 B2 | 11/2007 | Lee et al. |
| 7,340,414 B2 | 3/2008 | Roh et al. |
| 7,372,003 B2 | 5/2008 | Kates |
| 7,413,438 B2 | 8/2008 | Bisogno |
| 7,495,558 B2 | 2/2009 | Pope et al. |
| 7,673,464 B2 | 3/2010 | Bodin et al. |
| 7,730,223 B1 | 6/2010 | Bavor et al. |
| 7,764,183 B2 | 7/2010 | Burchell et al. |
| 7,775,056 B2 | 8/2010 | Lowenstein |
| 7,784,689 B2 | 8/2010 | Linton et al. |
| 7,907,054 B1 | 3/2011 | Nguyen |
| 7,917,661 B2 | 3/2011 | Bavor et al. |
| 7,971,450 B2 | 7/2011 | Furlanetto et al. |
| 8,032,430 B2 | 10/2011 | Bodin et al. |
| 8,130,102 B1 | 3/2012 | Nguyen |
| 8,200,548 B2 | 6/2012 | Wiedl |
| 8,248,252 B2 | 8/2012 | Schechter et al. |
| 8,335,796 B2 | 12/2012 | Maeda et al. |
| 8,463,618 B2 | 6/2013 | Schwarzberg et al. |
| 8,490,862 B1 | 7/2013 | Minvielle |
| 8,504,196 B2 | 8/2013 | Wiles |
| 8,516,087 B2 | 8/2013 | Wilson et al. |
| 8,525,665 B1 | 9/2013 | Trundle et al. |
| 8,547,226 B2 | 10/2013 | Schechter et al. |
| 8,599,012 B2 | 12/2013 | Schechter et al. |
| 8,629,753 B2 | 1/2014 | Yum et al. |
| 8,631,063 B2 | 1/2014 | Helal et al. |
| 8,653,949 B2 | 2/2014 | Lee et al. |
| 8,668,140 B2 | 3/2014 | Minvielle |
| 8,706,525 B2 | 4/2014 | Schwarzberg et al. |
| 8,756,122 B2 | 6/2014 | Lowenstein |
| 8,756,942 B2 | 6/2014 | Min et al. |
| 8,768,727 B2 | 7/2014 | Schwarzberg et al. |
| 8,770,983 B2 | 7/2014 | Batsikouras |
| 8,918,355 B2 | 12/2014 | Perrier et al. |
| 8,969,744 B2 | 3/2015 | He |
| 8,976,029 B1 | 3/2015 | Mctigue |
| 8,992,225 B2 | 3/2015 | Do et al. |
| 9,013,273 B2 | 4/2015 | Oh et al. |
| 9,024,716 B2 | 5/2015 | Yum et al. |
| 9,074,806 B2 | 7/2015 | Cheon et al. |
| 9,109,943 B2 | 8/2015 | Mager et al. |
| 9,129,302 B2 | 9/2015 | Glassman et al. |
| 9,165,320 B1 | 10/2015 | Belvin |
| 9,195,960 B2 | 11/2015 | Kim |
| 9,208,520 B2 | 12/2015 | Brown |
| 9,225,766 B2 | 12/2015 | Philip et al. |
| 9,251,455 B2 | 2/2016 | Lin et al. |
| 9,275,393 B2 | 3/2016 | Argue et al. |
| 9,279,611 B2 | 3/2016 | Tan et al. |
| 9,292,565 B2 | 3/2016 | Bhagwan et al. |
| 9,349,297 B1 | 5/2016 | Ortiz et al. |
| 9,364,106 B1 | 6/2016 | Ortiz |
| 9,373,164 B2 | 6/2016 | Lee et al. |
| 9,389,117 B2 | 7/2016 | Merea |
| 9,412,086 B2 | 8/2016 | Morse et al. |
| 9,436,377 B2 | 9/2016 | Hyun et al. |
| 9,449,208 B2 | 9/2016 | Luk et al. |
| 9,460,606 B2 | 10/2016 | Loomis |
| 9,477,962 B2 | 10/2016 | Worrall et al. |
| 9,495,360 B2 | 11/2016 | Bhatt et al. |
| 9,503,635 B2 | 11/2016 | Ryu et al. |
| 9,519,694 B2 | 12/2016 | Kamei et al. |
| 9,547,851 B2 | 1/2017 | Brown |
| 9,557,224 B2 | 1/2017 | Eisenstadt et al. |
| RE46,326 E | 2/2017 | Dearing et al. |
| 9,576,034 B2 | 2/2017 | Kamei et al. |
| 9,639,823 B2 | 5/2017 | Park et al. |
| 9,645,007 B2 | 5/2017 | Wallace et al. |
| 9,661,279 B2 | 5/2017 | Lee et al. |
| 9,687,150 B2 | 6/2017 | Matarazzi et al. |
| 9,691,114 B2 | 6/2017 | Ashrafzadeh et al. |
| 9,739,526 B2 | 7/2017 | Kim et al. |
| 9,719,720 B2 | 8/2017 | Seo et al. |
| 9,728,098 B2 | 8/2017 | Sabourian-Tarwe |
| 9,733,012 B2 | 8/2017 | Manning et al. |
| 9,734,182 B2 | 8/2017 | Bhatt et al. |
| 9,740,998 B2 | 8/2017 | Cartwright et al. |
| 9,752,810 B1 | 9/2017 | Jacobson et al. |
| 9,754,508 B2 | 9/2017 | Shahar et al. |
| 9,760,856 B2 | 9/2017 | Chouhan et al. |
| 9,784,497 B2 | 10/2017 | Wang et al. |
| 9,829,243 B2 | 11/2017 | Ryu et al. |
| 9,832,821 B2 | 11/2017 | Unagami et al. |
| 9,842,362 B2 | 12/2017 | Kim et al. |
| 9,860,491 B2 | 1/2018 | Park et al. |
| 9,892,656 B2 | 2/2018 | Ortiz et al. |
| 9,909,801 B2 | 3/2018 | Cheon et al. |
| 9,920,981 B2 | 3/2018 | Kim et al. |
| 9,920,982 B2 | 3/2018 | Kim et al. |
| 9,922,307 B2 | 3/2018 | Hyde et al. |
| 9,922,530 B2 | 3/2018 | Wu et al. |
| 9,924,140 B2 | 3/2018 | Izawa et al. |
| 9,946,904 B2 | 4/2018 | Burchell et al. |
| 9,972,284 B2 | 5/2018 | Lee et al. |
| 10,018,402 B2 | 7/2018 | Sumihiro et al. |
| 10,036,587 B2 | 7/2018 | Kim et al. |
| 10,049,242 B2 | 8/2018 | Oono et al. |
| 10,054,478 B2 | 8/2018 | Kao |
| 10,059,581 B2 | 8/2018 | Peters et al. |
| 10,157,308 B2 | 12/2018 | Ebrom et al. |
| 2008/0052201 A1 | 2/2008 | Bodin et al. |
| 2012/0101876 A1 | 4/2012 | Turvey et al. |
| 2012/0263107 A1 | 10/2012 | Taghavi Nasrabadi et al. |
| 2013/0138656 A1 | 5/2013 | Wheaton |
| 2016/0140870 A1 | 5/2016 | Connor |
| 2016/0252390 A1 | 9/2016 | Batsikouras |
| 2016/0358121 A1 | 12/2016 | Knobel |
| 2017/0011649 A1* | 1/2017 | Lee ..................... G09B 5/06 |
| 2017/0063566 A1 | 3/2017 | Seminario et al. |
| 2017/0213184 A1* | 7/2017 | Lee ..................... G06K 7/1443 |
| 2017/0316489 A1* | 11/2017 | Sampara ............ G06Q 30/0631 |
| 2018/0137462 A1 | 5/2018 | Zohar et al. |
| 2018/0278694 A1 | 9/2018 | Binder et al. |

OTHER PUBLICATIONS

Electrolux Home Products, Inc., International Patent Application No. PCT/US2019/062444, International Search Report and Written Opinion, Feb. 19, 2020.

(56) References Cited

OTHER PUBLICATIONS

Electrolux Home Products, Inc., International Patent Application No. PCT/US2019/062444, International Preliminary Report on Patentability, Jun. 3, 2021.

* cited by examiner

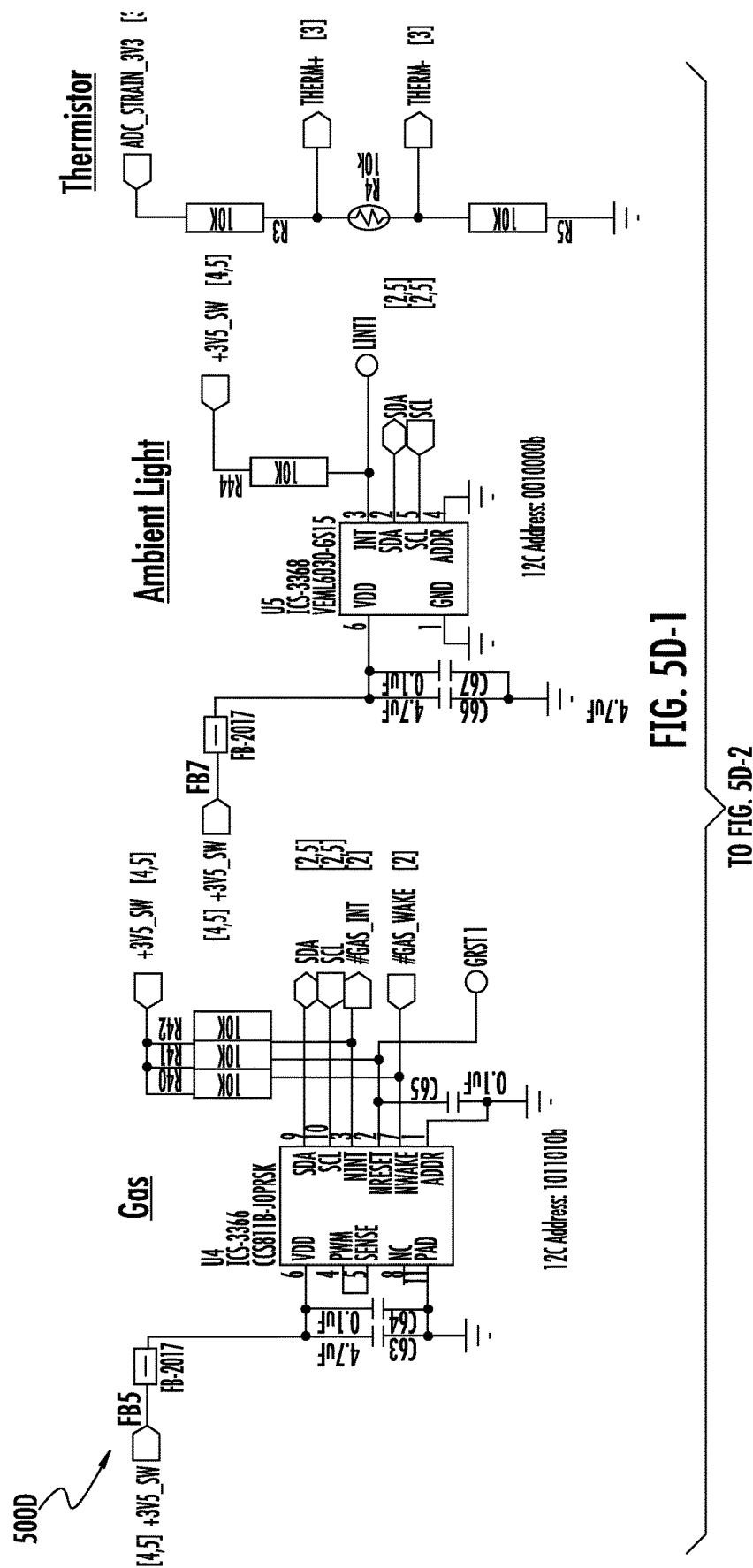

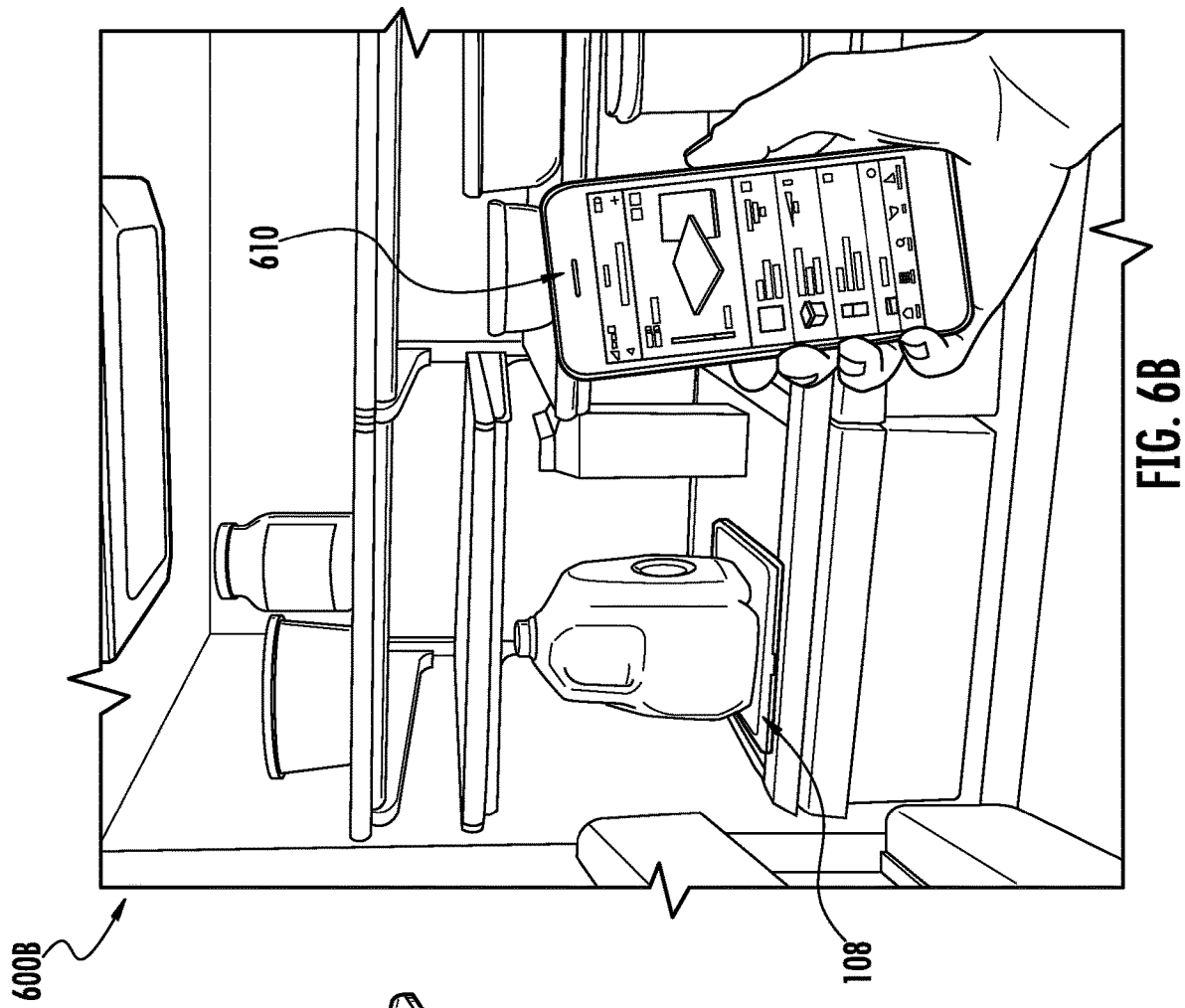
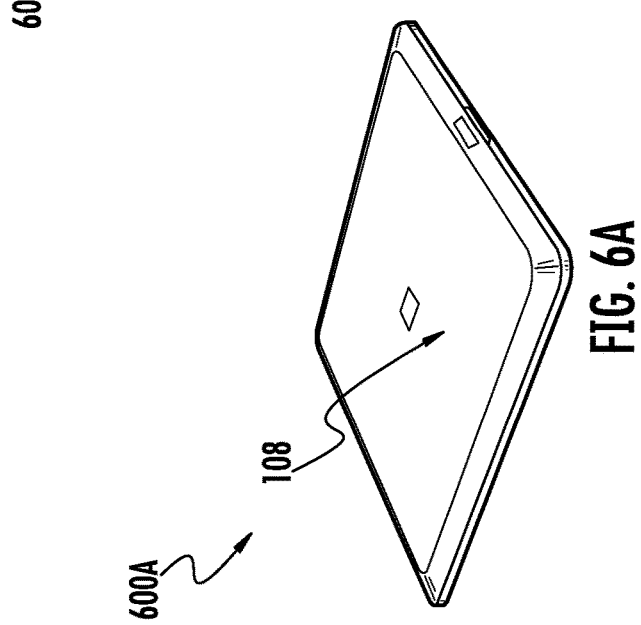
FIG. 6A
FIG. 6B

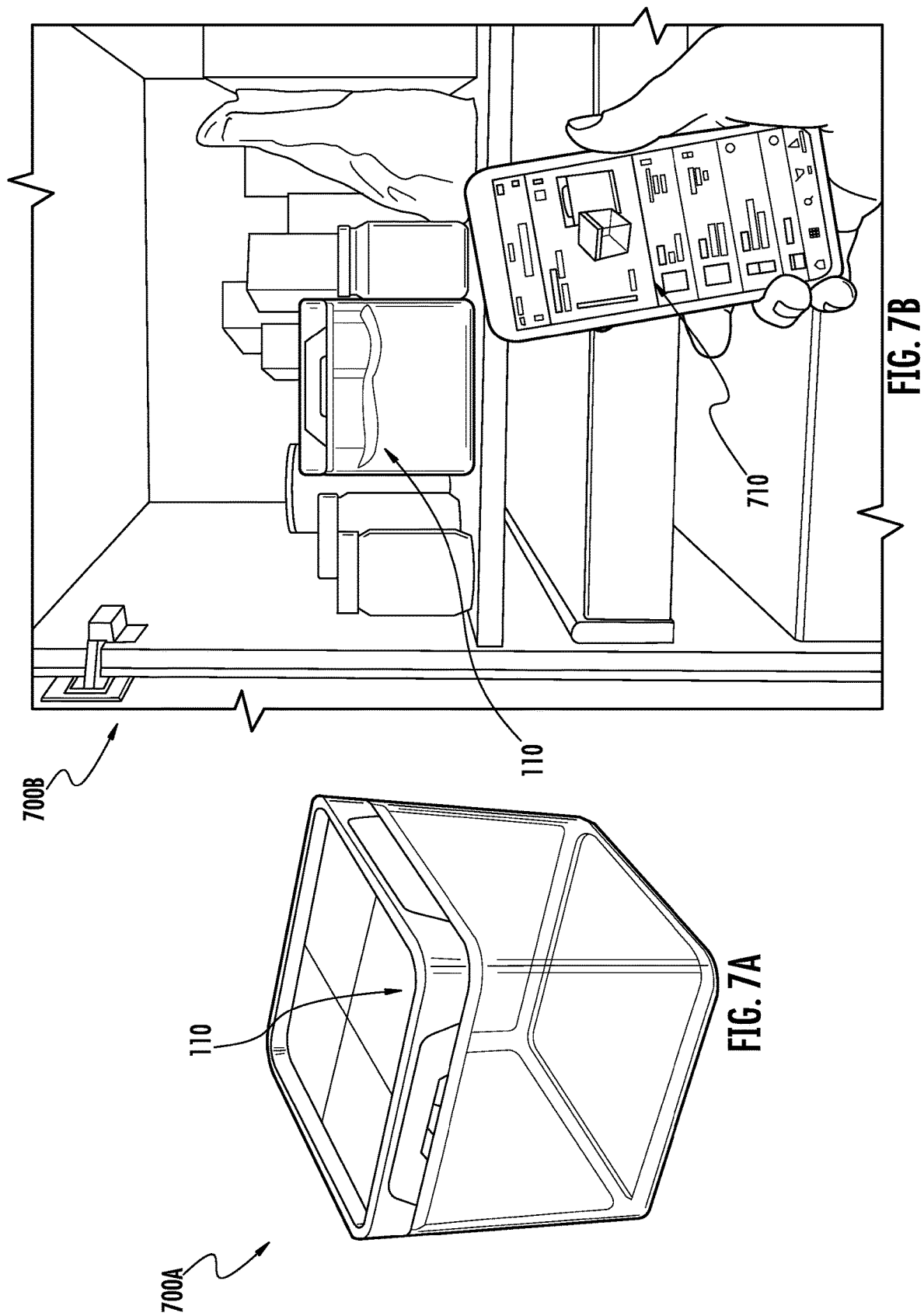

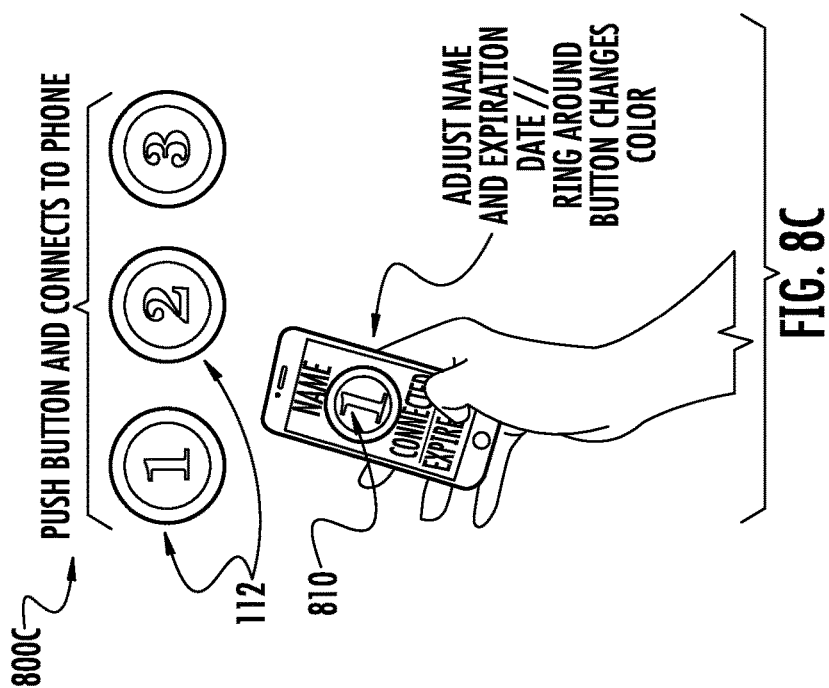
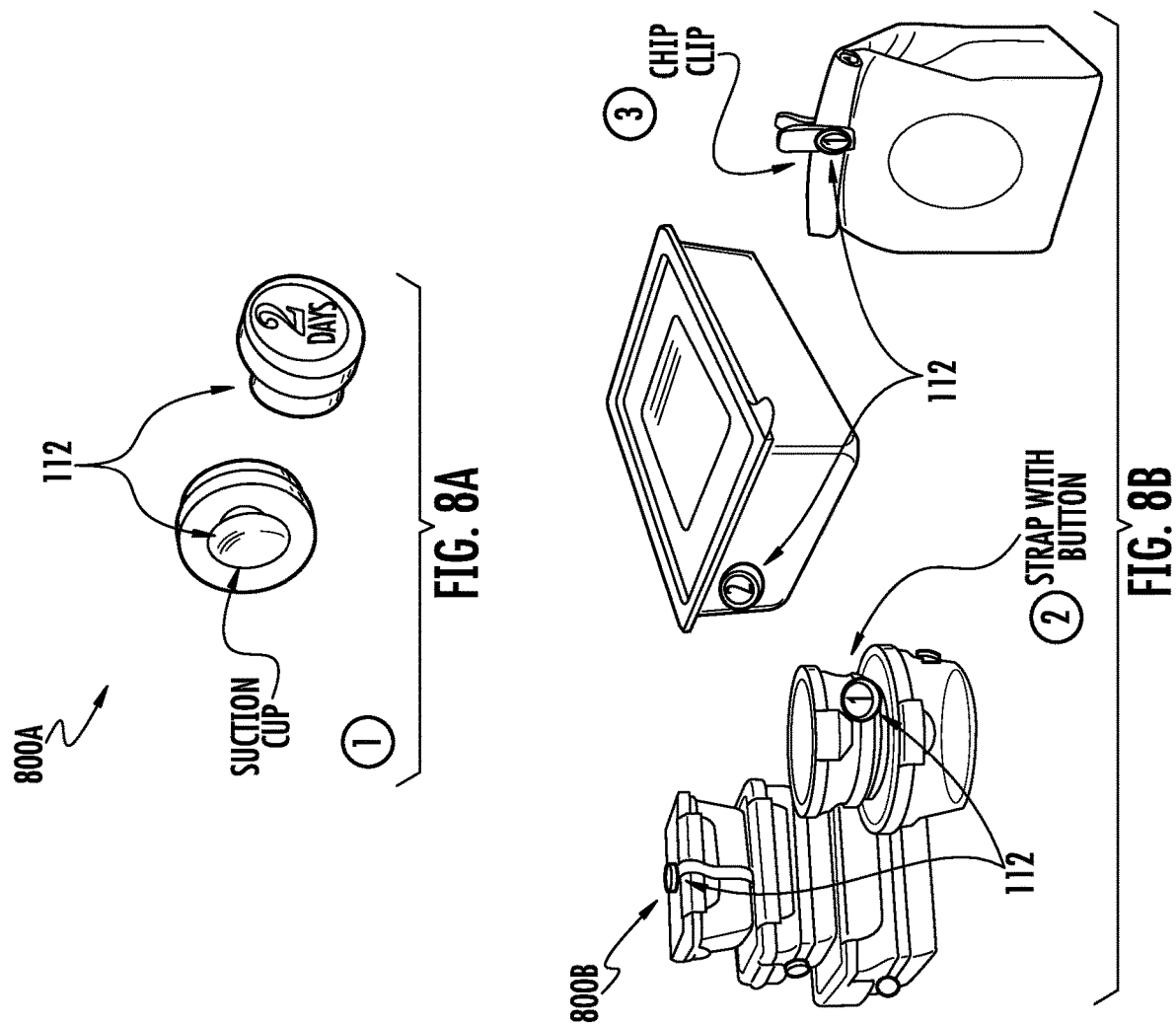

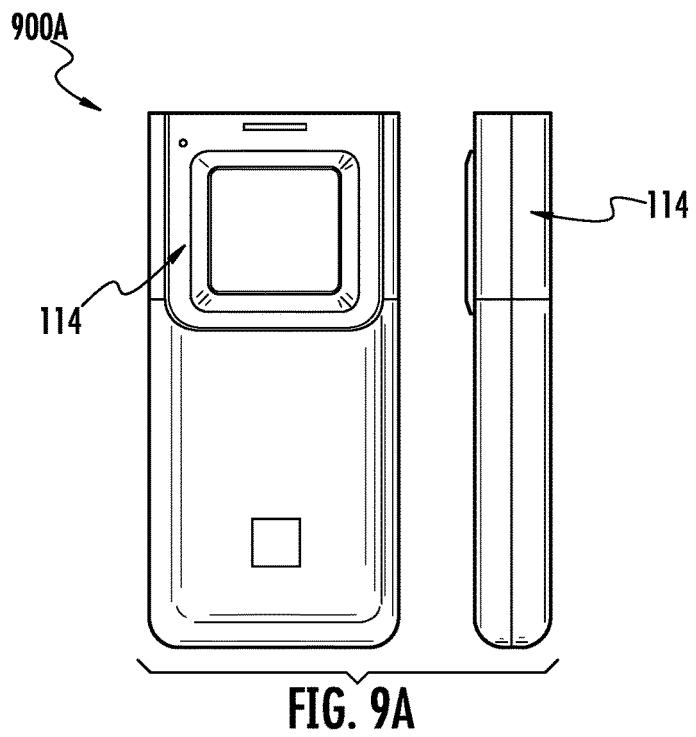
FIG. 9A
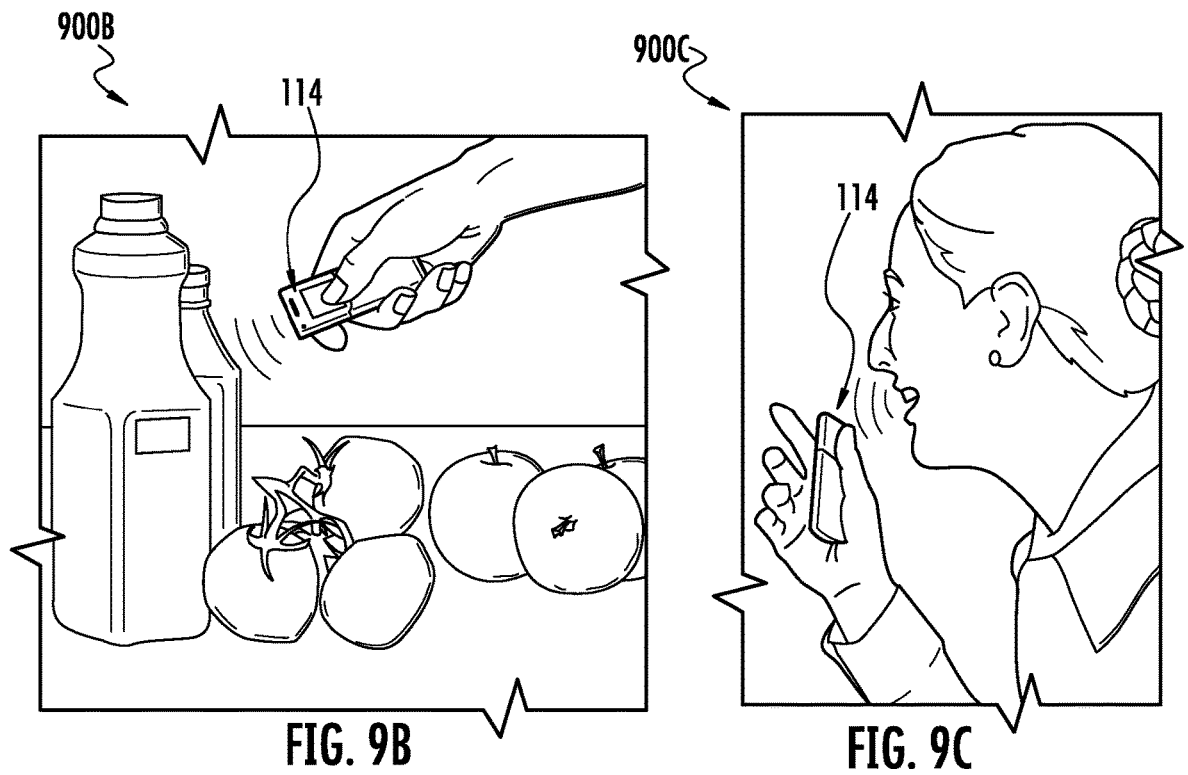
FIG. 9B
FIG. 9C

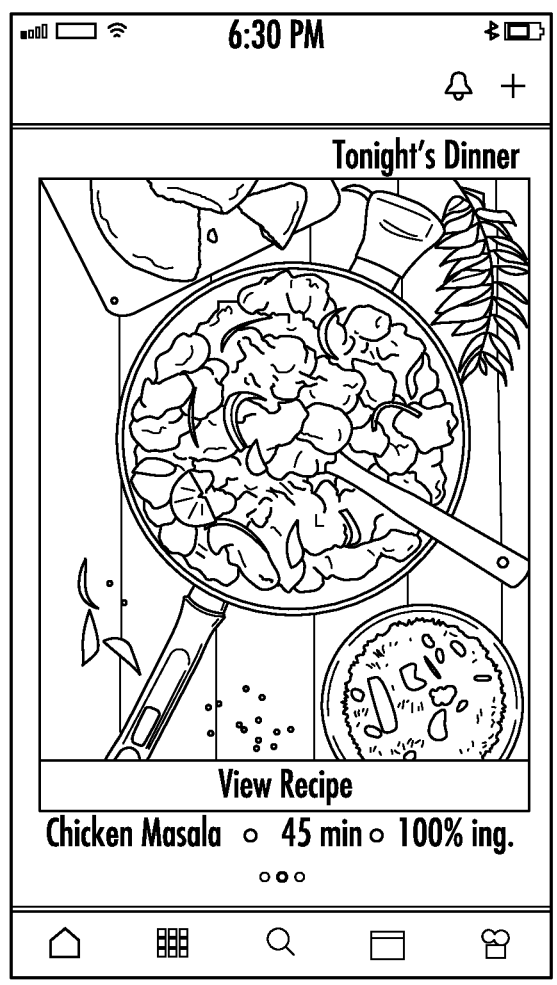
1500B
 HOME
Browse Recipes & Preview the Week
 STOCK
Custom Inventory & Grocery List
 SEARCH
Easily find anything in the App
 CALENDAR
Plan recipes & meals with Family & Friends
 MY KITCHEN
Personal Recipes & SMART Products
FIG. 15B

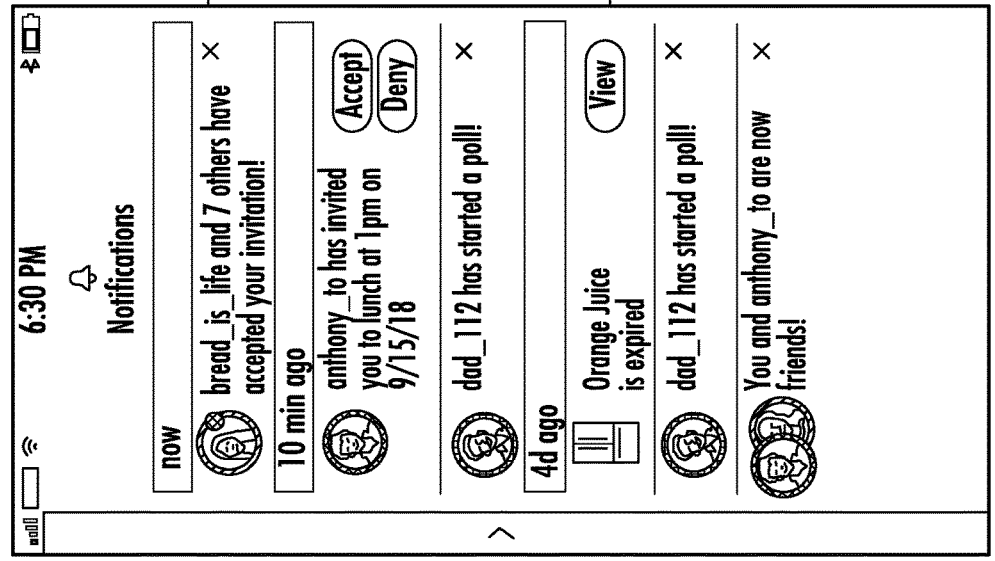
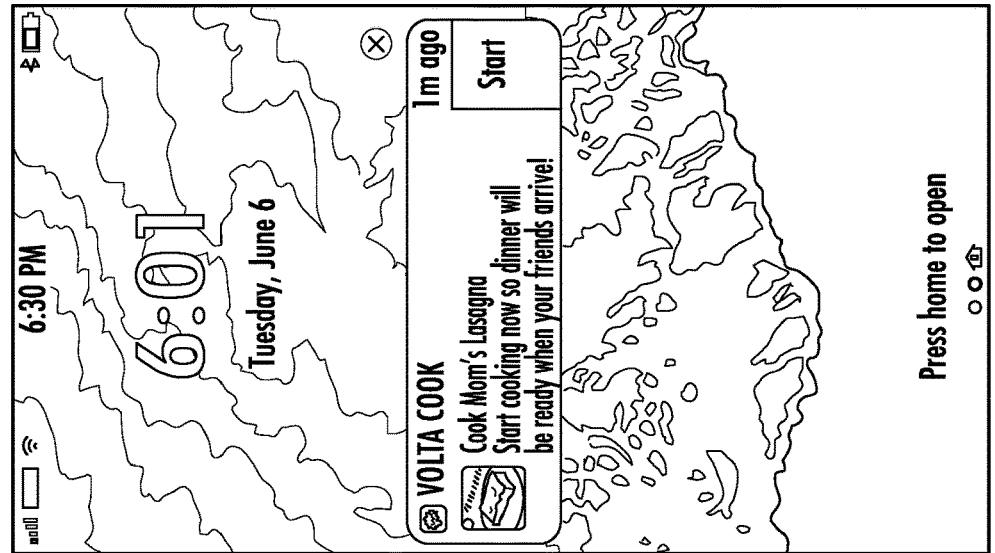
FIG. 23

SYSTEM FOR INTEGRATED DEVICE CONNECTIVITY AND AGILE DEVICE CONTROL FOR DYNAMIC OBJECT TRACKING AND MANAGEMENT

CROSS-REFERENCE TO PRIORITY APPLICATIONS

This application is a National Stage Application (filed under 35 § U.S.C. 371) of PCT/US2019/062444, filed Nov. 20, 2019 of the same title, which, in turn, claims priority to and the benefit of U.S. Provisional Patent Application Ser. No. 62/770,014 entitled "System for Integrated Device Connectivity and Agile Device Control for Dynamic Object Tracking and Management" filed on Nov. 20, 2018, the contents of each of which are hereby incorporated by reference in their entirety.

FIELD

The present invention relates to centralized control of devices in a local network of a user in order for dynamic object tracking and management.

BACKGROUND

Typically, identifying addition and consumption of objects such as food items, perishables, and other products, as well as tracking and updating an inventory of the objects is onerous and time intensive. Moreover, a current inventory of the objects, such as perishables or food items in particular, is essential for determining their fitness for consumption, use in meals, and available quantities and combinations. Due to a lack of any comprehensive system that is configured for identifying addition and consumption of objects as well as tracking and updating an inventory of the objects configured, about 40% of food is wasted in the United States every year, e.g., due to expiration of food items, over purchasing, etc. The average American household throws away $2,200 of food each year. In addition, 80% of Americans don't know what they're having for dinner by 4:00 pm that same day. As such, there is a need for a comprehensive integrated system for dynamic object tracking and management, especially for food items, as well as dynamic inventory construction and meal planning.

Moreover, because current systems are incapable of proactively monitoring and diagnosing appliance performance and malfunctions, 40% of service repairs are consumer instruct, or labor only. The present invention provides a novel platform having a plurality of devices that are configured for dynamic object identification, analysis, tracking and expiration tracking, dynamic inventory construction and interactive meal planning, as well as monitoring and diagnosis of appliance parameters and functioning.

Typically, identifying addition and consumption of objects such as food items, perishables, and other products, as well as tracking and updating an inventory of the objects is onerous and time intensive. Moreover, a current inventory of the objects, such as perishables or food items in particular, is essential for determining their fitness for consumption, use in meals, and available quantities and combinations. Due to a lack of any comprehensive system that is configured for identifying addition and consumption of objects as well as tracking and updating an inventory of the objects configured, about 40% of food is wasted in the United States every year, e.g., due to expiration of food items, over purchasing, etc. The average American household throws away $2,200 of food each year. In addition, 80% of Americans don't know what they're having for dinner by 4:00 pm that same day. As such, there is a need for a comprehensive integrated system for dynamic object tracking and management, especially for food items, as well as dynamic inventory construction and meal planning.

Moreover, because current systems are incapable of proactively monitoring and diagnosing appliance performance and malfunctions, 40% of service repairs are consumer instruct, or labor only. The present invention provides a novel platform having a plurality of devices that are configured for dynamic object identification, analysis, tracking and expiration tracking, dynamic inventory construction and interactive meal planning, as well as monitoring and diagnosis of appliance parameters and functioning.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for integrated device connectivity and agile device control for dynamic object tracking and management. In this regard, embodiments of the invention provide provides a comprehensive integrated platform for dynamic food item identification, expiration tracking, dynamic inventory construction, recipe generation, interactive meal planning and guided cooking, in real-time. The system is also configured for establishing operative communication with a plurality of auxiliary devices for achieving the foregoing. The system may initiate a presentation of parameters identified by the auxiliary devices on a user interface associated with a user device.

The system typically comprises at least one memory device, at least one communication device in (i) operative communication with a first local communication network via a central network device of the first local communication network, wherein the first local communication network further comprises one or more auxiliary devices, and (ii) operative communication with and connected to a second network, at least one processing device operatively coupled to the at least one memory device and the at least one communication device, a module stored in the at least one memory device comprising executable instructions. Based on executing the executable instructions, the system configured to: establish (i) operative communication, via the second network, with the central network device of first local communication network, and (ii) operative communication, via the central network device of the first local communication network, with the one or more auxiliary devices of the first local communication network. The system is further configured to receive, via the second network, device data from the central network device, wherein the device data comprises one or more parameters sensed by the one or more auxiliary devices of the first local communication network, wherein the device data is transmitted to the central network device by the one or more auxiliary devices of the first local communication network. In response to receiving the device data, the system is further configured to construct a dynamic object inventory based on at least the device data. Here, the dynamic object inventory is associated with one or more objects associated with a user. The system is further configured to generate a first recipe for the user based on the dynamic object inventory such that the dynamic object inventory of the user comprises at least one ingredient item associated with the first recipe. The system is further configured to transmit, via the second network, the generated first recipe to a user device associated with the user for presentation on an integrated object management user application interface of the user device.

In some embodiments, or in combination with the previous embodiment, the system is configured to transmit, via the second network, the received device data to the user device for presentation of the device data on the integrated object management user application interface of the user device.

In some embodiments, or in combination with any of the previous embodiments, constructing the dynamic object inventory further comprises: constructing the dynamic object inventory at a first time, wherein the dynamic object inventory is associated with one or more objects associated with the user at the first time; receiving at a second time after the first time, via the second network, updated device data from the central network device, wherein the updated device data comprises one or more updated parameters sensed by the one or more auxiliary devices; in response to receiving the updated device data at the second time, in real time, modifying the dynamic object inventory based on at least the updated device data such that the dynamic object inventory is associated with one or more objects associated with the user at the second time.

In some embodiments, or in combination with any of the previous embodiments, modifying the dynamic object inventory comprises identifying at least one of (i) addition of a new object to the one or more objects associated with the user, (ii) removal of an object from the one or more objects associated with the user, (iii) use of an object of the one or more objects by the user, (iv) change in quantity of an object of the one or more objects, and/or (v) change in location of an object of the one or more objects.

In some embodiments, or in combination with any of the previous embodiments, the updated device data is transmitted by the one or more auxiliary devices at the second time (i) automatically and in real time upon identifying a change in the device data, (ii) automatically in response to elapse of a predetermined time interval after the first time, and/or (iii) in response to receipt of a request for updated device data.

In some embodiments, or in combination with any of the previous embodiments, constructing the dynamic object inventory further comprises: transmitting, via the second network and the central network device, a control signal to the one or more auxiliary devices requesting the updated device data.

In some embodiments, or in combination with any of the previous embodiments, constructing the dynamic object inventory further comprises: receiving, via the second network, user device data from the user device, wherein the user device data comprises (i) data input by the user at the integrated object management user application interface, (ii) image data captured by a visual capture device of the user device, and/or (iii) data retrieved from a user electronic communication application of the user device. Here, the dynamic object inventory is constructed based on at least the device data and the user device data.

In some embodiments, or in combination with any of the previous embodiments, constructing the dynamic object inventory further comprises: identifying an expiration date associated with each of the one or more objects; and in response to determining that a first object of the one or more objects expires within a predetermined subsequent time interval, in real time, modifying the dynamic object inventory such that the dynamic object inventory indicates that the first object expires within the predetermined subsequent time interval.

In some embodiments, or in combination with any of the previous embodiments, receiving the device data further comprises, receiving first device data from a first auxiliary device of the one or more auxiliary devices, via the second network and central network device. Here, constructing the dynamic object inventory further comprises: determining a first object associated with the first device data from the first auxiliary device; determining a first location associated with the first auxiliary device; and constructing the dynamic object inventory such that the dynamic object inventory associates the first object with the first location.

In some embodiments, or in combination with any of the previous embodiments, the system is further configured to: receive second device data from a second auxiliary device of the one or more auxiliary devices, via the second network and central network device; determine that the second device data is associated with the first object; determine a second location associated with the second auxiliary device; and modify the dynamic object inventory such that the dynamic object inventory associates the first object with the second location.

In some embodiments, or in combination with any of the previous embodiments, receiving the device data further comprises: receiving first device data from a first auxiliary device of the one or more auxiliary devices, via the second network and central network device; and receiving second device data from a second auxiliary device of the one or more auxiliary devices, via the second network and central network device. Here, constructing the dynamic object inventory further comprises: analyzing the first device data to determine that the first device data is associated with a first object of the one or more objects; determining a identifying parameter associated with the first object based on the first device data; analyzing the second device data to determine that the second device data is associated with the first object of the one or more objects; and determining a quantity associated with the first object based on the second device data.

In some embodiments, or in combination with any of the previous embodiments, the one or more auxiliary devices are selected from a group comprising: (i) one or more smart camera devices structured for capturing image data associated with the one or more objects; (ii) one or more smart fob devices structured for capturing ambient temperature data, ambient humidity data, ambient light data and/or ambient volatile organic content data associated with the one or more objects; (iii) one or more connected weight measurement devices structured for capturing weight data associated with the one or more objects; (iv) one or more smart container devices structured for capturing quantity data associated with the one or more objects; (v) one or more smart coin devices structured for tracking expiration data associated with the one or more objects; (vi) one or more smart wand devices structured for reading image item data associated with the one or more objects, wherein image item data comprises spectroscopy data and/or machine-readable optical label data; and (vii) one or more smart countertop devices structured for capturing image data, weight data and quantity data associated with the one or more objects.

In some embodiments, or in combination with any of the previous embodiments, the first local communication network is associated with a sub-gigahertz communication protocol.

In some embodiments, or in combination with any of the previous embodiments, the first local communication network comprises a communication protocol that is different from that of the second network.

In some embodiments, or in combination with any of the previous embodiments, a first auxiliary device and a second auxiliary device of the one or more auxiliary devices are structured to transmit first device data via a first communication channel having a first frequency range. Here, the first auxiliary device is structured to automatically switch to a second communication channel having a second frequency range lower than the first frequency range in response to a trigger condition. Typically, receiving the device data further comprises: receiving the first device data from the first auxiliary device via the second communication channel having the second frequency range; and receiving the second device data from the second auxiliary device via the first communication channel having the first frequency range. Here, the trigger condition comprises (i) lack of receipt of a response signal transmitted by the central network device at the first auxiliary device, and/or (ii) the first auxiliary device being in an enclosed location.

In some embodiments, or in combination with any of the previous embodiments, a first auxiliary device and a second auxiliary device of the one or more auxiliary devices are structured to transmit first device data via a first communication channel having a first frequency range. Typically, the first auxiliary device is structured to automatically switch to a second communication channel having a second frequency range higher than the first frequency range in response to a trigger condition. Here, receiving the device data further comprises: receiving the first device data from the first auxiliary device via the second communication channel having the second frequency range; and receiving the second device data from the second auxiliary device via the first communication channel having the first frequency range. Here, the trigger condition comprises the first device data having a payload size greater than a predetermined threshold.

In some embodiments, or in combination with any of the previous embodiments, generating the first recipe for the user based on the dynamic object inventory further comprises: receiving, via the user device, a user request input associated with determining a recipe for the user; analyzing a first plurality of recipes associated with the user request input, wherein analyzing comprises identifying, for each of the first plurality of recipes, one or more ingredient items; and identifying the first recipe of the first plurality of recipes based on at least determining that at least one object of the one or more objects of the dynamic object inventory matches at least one ingredient item of the one or more ingredient items associated with the first recipe.

In some embodiments, or in combination with any of the previous embodiments, the system is further configured to determine one or more keywords associated with the user request input; and identify the first plurality of recipes from a global plurality of recipes based on determining that the first plurality of recipes are associated with the one or more keywords. Here, the one or more keywords are associated with meal type, preparation time, number of ingredients, type of cuisine, scheduled meal preparation time interval, required ingredient, recipe type, user rating, skill level, recipe nutrition information, and/or user health information.

In some embodiments, or in combination with any of the previous embodiments, the system is further configured to identify the first plurality of recipes from a global plurality of recipes based on determining that the first plurality of recipes are associated with (i) recipes previously prepared by the user, and/or (ii) recipes previously tagged by the user.

In some embodiments, or in combination with any of the previous embodiments, the system is further configured to identify the first plurality of recipes from a global plurality of recipes based on determining that at least a portion of each of the first plurality of recipes matches that of (i) recipes previously prepared by the user, and/or (ii) recipes previously tagged by the user.

In some embodiments, or in combination with any of the previous embodiments, identifying the first recipe of the first plurality of recipes further comprises determining that an expiration date of the at least one object of the one or more objects that matches the at least one ingredient item, does not match a preparation time interval associated with the first recipe.

In some embodiments, or in combination with any of the previous embodiments, the system is further configured to: identify one or more guided cooking steps associated with the first recipe; transmit, via the second network, a first guided cooking step of the one or more guided cooking steps to the user device for presentation on the integrated object management user application interface of the user device; monitoring, via the one or more auxiliary devices and/or the user device, user progress associated with the first guided cooking step; and in response to determining that the first guided cooking step has been completed, transmit, via the second network, a second guided cooking step of the one or more guided cooking steps to the user device for presentation on the integrated object management user application interface of the user device.

In some embodiments, or in combination with any of the previous embodiments, the system is further configured to generate a shopping list comprising a portion of one or more ingredient items of the first recipe that does not match the dynamic object inventory.

Embodiments of the invention are also directed to a method for integrated device connectivity and agile device control for dynamic object tracking and management comprising the steps of: establishing operative communication between a device system of a second network and one or more auxiliary devices of a first local communication network, via a central network device of the first local communication network; capturing, via a sensor device of a first auxiliary device of the one or more auxiliary devices, device data associated with one or more objects associated with a user; transmitting, via the central network device and the second network, the device data to the device system from the first auxiliary device of the one or more auxiliary devices; and receiving, at a user device associated with the user, a first recipe for the user for presentation on an integrated object management user application interface of the user device based on at least the device data associated with one or more objects.

In some embodiments, or in combination with any of the previous embodiments, the method further comprises the steps of: placing the one or more objects within a predetermined capture region associated with the first auxiliary device of the one or more auxiliary devices; transmitting, via the user device to the device system, a user request input associated with determining the first recipe for the user; and displaying a presentation of the first recipe on the integrated object management user application interface of the user device.

In some embodiments, or in combination with any of the previous embodiments, the user request comprises with one or more keywords associated with meal type, preparation time, number of ingredients, type of cuisine, scheduled meal preparation time interval, required ingredient, recipe type, user rating, skill level, recipe nutrition information, historical user recipe preparation information and/or user health information.

In some embodiments, or in combination with any of the previous embodiments, the method further comprises the steps of: selecting a first object of the one or more object associated with the first recipe; and completing the first recipe using the first object of the one or more objects.

In some embodiments, or in combination with any of the previous embodiments, the method further comprises the steps of: displaying a presentation of a first guided cooking step of the one or more guided cooking steps on the integrated object management user application interface of the user device; completing the first guided cooking step of the one or more guided cooking steps; and in response to completing the first guided cooking step, displaying a presentation of a second guided cooking step of the one or more guided cooking steps on the integrated object management user application interface of the user device.

In some embodiments, or in combination with any of the previous embodiments, the method further comprises the steps of: displaying a shopping list comprising a portion of one or more ingredient items of the first recipe that does not match the one or more objects on the integrated object management user application interface of the user device; and providing the portion of one or more ingredient items of the shopping list.

In some embodiments, or in combination with any of the previous embodiments, the method further comprises the steps of: displaying a presentation of the device data on the integrated object management user application interface of the user device.

In some embodiments, or in combination with any of the previous embodiments, the method further comprises the steps of: adding a new object to the predetermined capture region associated with the first auxiliary device of the one or more auxiliary devices, (ii) removing at least one object of the one or more objects from the predetermined capture region associated with the first auxiliary device of the one or more auxiliary devices, (iii) changing a quantity of at least one object of the one or more objects in the predetermined capture region, and/or (iv) changing a location of at least one object of the one or more objects at the predetermined capture region.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
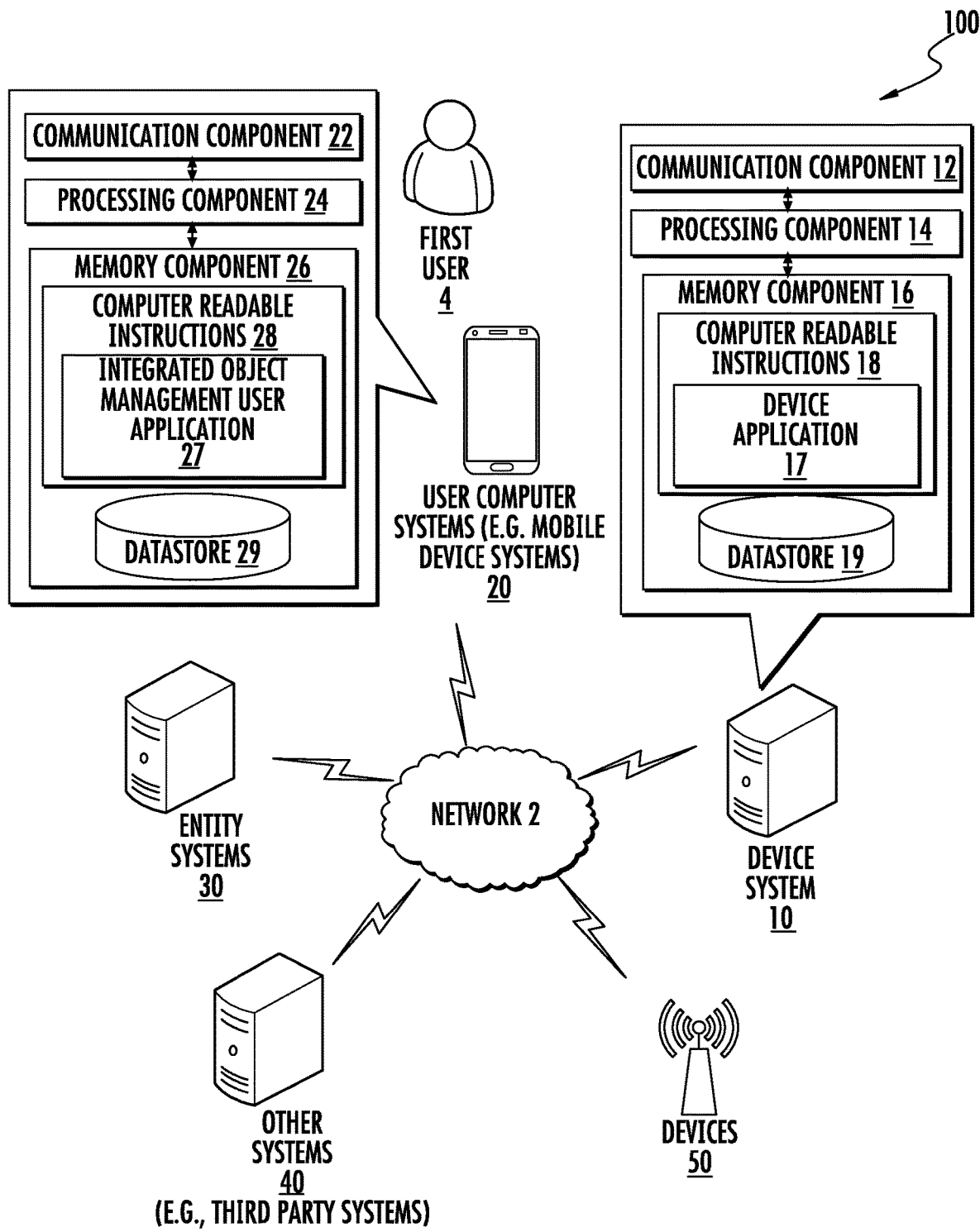

Having thus described embodiments of the invention in general terms, reference will now be made to the accompanying drawings, which are not necessarily drawn to scale, and wherein:

FIG. 1 illustrates a system environment for integrated device connectivity and agile device control for dynamic object tracking and management, in accordance with embodiments of the invention.

Figure 2:
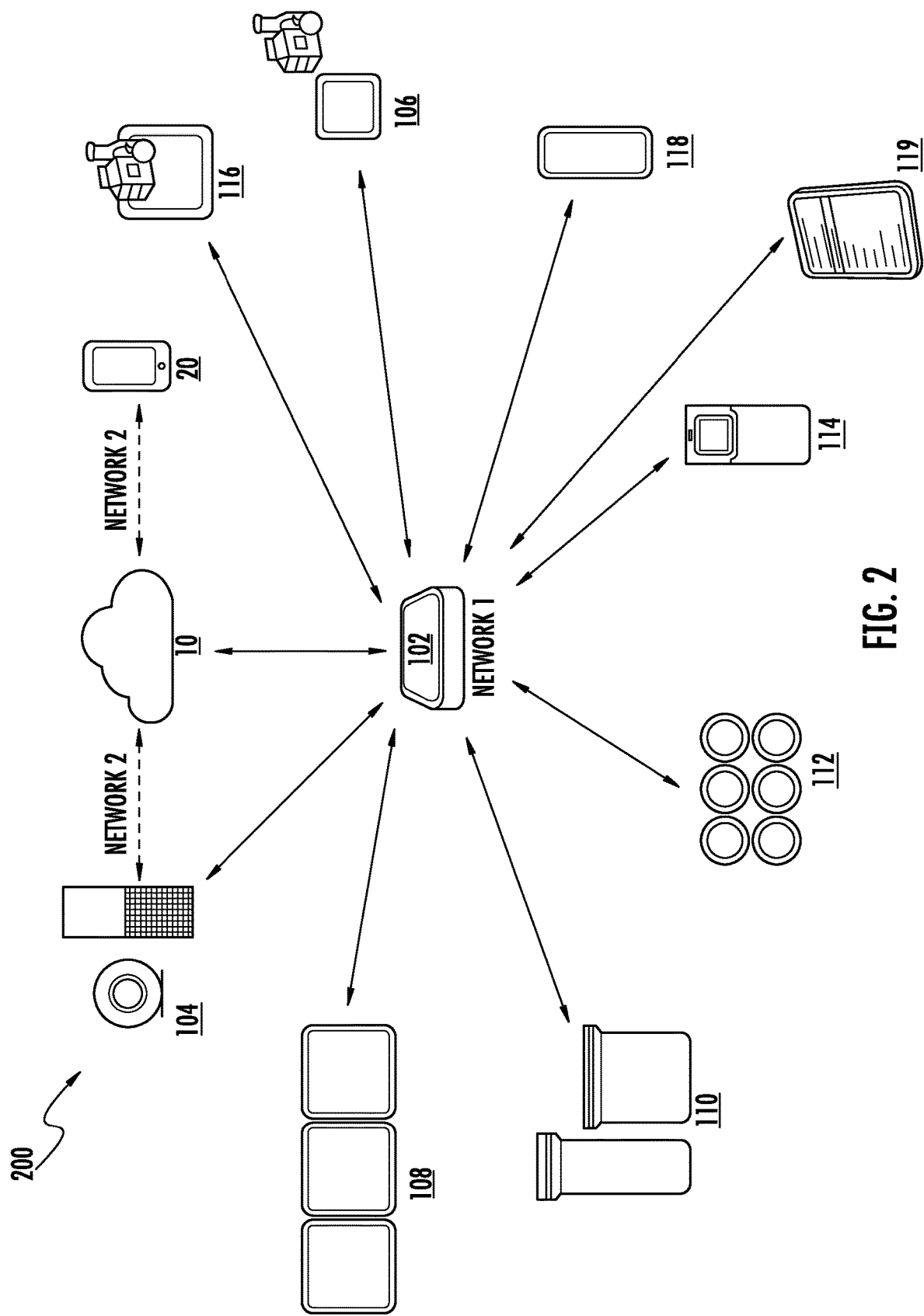

FIG. 2 illustrates a system environment of linked devices associated with network 1, in accordance with embodiments of the invention.

Figure 3B:
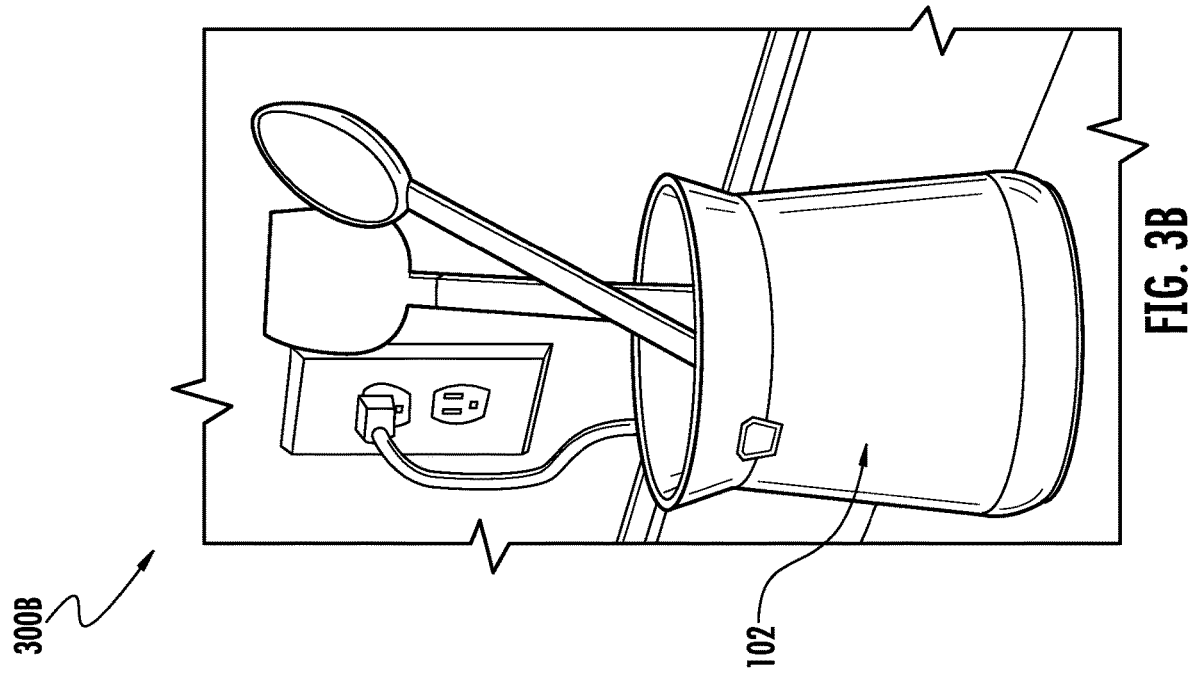
Figure 3A:
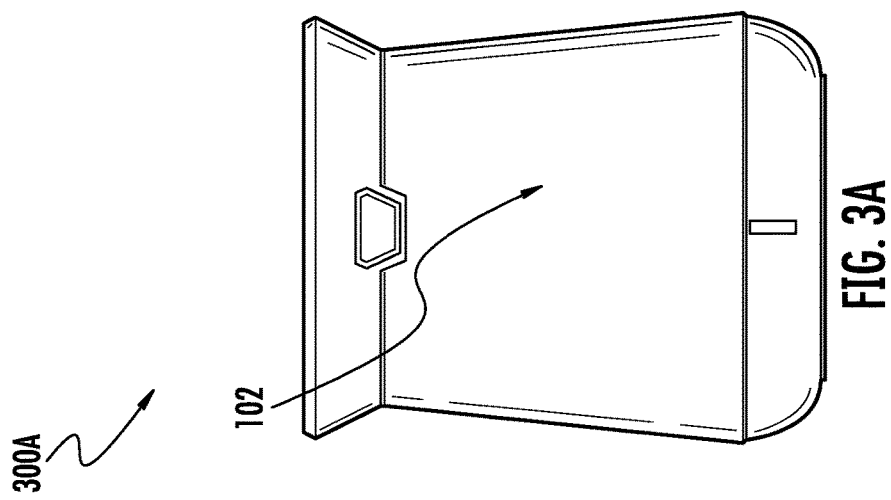

FIGS. 3A and 3B illustrate the central network device, in accordance with some embodiments of the invention. FIGS. 3C-3F illustrate representations of circuit board components of the central network device, in accordance with some embodiments of the invention.

Figure 4:
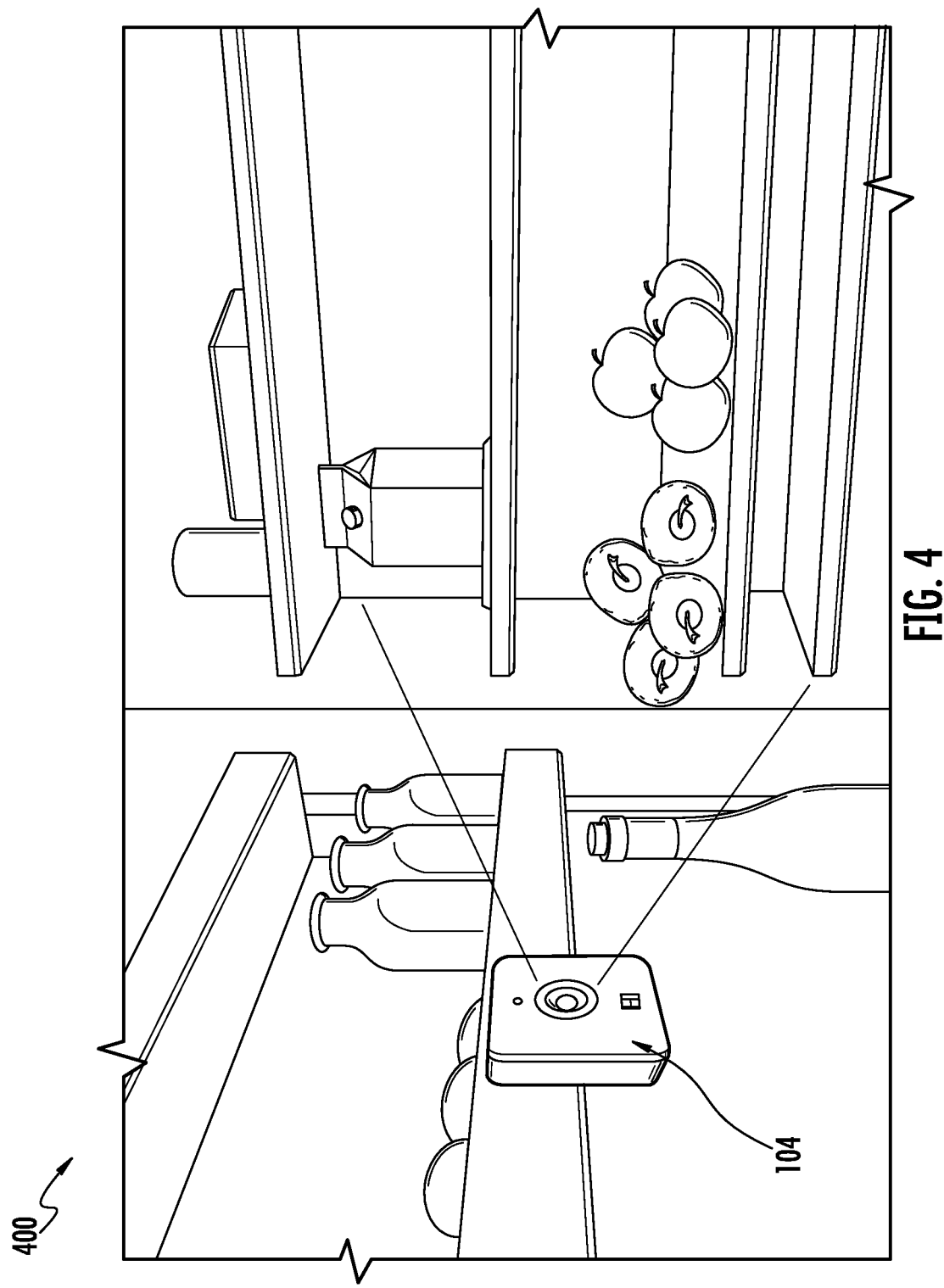

FIG. 4 illustrates a side perspective view of a smart camera device, in use, in accordance with some embodiments of the invention.

Figure 5C:
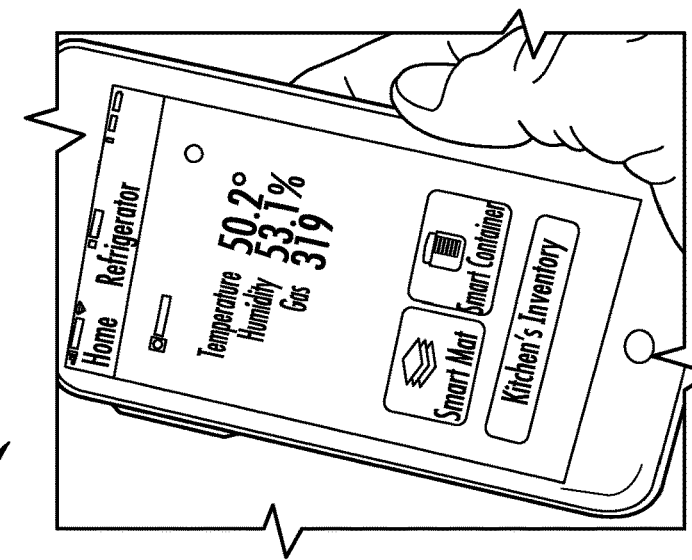
Figure 5B:
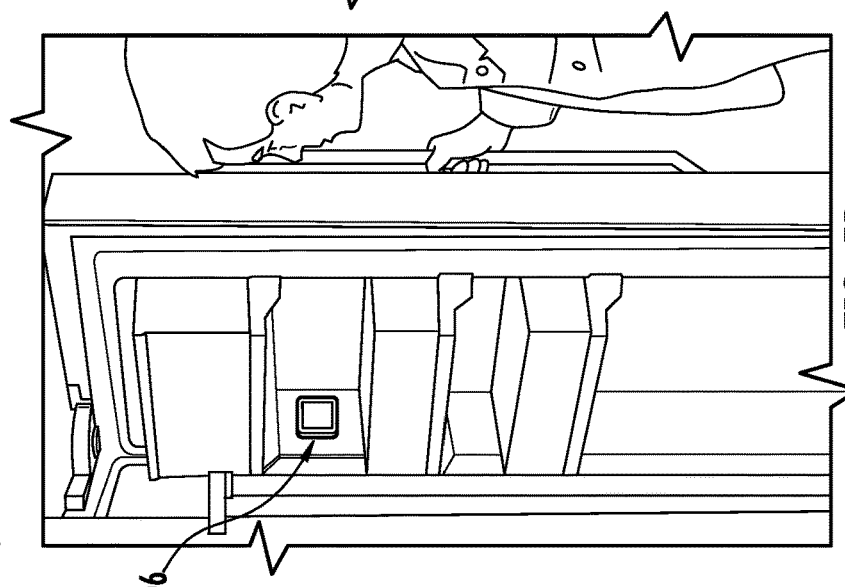
Figure 5A:
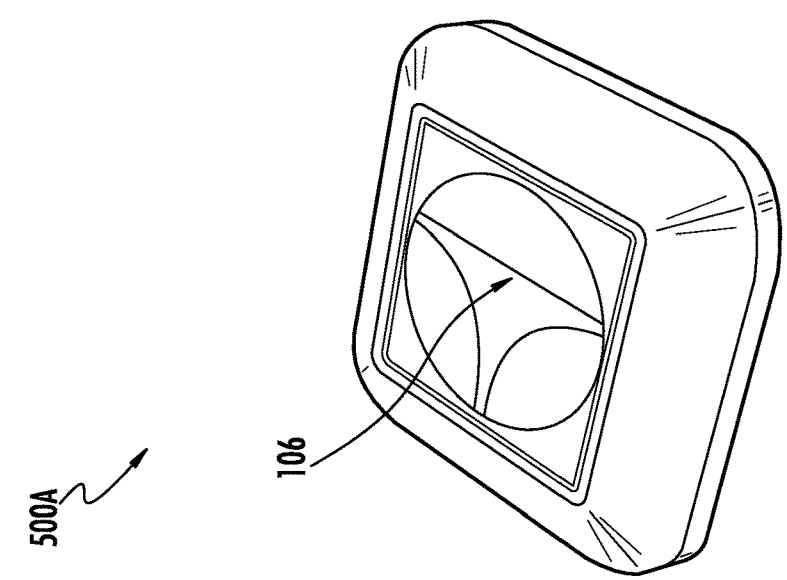

FIGS. 5A and 5B illustrate a smart fob device, in accordance with some embodiments of the invention. FIG. 5C illustrates an interface of the integrated object management user application. FIGS. 5D-5G illustrate representations of circuit board components of the smart fob device, in accordance with some embodiments of the invention.

Figure 6C:
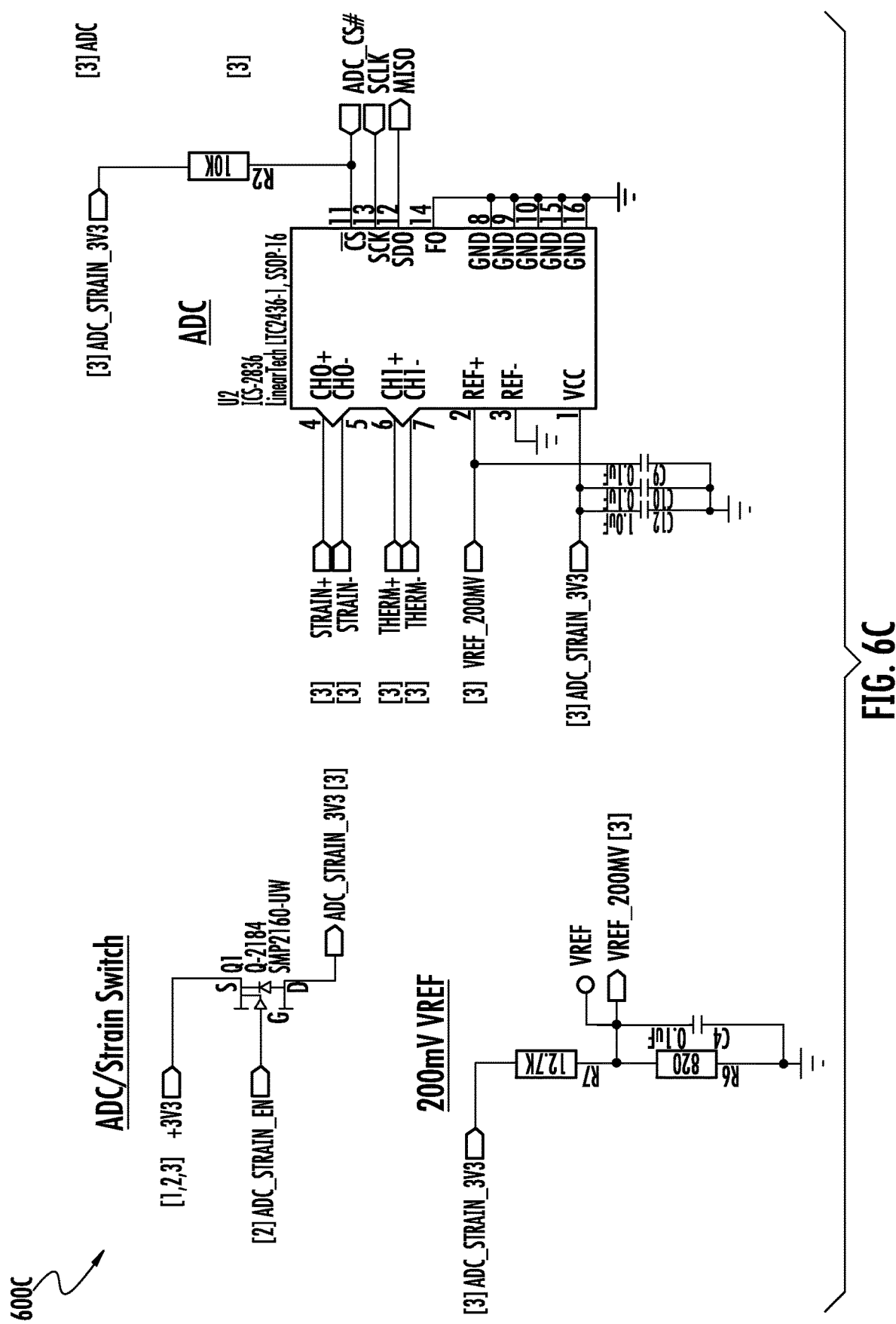

FIGS. 6A and 6B illustrate the connected weight measurement device, in accordance with some embodiments of the invention. FIG. 6C illustrates representations of circuit board components of the connected weight measurement device, in accordance with some embodiments of the invention.

FIGS. 7A and 7B illustrate a smart container device, in accordance with some embodiments of the invention.

FIGS. 8A-8C illustrate smart coin device(s), in accordance with some embodiments of the invention.

FIGS. 9A-9C illustrate a smart wand device, in accordance with some embodiments of the invention.

Figure 10:
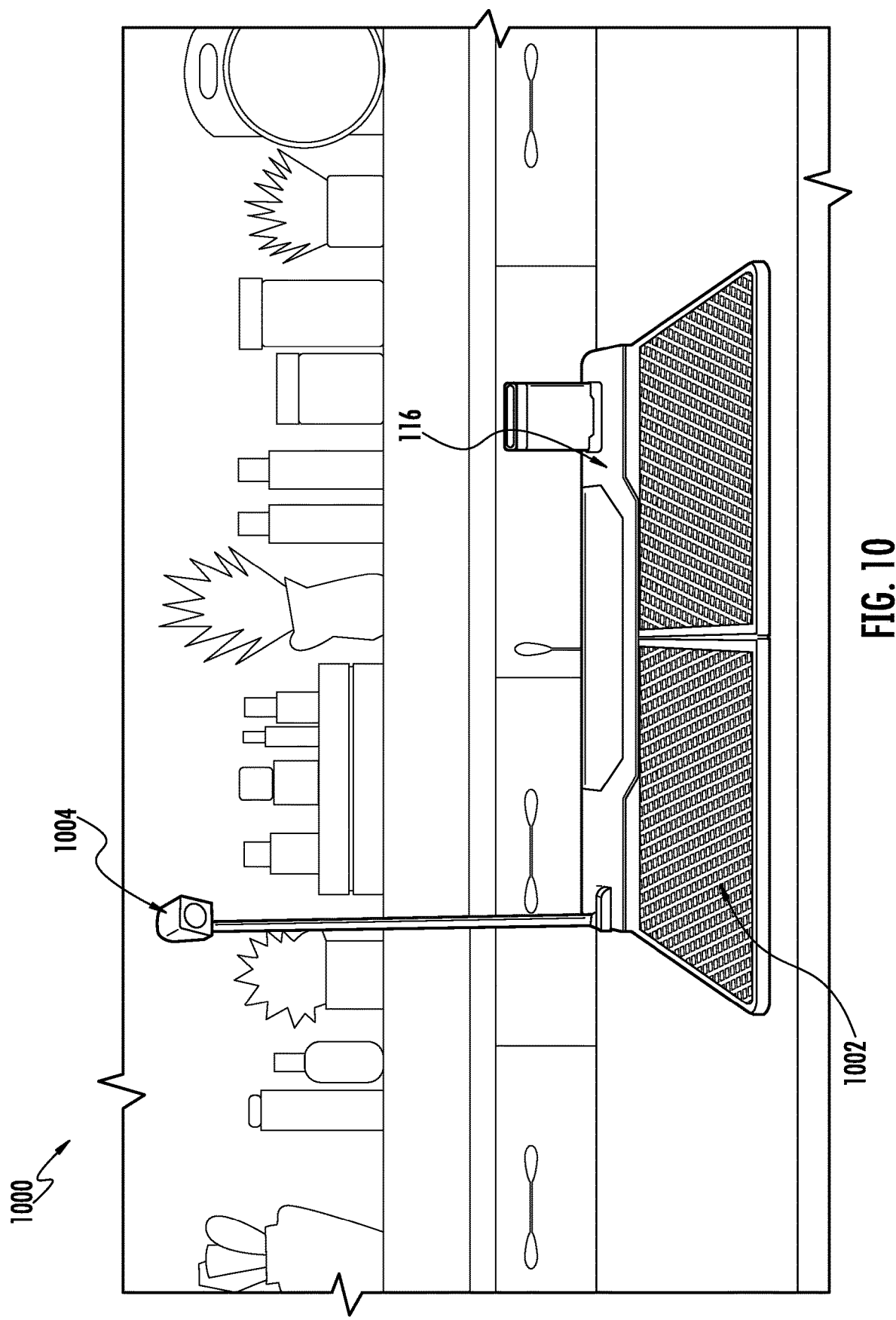

FIG. 10 illustrates a front perspective view of the smart countertop device, in accordance with some embodiments of the invention.

Figure 11:
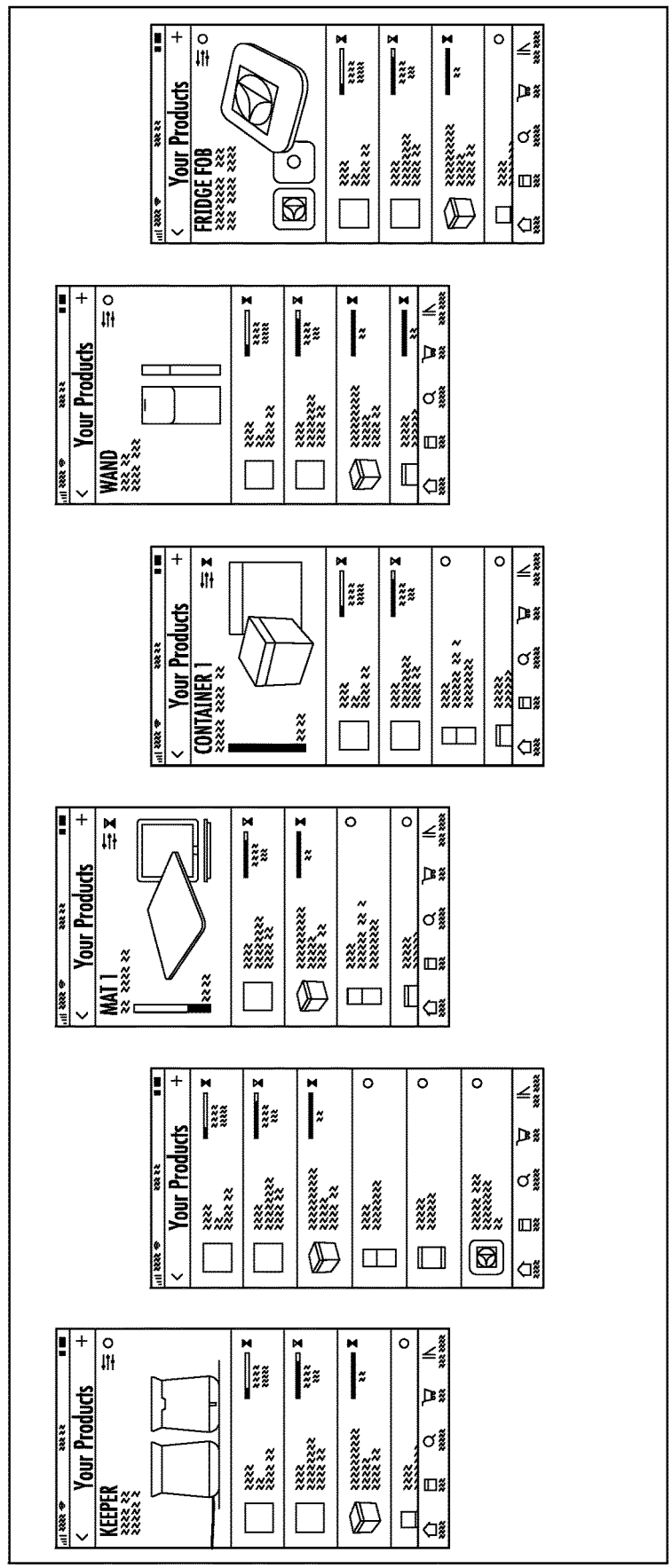

FIG. 11 illustrates interfaces of the integrated object management user application 27 associated with the auxiliary devices, in accordance with some embodiments of the invention.

Figure 12:
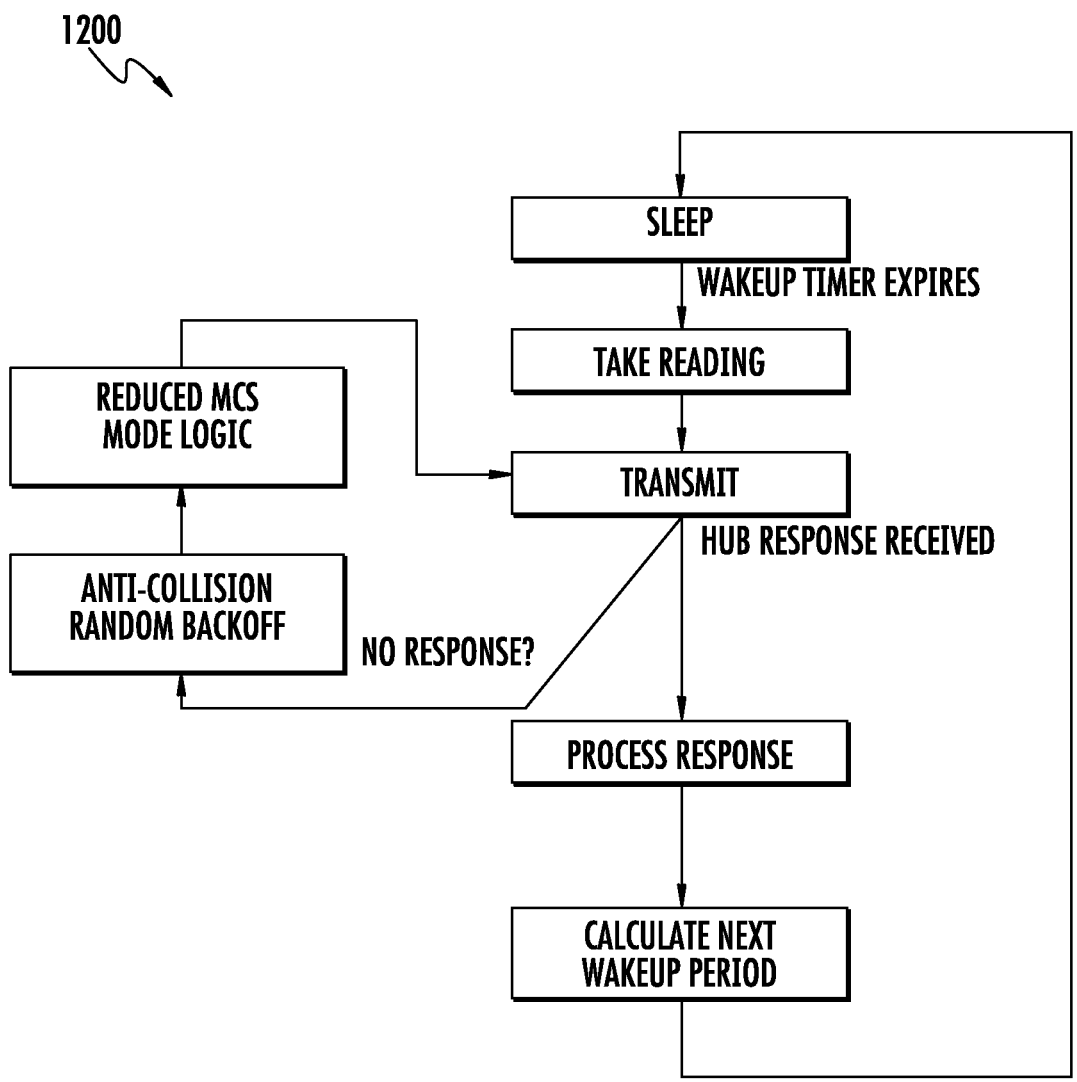

FIG. 12 illustrates a high-level process flow of the operative communication steps, in accordance with some embodiments of the invention.

Figure 13A:
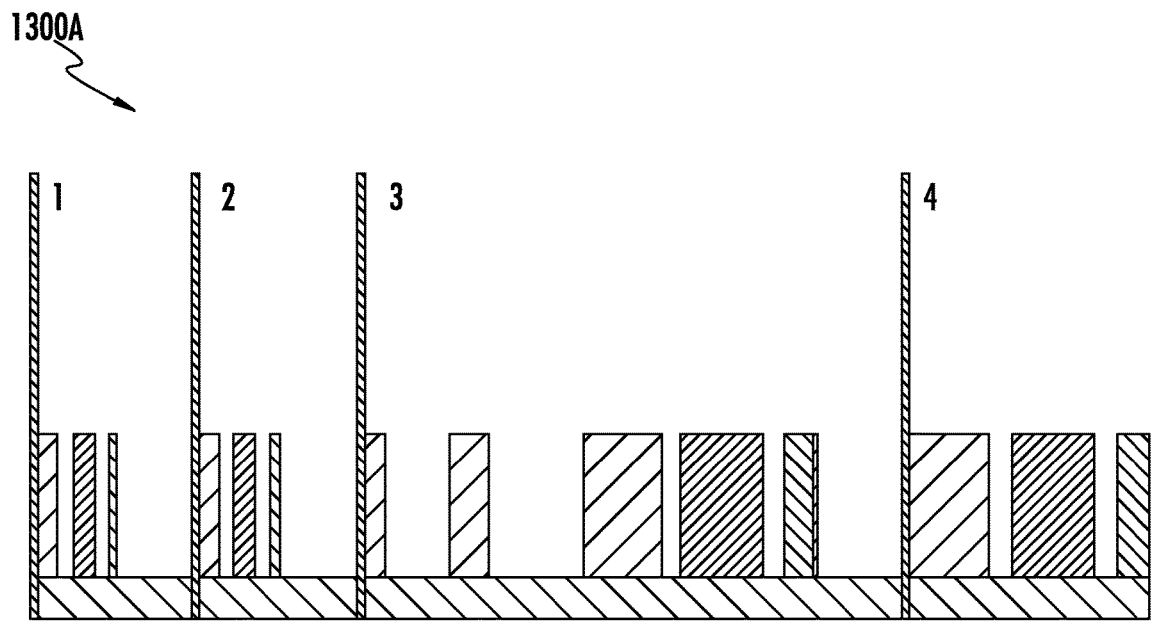
Figure 13B:
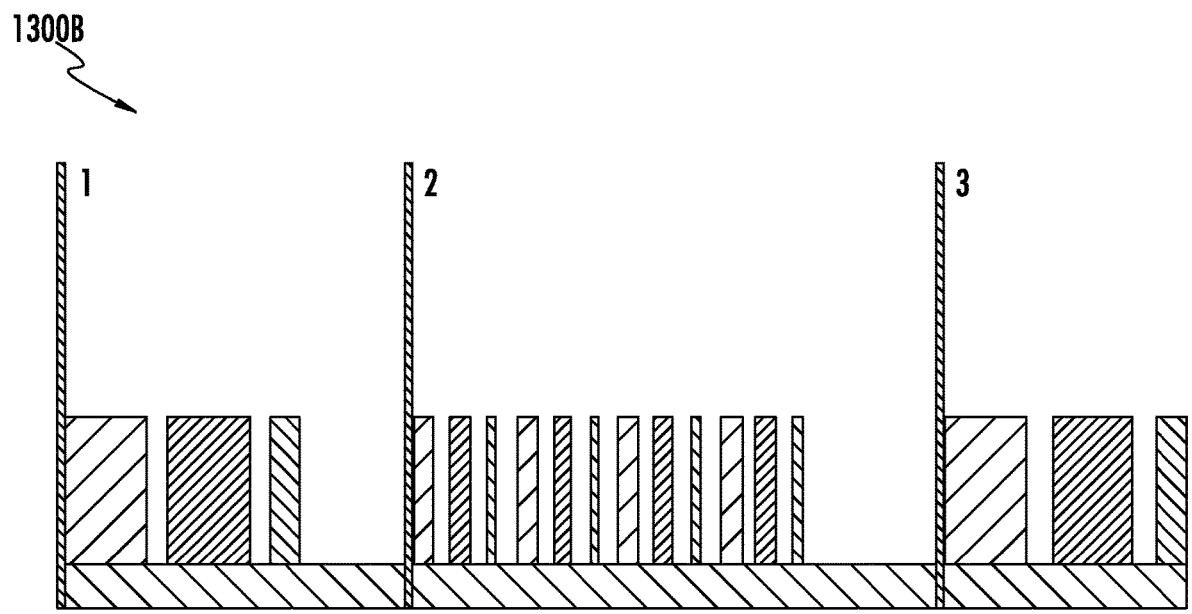

FIGS. 13A-13B illustrate automatic baud rate adjustment, in accordance with some embodiments of the invention.

FIGS. 14A-14D illustrate dynamic inventory display device(s), in accordance with some embodiments of the invention.

Figure 15A:
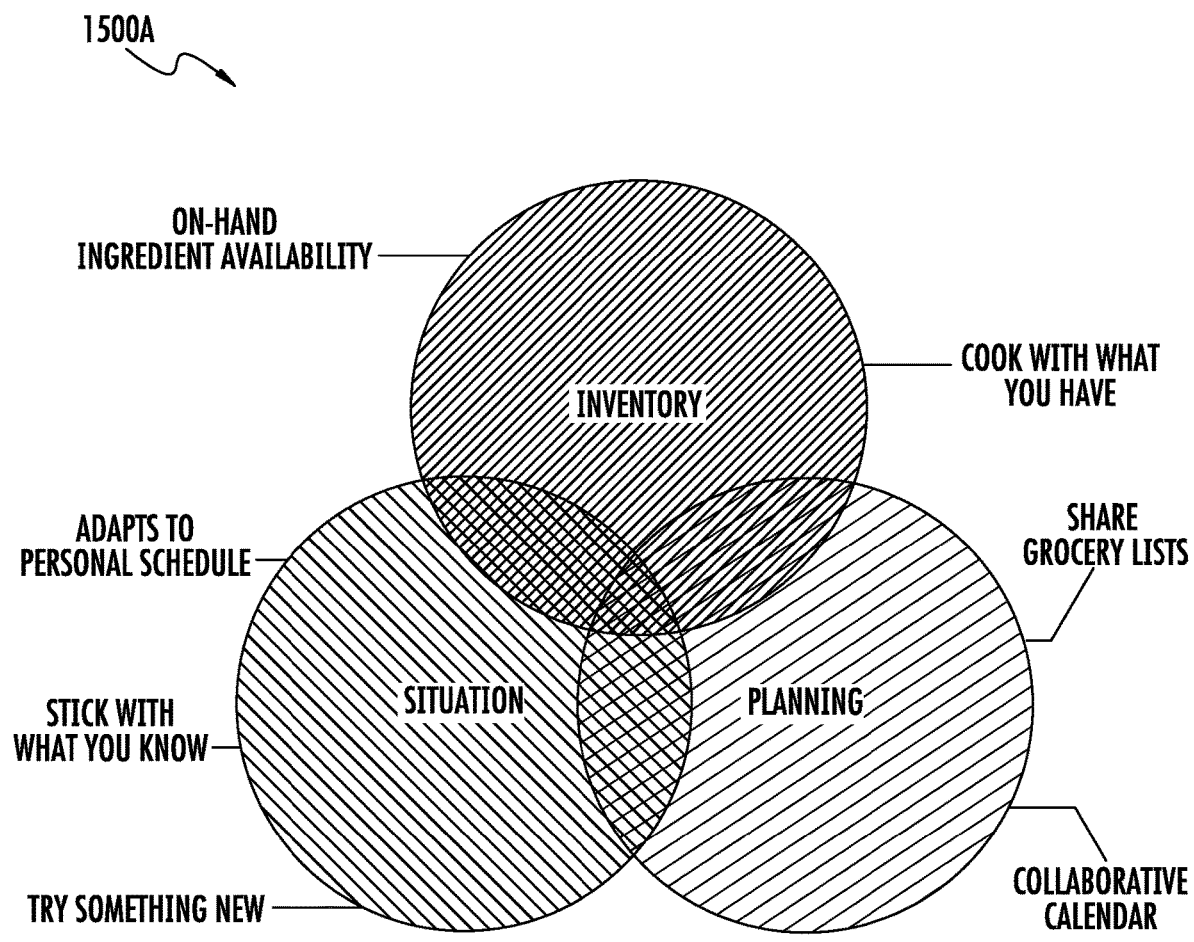

FIG. 15A illustrates a high-level representation of the dynamic object identification, analysis, tracking and expiration tracking, dynamic inventory construction and interactive meal planning provided by the present invention, in accordance with some embodiments of the invention.

FIGS. 15B-24 illustrate interfaces of the integrated object management user application, in accordance with some embodiments of the invention.

Figure 25:
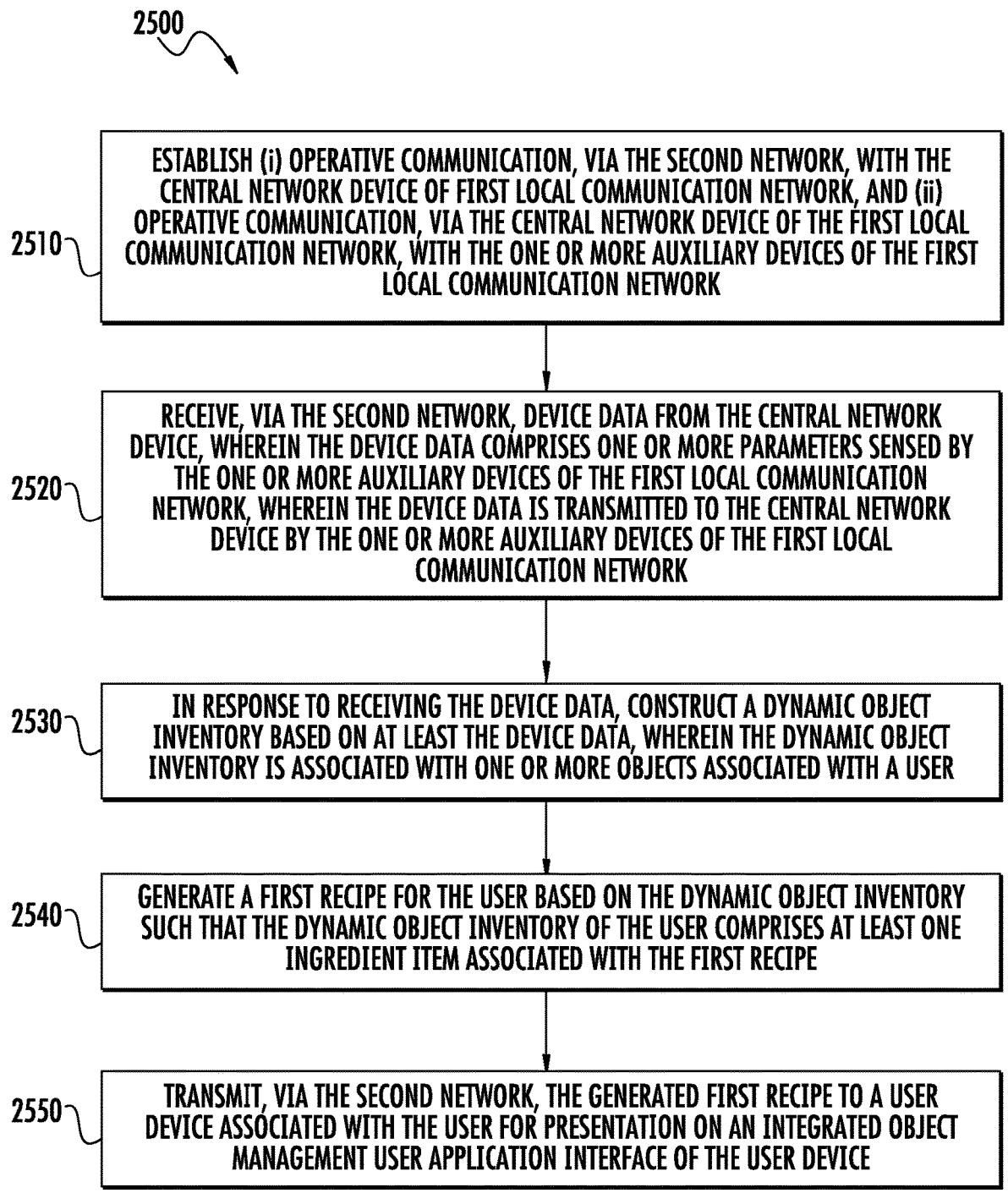

FIG. 25 illustrates a high level process flow 2500 for integrated device connectivity and agile device control for dynamic object tracking and management, in accordance with some embodiments of the invention.

Figure 26:
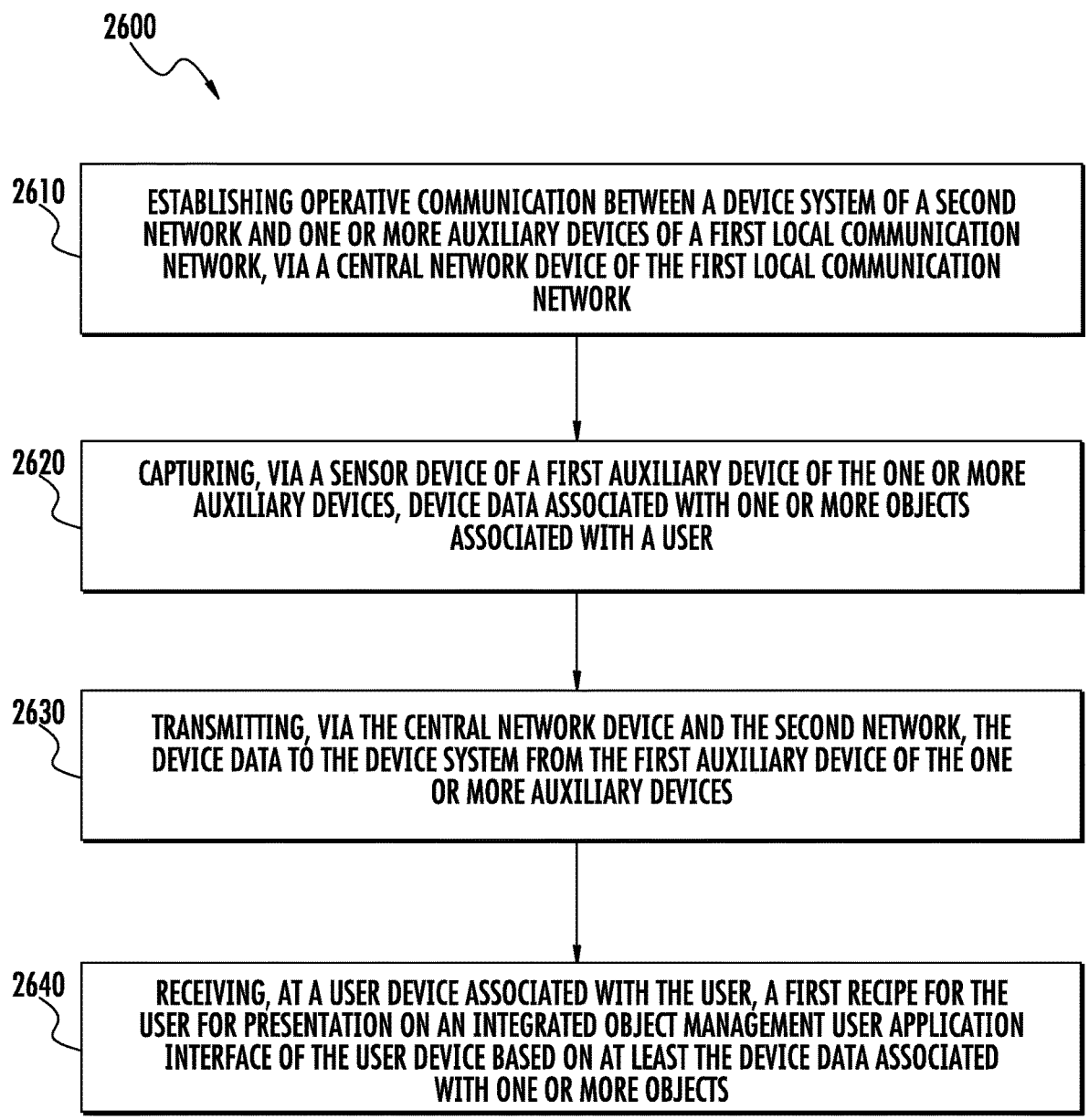

FIG. 26 illustrates a high level process flow 2600 for integrated device connectivity and agile device control for dynamic object tracking and management, in accordance with some embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

The term "object" as used herein may refer to food items, produce items, perishable items, groceries, pantry items, consumable items, products, meals, nutritious substances, commodities, and/or other substances or objects associated with a user, in accordance with some embodiments. In some embodiments, the term "object" relates items that are configured for consumption by the user (e.g., food items such as produce items, perishable items, groceries, consumable items, products, meals, nutritious substances, medication, pantry items, etc.), such that consumption of the objects may result in depletion or reduction in the quantity/inventory of the object. Here, the objects that are configured for consumption by the user, are typically associated with an expiration date (or time interval) or use-by date (or time interval).

That said, in some embodiments, the term "object" relates items that are configured for utilization by the user, such that utilization of the objects may result in depletion or reduction in the quantity/inventory of the object (e.g., household consumable items such as products, detergents, etc.), and/or such that utilization of the objects does not typically result in substantial depletion or reduction in the quantity/inventory of the object (e.g., non-consumable items such as household articles, kitchen tools/utensils, etc.).

In some embodiments, these objects may be stored or positioned, at least temporarily or for a certain period of time, at a location in the user's kitchen, at a location in the user's dwelling, in one or more storage compartments associated with the user (e.g., pantry, kitchen storage cabinets, countertops, etc.), at or in appliances (e.g., refrigerator, freezer, oven, etc.) associated with the user, etc. In some embodiments, these objects may be stored or positioned, at least temporarily or for a certain period of time, at or within a predetermined proximity of one or more devices associated with the user.

The term "user" as used herein may refer to an individual who is a customer of an entity, an individual owning or being associated with one or more appliances and/or devices relating to storing/monitoring the objects, an individual associated with a user device (e.g., mobile device/smart phone) configured for displaying an integrated object management user application associated with dynamic object identification, analysis, tracking and expiration tracking, dynamic inventory construction and interactive meal planning, and/or monitoring and diagnosis of appliance/device parameters and functioning, etc., in accordance with some embodiments of the invention.

FIG. 1 illustrates a system environment 100 for integrated device connectivity and agile device control for dynamic object tracking and management, in accordance with embodiments of the invention. As illustrated in FIG. 1, one or more device systems 10 (e.g., associated with appliance manufacturers, manufacturers or providers of devices 50) are operatively coupled, via a network 2, to one or more user computer systems 20, one or more entity systems 30 (e.g., associated with appliance manufacturers, manufacturers or providers of devices 50), one or more other systems 40 (e.g., third party systems), and/or one or more devices 50. In this way, the user 4 (or one or more customers of the entity, device systems, entity systems, and/or the like) may allow the device application 17 to take actions and/or utilize the device application 17 to communicate with (e.g., send or receive data from, control, or the like) the user application 27 and/or devices 50 associated with the user 4. The device application 17 may utilize the network 2 to communicate with applications 27 on the user computer systems 20, financial applications on the entity systems 30, other applications on other systems, or specific devices 50 (discussed in further detail with respect to FIG. 2, and throughout the specification).

In some embodiments of the invention the one or more device system 10 may monitor, store, and provide information related to applications 27 and devices 50 discussed herein in order to help the user 4 (e.g., customer, or the like) view interfaces of and/or provide inputs at the integrated object management user application, regarding the integrated device connectivity and agile device control for dynamic object tracking and management.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the device system 10 generally comprises one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16. In some embodiments, the device system 10 may refer to a cloud system (or multiple cloud systems), a server (or multiple servers), and/or another computing/processing system.

The one or more processing components 14 use the one or more communication components 12 to communicate with the network 2 and other components on the network 2, such as, but not limited to, the user computer systems 20, the entity systems 30, other systems 40 (e.g., third-party systems, or the like), and/or devices 50. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the device system 10 comprises computer-readable instructions 18 stored in the memory component 16, which in one embodiment includes the computer-readable instructions 18 of a device application 17. In some embodiments, the one or more memory components 16 include one or more datastores 19 for storing data related to the device system 10, including, but not limited to, data created, accessed, and/or used by the device application 17.

The device application 17 may be a tool, website, mobile device app, other computer system app, applet, combinations or multiples thereof, or the like that is used to take the actions discussed throughout the specification. For example, the device application 17 processes data received from devices 50 to identify/track/analyze inventory of objects in real time, provides graphical indicators (e.g., cards, or the like) associated with applications 27 and devices (e.g., the ones utilized by the user and suggested for use), allows users to link to the applications and devices, monitors the applications and devices, provides feedback regarding the applications and devices, allows the user to control the applications and devices through a centralized location, provides data (e.g., individual data or aggregated data) associated with the applications and devices to help meet targets or perform one or more functions, as will be discussed throughout this application.

As illustrated in FIG. 1, users 4 may access the device application 17, or other applications, through a user computer system 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the device system 10, the entity systems 30, the other systems 40, and/or the other devices 50, which may or may not be specifically illustrated in FIGS. 2 and 3 and/or otherwise described herein. As such, the one or more communication components 22 generally comprise a wireless transceiver, modem, server, electrical connection, or other component for communicating with other components on the network 2. The one or more communication components 12 may further include an interface that accepts one or more network interface cards, ports for connection of network components, Universal Serial Bus (USB) connectors and the like. Moreover, the one or more communication components 22 may include a keypad, keyboard, touchscreen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of the integrated object management user application 27. It should be understood that the applications 27 may be associated with and control the devices 50, or the applications 27 may be separate from specific dedicated devices 50, or may be a combination thereof (e.g., some applications 27 related to and used for controlling the devices 50, and some applications that are unrelated to the devices 50).

As illustrated in FIG. 1, the entity systems 30 are operatively coupled to the device system 10, user computer systems 20, other systems 40, or the like, through the network 2. The entity systems 30 have components the same as or similar to the components described with respect to the device system 10 and/or user computer systems 20 (e.g., one or more communication components, one or more processing components, and one or more memory devices with computer-readable instructions of one or more applications, one or more datastores, or the like). Thus, the entity systems 30 communicate with the device system 10, the user computer systems 20, and the other systems 40, and/or each other in same or similar way as previously described with respect to the device system 10 and/or the user computer systems 20. The entity systems 30, in some embodiments, may include entity accounts, which the user may utilize to set cost targets, pay for products, receive rewards, receive or send funds, or take any other monetary actions that are related to the one or more targets in the device application, the user computer systems 20, the other systems 30, the devices 50, or the like.

The other systems 40 (e.g., other entity systems, merchant systems, social networking systems, systems associated with the devices 50, systems associated with the integrated object management user application 27 on the user computer systems 20, or the like) are operatively coupled to the device system 10, user computer systems 20, and entity systems 30, through the network 2. The other systems 40 have components the same as or similar to the components described for the entity systems 10 and the user computer systems 20 (e.g., one or more communication components, one or more processing components, one or more memory components with computer-readable instructions, one or more applications stored in the one or more memory components, one or more datastores, or the like). Thus, the other systems 40 communicate with the device system 10, the user computer systems 20, and the entity systems 30, and/or each other in the same or similar way as previously described with respect to the device system 10, the user computer systems 20, and/or the entity systems 30. The other systems 40, in some embodiments, provide the information and control that can be used for performing one or more functions described herein, or may be other types of systems 30 related to social networking, financial information, or any other systems related to entities that send or receive information through the network 2.

Now referring to FIG. 2, the plurality of devices 50 (e.g., as described with respect to FIG. 2 and throughout this disclosure) are typically configured for communication via a network 1 (e.g., a communication network different from the network 2, such as a specific home communication network implemented by the invention that utilizes sub-gigahertz protocols). In some embodiments of the invention, the network 1 is associated with a sub-gigahertz communication protocol. The plurality of devices 50 typically comprise: (i) at least one central network device 102 (also referred to as a "central hub device 102") and/or (ii) one or more auxiliary devices (e.g., devices 104-118). In some embodiments, the auxiliary devices 50 are configured to communicate with the device system 10 (and/or user computer systems 20, and entity systems 30), via the central network device 102 of the plurality of devices 50. Specifically, each auxiliary device of the one or more auxiliary devices is typically configured for communication with the central network device 102 via the network 1, while the central network device 102 is in turn configured for communication with the device system 10 and/or the user device 20 through a communication device of the central network device 102, via the network 2. However, in other embodiments not illustrated herein, the one or more auxiliary devices, as well as the central network device 102 may communicate with the device system 10 and/or the user device 20 directly via the network 2. The electronic components of the central network device 102 are configured for sub-gigahertz communication to and from the auxiliary devices (e.g., devices 104-119). In some embodiments, the auxiliary devices (e.g., devices 104-119) typically comprise a full suite of kitchen inventory management tools that will also utilize the sub-gigahertz communication protocol.

In some embodiments, each of the auxiliary devices comprise (i) one or more sensors for sensing at least one parameter associated with the objects or for sensing at least one parameter associated with an appliance of the user, and (ii) a communication device configured for establishing operative communication with the central network device 102 of the plurality of devices 50 via the network 1. In addition, in some embodiments, the devices 50 have components the same as or similar to the components described for the entity systems 10 and the user computer systems 20 (e.g., one or more communication components, one or more processing components, one or more memory components with computer-readable instructions, one or more applications stored in the one or more memory components, one or more datastores, one or more power sources, and/or the like).

As illustrated in FIG. 2, the one or more auxiliary devices (e.g., devices 104-116) may include devices within a household environment 200 provided/owned/operated by the entity and/or the user. As such, the one or more auxiliary devices may comprise one or more of (i) a smart camera device 104, (ii) a smart fob device 106, (iii) a connected weight measurement device 108, (iv) a smart container device 110, (v) a smart coin device 112, (vi) a smart wand device 114, (vii) a smart countertop device 116, (viii) a smart dongle device 118, and/or other devices 50. In some embodiments, the one or more auxiliary devices may further comprise one or more dynamic inventory display devices 119. As such, the user 4 may monitor, control, receive/view data from (e.g., via the central network device 102), or provide input to central network device 102 (e.g., manually or allow automatic control) any of these auxiliary devices (e.g., devices 104-118) through use of interfaces (e.g., interfaces 1500B-2200) of the integrated object management user application 27 presented on the user device 20, in order to achieve targets which may be facilitated by one or more of the devices 50. Moreover, the user 4 may send, or receive, any information captured by the auxiliary devices (e.g., devices 104-118) or used by the auxiliary devices (e.g., devices 104-118), e.g., via the central network device 102. The auxiliary devices will be described in detail with respect to FIGS. 3A-11 now. Typically, each of the auxiliary devices (e.g., devices 104-119) are easily portable, and placed/positioned/assembled in various suitable locations.

FIGS. 3A and 3B illustrate the central network device 102, in accordance with some embodiments of the invention. Specifically, FIG. 3A illustrates a front view 300A of the central network device 102, while FIG. 3B illustrates a front perspective view 300B of the central network device 102 in use, in accordance with some embodiments of the invention. As discussed previously, the central network device 102 functions to send and receive data between the various auxiliary devices (e.g., devices 104-119) of the network 1 and externals devices/systems of network 2 (such as the user device 20, the device system 10, entity systems 30, etc.). Data from the auxiliary devices (e.g., devices 104-118), which primarily relates to tracking/identifying/managing location, presence and/or quantity of objects (i.e., food inventory), is stored in the cloud and is used to facilitate the inventory management and other functions of the below described integrated object management user application 27.

The central network device 102 can be housed in a wall plug or inside the base of another household object like a kitchen utensil holder, as illustrated by FIG. 3B. The electronic components of the central network device 102 are configured for sub-gigahertz communication to and from the auxiliary devices (e.g., devices 104-119). In some embodiments, the auxiliary devices (e.g., devices 104-119) typically comprise a full suite of kitchen inventory management tools that will also utilize the sub-gigahertz communication protocol. In some embodiments, the central network device 102 comprises functionality of a smart speaker or intelligent knowledge navigator.

Figures 1, 3C:
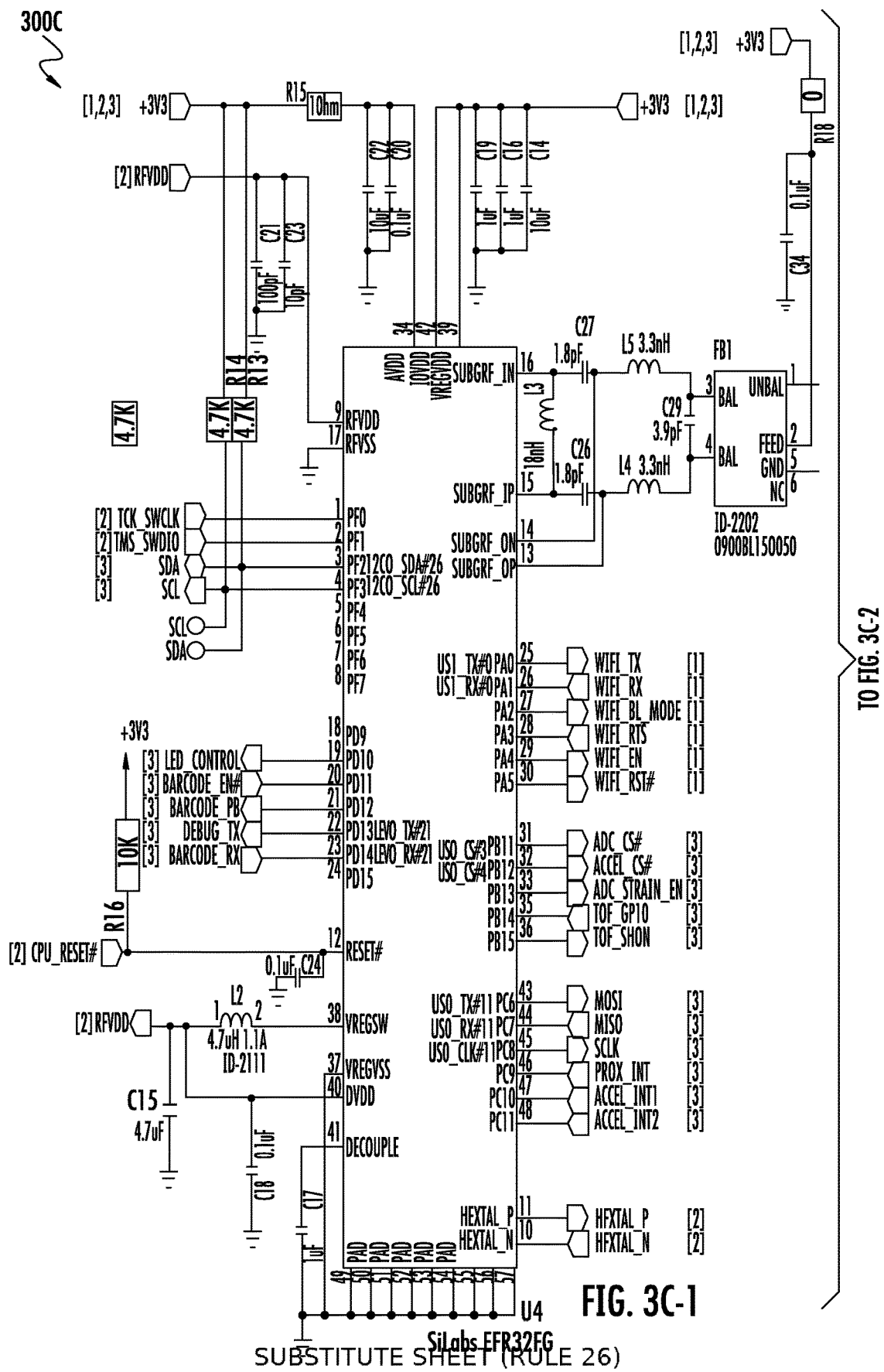
Figures 2, 3C:
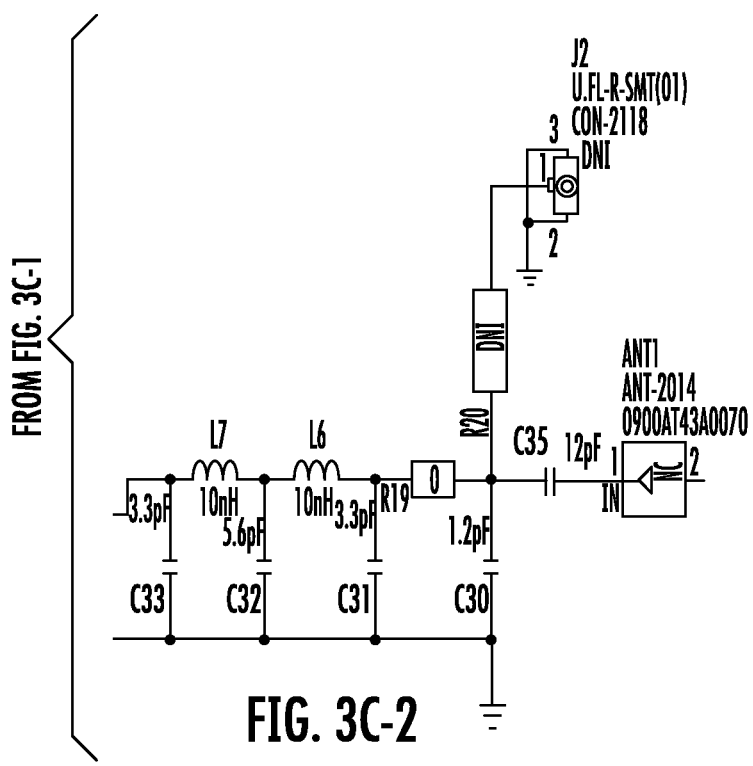
Figure 3D:
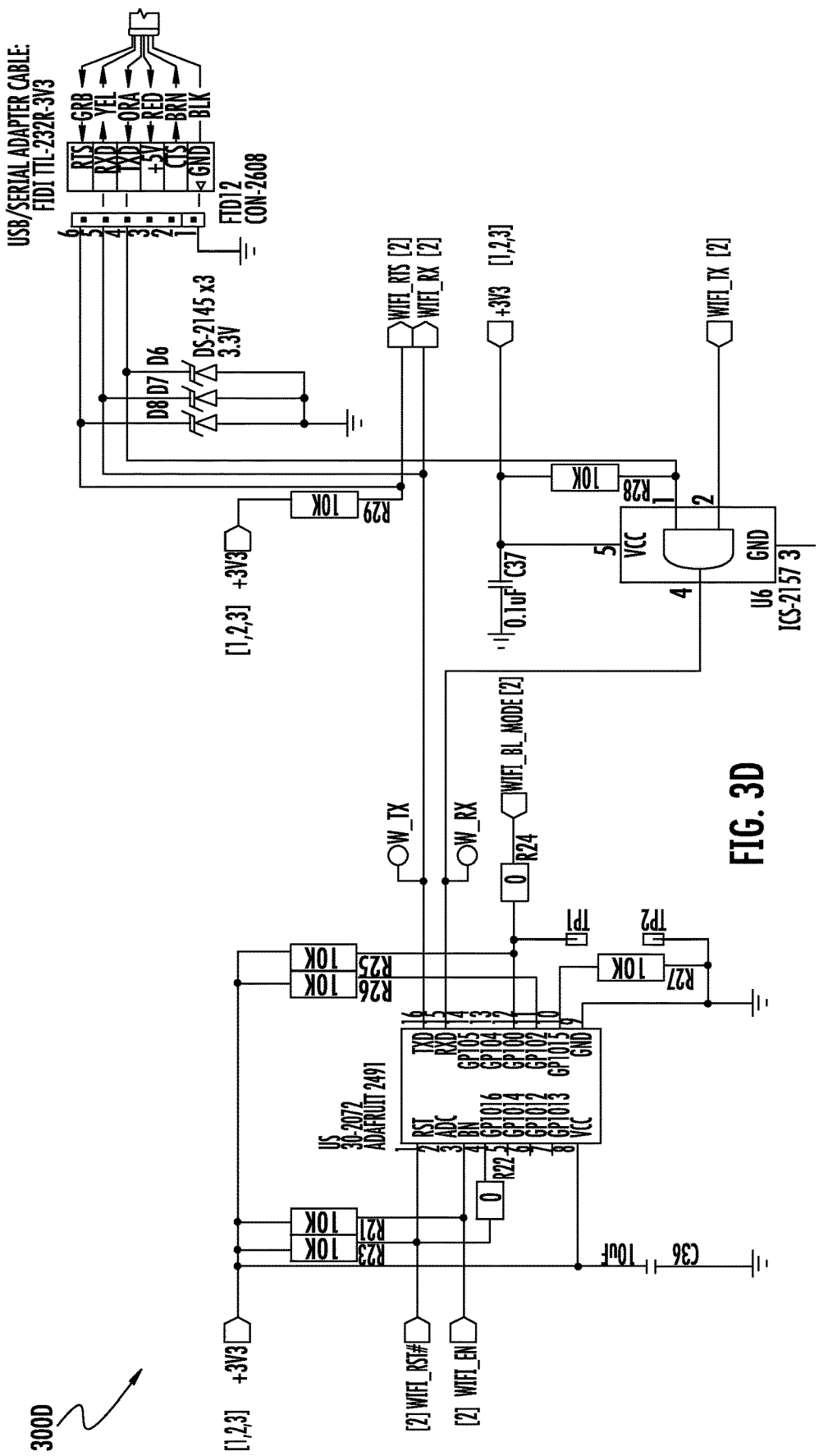
Figure 3F:
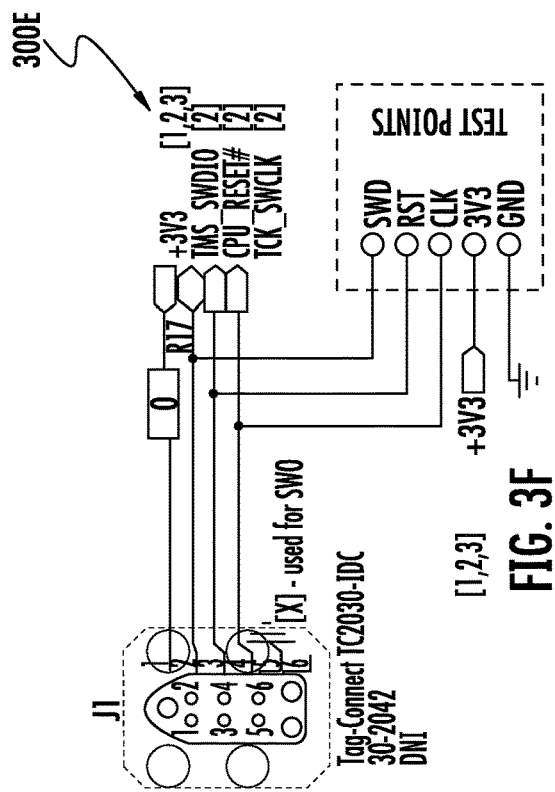
Figure 3E:
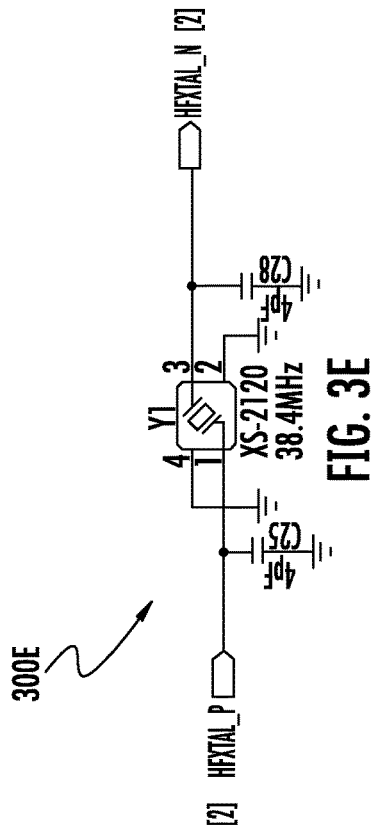

FIGS. 3C-3F illustrate representations of circuit board components of the central network device 102, in accordance with some embodiments of the invention. Specifically, FIG. 3C illustrates a representation of integrated circuit board 300C associated with the MCU and Radio Frequency (e.g., sub-gigahertz) communication module of the of the central network device 102, in accordance with some embodiments of the invention. FIG. 3D illustrates a representation of integrated circuit board 300D associated with the Wi-Fi communication module of the of the central network device 102, in accordance with some embodiments of the invention. FIG. 3E illustrates a representation of integrated circuit board 300E associated with a crystal module of the central network device 102, in accordance with some embodiments of the invention. FIG. 3F illustrates a representation of integrated circuit board 300F associated with a debug connector module of the central network device 102, in accordance with some embodiments of the invention.

FIG. 4 illustrates a side perspective view 400 of a smart camera device 104, in use, in accordance with some embodiments of the invention. Specifically, FIG. 4 illustrates the smart camera device 104 being assembled inside a refrigerator or freezer appliance of the user. The smart camera device is also configured for assembly and use in the pantry, another storage compartment, another location in the user's kitchen/home, etc. As such, the smart camera device 104 maybe be placed inside the refrigerator, the kitchen freezer, kitchen pantry, garage or basement freezer, garage or basement storage, or another suitable location. The smart camera device 104 works in conjunction with the central network device 102 and integrated object management user application 27 to manage object (i.e., food inventory) in the home (e.g., for the purpose of dynamic inventory management in real-time for use in planning meals based on the inventory that is available in the home). In this regard, the smart camera device 104 may be used to identify new food inventory items (e.g., object name, object type, object location, object quantity), as well as determine what items have been removed (and thus can be removed from the dynamic inventory) in real-time. The smart camera device 104 may also be used to provide the user with a live view of current inventory items.

FIGS. 5A and 5B illustrate the smart fob device 106, in accordance with some embodiments of the invention. Specifically, FIG. 5A illustrates a perspective view 500A of the smart fob device 106, while FIG. 5B illustrates a perspective view 500B of the smart fob device 106 in use, in accordance with some embodiments of the invention. Specifically, FIG.

5B illustrates the smart fob device 106 being assembled inside a refrigerator or freezer appliance of the user. The smart fob device 106 is also configured for assembly and use in the pantry, another storage compartment, another location in the user's kitchen/home, etc. Moreover, FIG. 5C illustrates an interface 500C of the integrated object management user application 27 presented on the user device 20 associated with displaying parameters sensed/captured by the smart fob device 10.

The smart fob device 106 typically works in tandem with the central network device 102 to provide real-time status on an environment in which it is positioned/placed/assembled (e.g., refrigerator, freezer, etc.). The smart fob device 106 provides real-time feedback on one or more parameters associated with the appliance or storage location where it is assembled/positioned: (i) temperature, (ii) humidity, (iii) pressure, (iv) ambient light and/or (v) volatile organic content quantity/density or presence. These sensed parameters may be displayed to the user via the integrated object management user application 27, as illustrated by FIG. 5C. Moreover, the one or more parameters sensed by the smart fob device 106 may be analyzed by the device system 10 to determine food spoilage and other conditions of the objects placed within the environment of the location of the smart fob device 106. In addition, the one or more parameters sensed by the smart fob device 106 may be analyzed by the device system 10 to identify appliance/storage functional parameters, e.g., to diagnose/predict maintenance problems of the appliance/storage (e.g., refrigerator/freezer).

Figures 2, 5D:
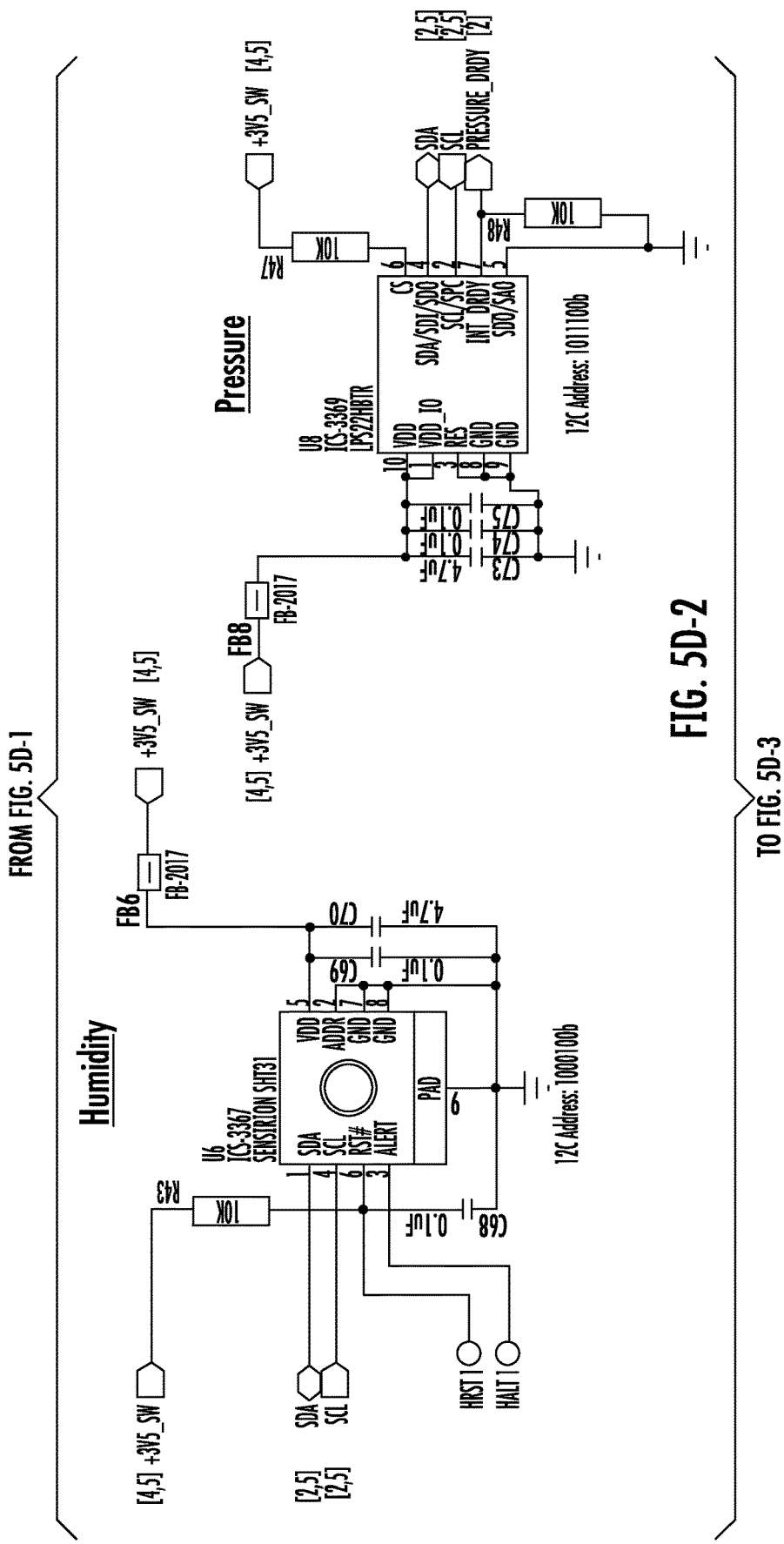
Figures 3, 5D:
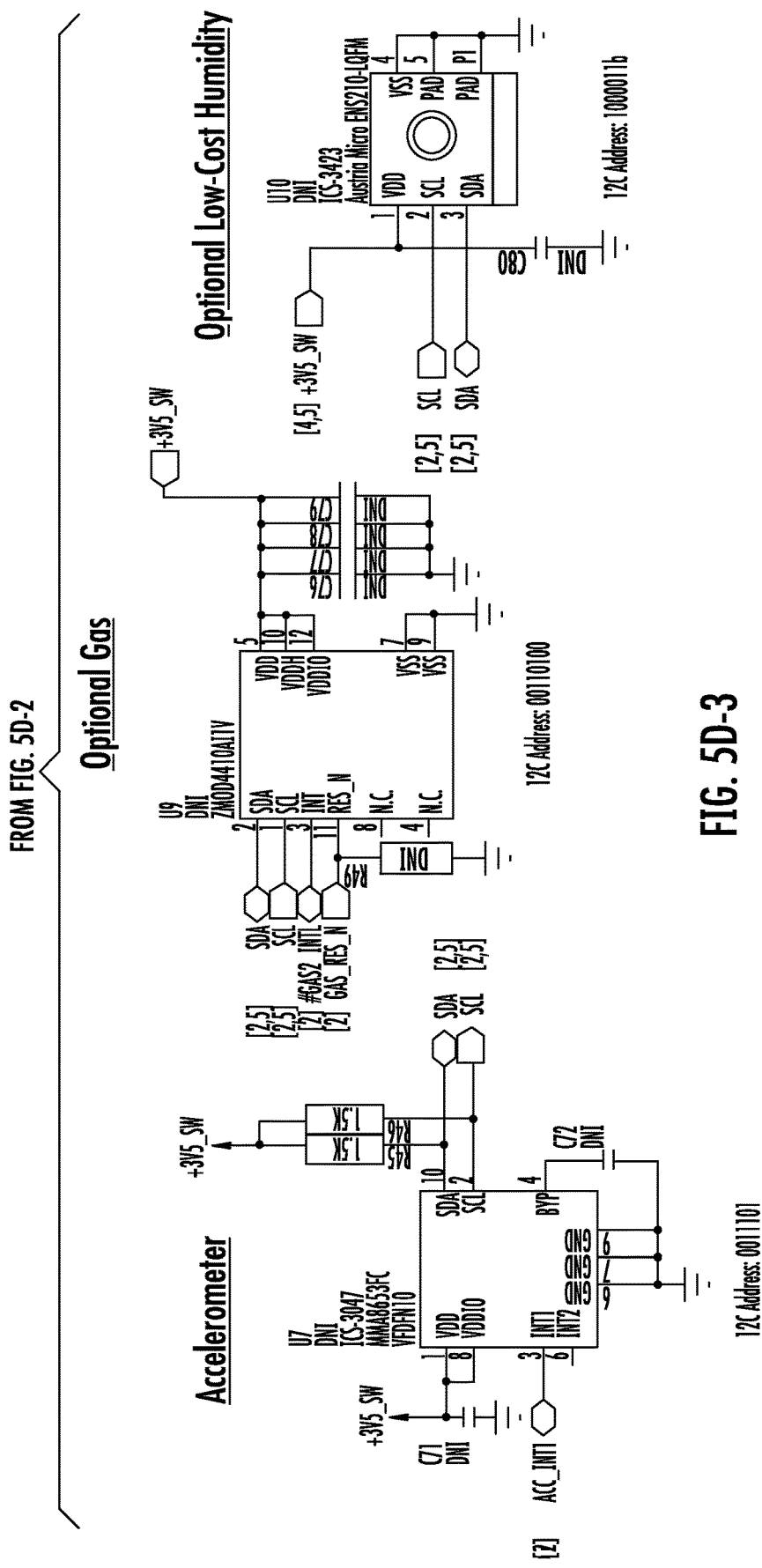
Figure 5E:
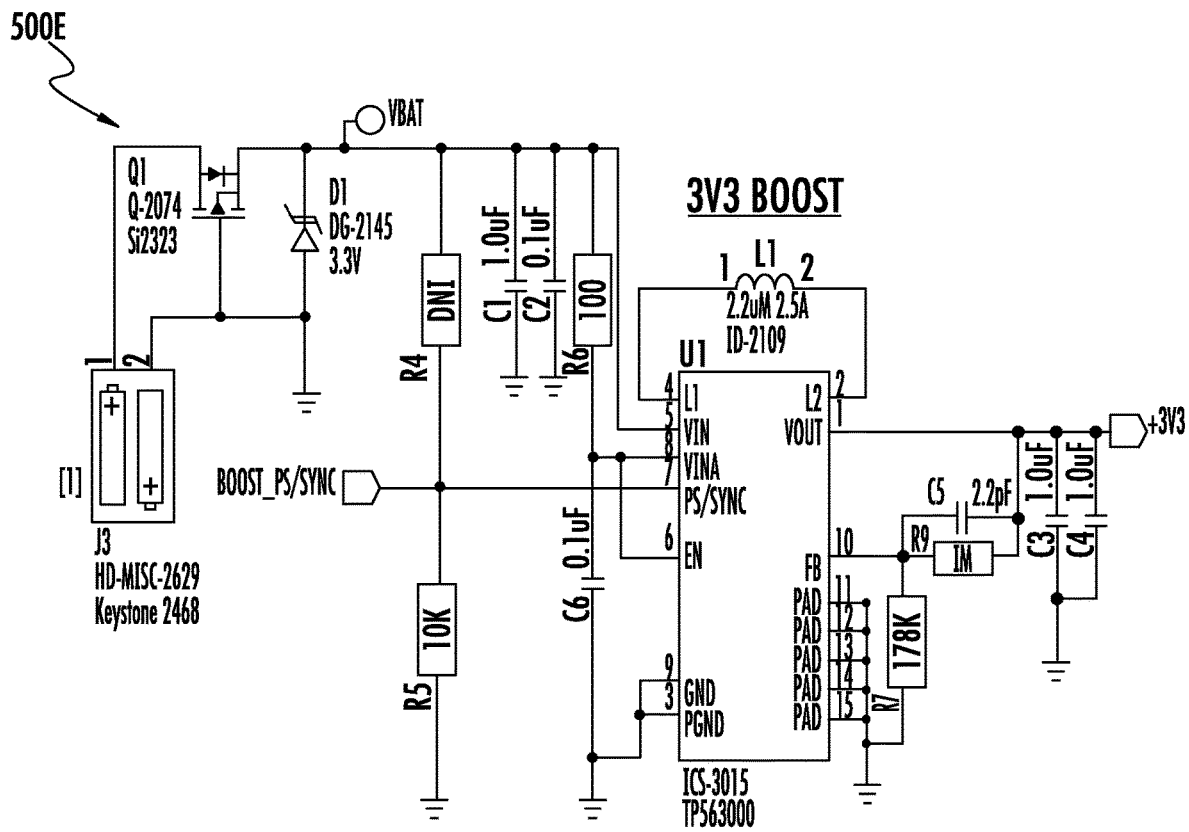
Figure 5F:
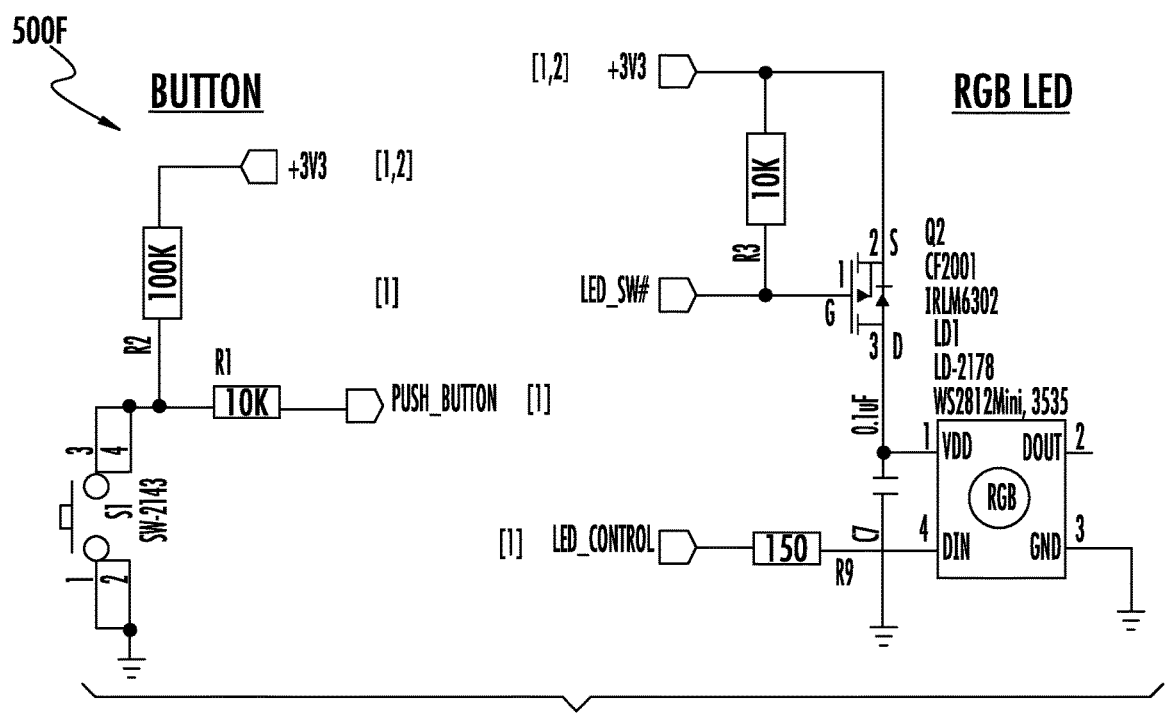
Figure 5G:
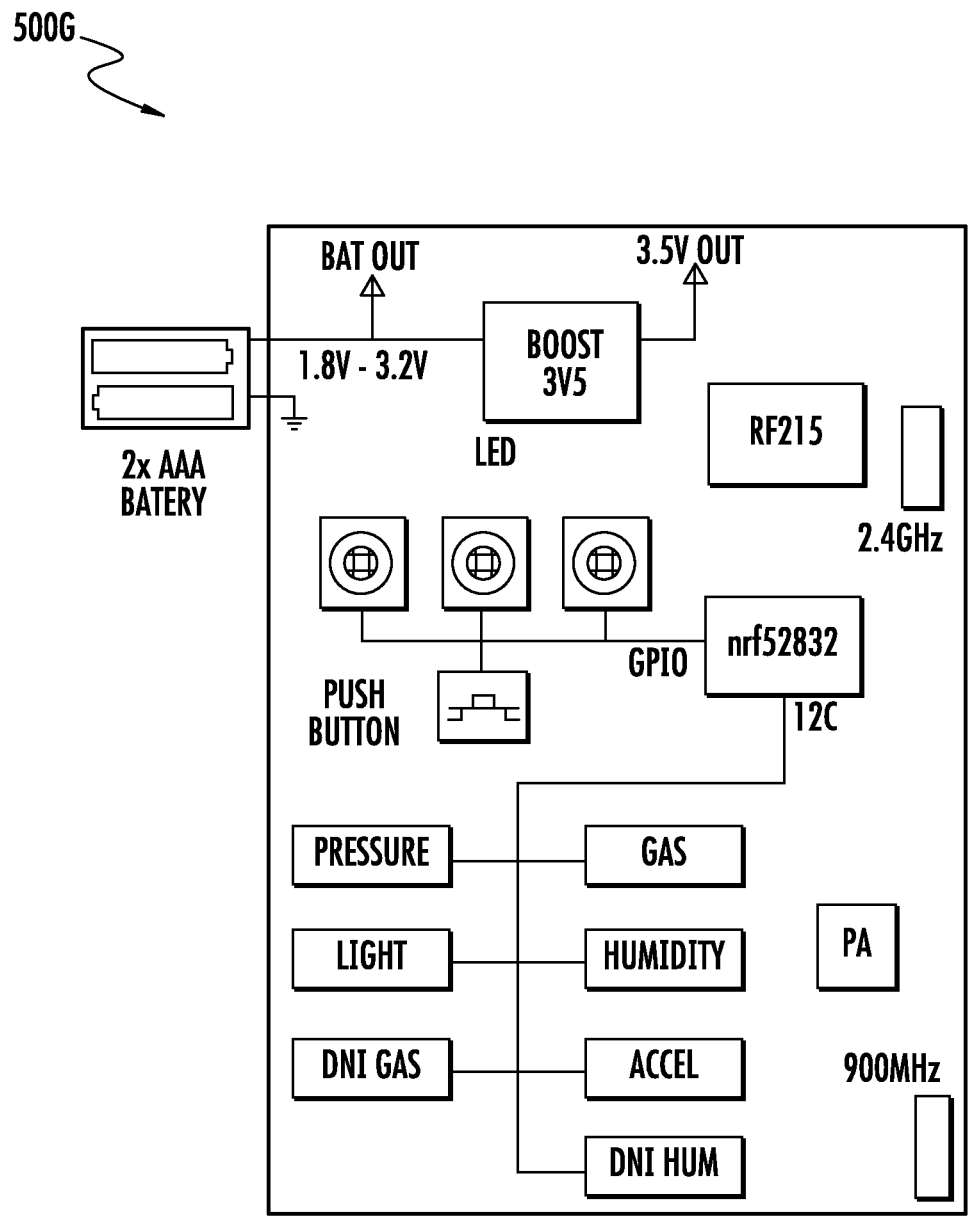

FIGS. 5D-5G illustrate representations of circuit board components of the smart fob device 106, in accordance with some embodiments of the invention. Specifically, FIG. 5D illustrates representations of integrated circuit boards 500D associated with the gas sensor, ambient light sensor, humidity sensor, pressure sensor, 3-axis accelerometer sensor, and thermistor modules of the of the smart fob device 106, in accordance with some embodiments of the invention. FIG. 5E illustrates a representation of integrated circuit board 500E associated with a power module of the of the smart fob device 106, in accordance with some embodiments of the invention. FIG. 5F illustrates a representation of integrated circuit board 500F associated with a user interface module of the of the smart fob device 106, in accordance with some embodiments of the invention. FIG. 5G illustrates a representation of integrated circuit board 500G associated with the smart fob device 106, in accordance with some embodiments of the invention.

FIGS. 6A and 6B illustrate the connected weight measurement device 108, in accordance with some embodiments of the invention. Specifically, FIG. 6A illustrates a perspective view 600A of the connected weight measurement device 108, while FIG. 6B illustrates a front perspective view 600B of the connected weight measurement device 108 in use, in accordance with some embodiments of the invention. Specifically, FIG. 6B illustrates the connected weight measurement device 108 being placed/used/assembled inside a refrigerator or freezer appliance of the user. The connected weight measurement device 108 is also configured for placement/assembly/use in the pantry, countertop, another storage compartment, another location in the user's kitchen/ home, etc. Moreover, FIG. 6B also illustrates an interface 610 of the integrated object management user application 27 presented on the user device 20 associated with displaying parameters sensed/captured by the connected weight measurement device 108.

The connected weight measurement device 108 typically determines and/or monitors weight of an object placed upon it (e.g., weight or quantity of milk or other kitchen inventory to let the user know how much they have on hand in real-time). The connected weight measurement device 108 may take the form of a removable/portable mat on a refrigerator or freezer shelf (as illustrated in FIG. 6B), in a drawer, in a smart container device 110 (illustrated in FIGS. 7A-7B) for dry goods in a pantry or a spice rack, on a hanging storage device, in a product-specific holder within one of these space (i.e. beverage center in a refrigerator), etc. The connected weight measurement device 108 works in tandem with the central network device 102 to provide real-time weight measurements of objects placed upon it. Information related to the weight of object/inventory may be displayed to the user via the integrated object management user application 27, as illustrated by FIG. 6B.

FIG. 6C illustrates representations of circuit board components of the connected weight measurement device 108, in accordance with some embodiments of the invention. Specifically, FIG. 6C illustrates a representation of integrated circuit boards 600C associated with a strain gauge module of the of the connected weight measurement device 108, in accordance with some embodiments of the invention.

FIGS. 7A and 7B illustrate the smart container device 110, in accordance with some embodiments of the invention. Specifically, FIG. 7A illustrates a perspective view 700A of the smart container device 110, while FIG. 7B illustrates a front perspective view 700B of the smart container device 110 in use, in accordance with some embodiments of the invention. Specifically, FIG. 7B illustrates the smart container device 110 having a certain object (e.g., dry goods, fluids etc. typically without packaging) being placed/used/ assembled inside a storage/shelf/pantry of the user. The smart container device 110 is also configured for placement/ assembly/use in a refrigerator, freezer, another appliance, countertop, another storage compartment, another location in the user's kitchen/home, etc. Moreover, FIG. 7B also illustrates an interface 710 of the integrated object management user application 27 presented on the user device 20 associated with displaying parameters sensed/captured by the smart container device 110.

The smart container device 110 typically determines and/or monitors volume and/or quantity of an object placed inside it (e.g., volume/quantity of flour, other dry goods, fluids, or other kitchen inventory to let the user know how much they have on hand in real-time). The smart container device 110 typically comprises a sensor for measuring the volume of food in the container. The sensor may be a laser-rangefinder positioned in the interior of its lid. The laser device determines a distance between the lid and a topmost surface of contents (liquid or solid) within, to compute a volume of the contents. Information related to the volume of inventory may be displayed to the user via the integrated object management user application 27, as illustrated by FIG. 7B, via operative communication with the central network device 102.

FIGS. 8A-8C illustrate the smart coin device(s) 112, in accordance with some embodiments of the invention. Specifically, FIG. 8A illustrates a perspective view 800A of two smart coin device(s) 112, each having a suction cup for adhering to a surface. FIG. 8B illustrates a perspective view 800B of the smart coin device(s) 112 in use, in accordance with some embodiments of the invention. Specifically, FIG. 8B illustrates the smart coin device(s) 112 being assembled with containers, boxes, packets, carton, etc. For instance, from left to right, FIG. 8B illustrates smart coin device(s) 112 being assembled to containers using bands, illustrates a smart coin device 112 being assembled to a side wall of a container (e.g., via its suction cup) and illustrates a smart coin device 112 being assembled to a bag/packet using a clip. FIG. 8C illustrates a front view 800C of three smart coin device(s) 112, each having various light indicators (e.g., green, yellow, red) along its periphery. Moreover, FIG. 8C also illustrates an interface 810 of the integrated object management user application 27 presented on the user device 20 associated with displaying current status/expiration of contents of containers that the smart coin device(s) 112 are assembled with/positioned on, via operative communication with the central network device 102.

The smart coin device(s) 112 are configured for tracking, transmitting and displaying current status/expiration of contents of containers that the smart coin device(s) 112 are assembled with/positioned on (e.g., the dates of on leftovers and produce). Each smart coin device 112 is typically attached to a food object/item or container having the food item (e.g., container of leftovers) and has a unique identifier that the device system 10 associates with the food item specified by the user 4. The device system 10 (through the integrated object management user application 27) tracks the expiration dates of the food items and the smart coin device(s) 112 provide the user with an easy way of identifying particular items that may be close to expiring (e.g., coin "A"=leftover chicken, coin "12F"=produce item, etc.). The smart coin device(s) 112 may light-up based on expiration date (e.g., green=good, yellow=almost expired, red=expired), as illustrated by FIG. 8C. In some embodiments, the smart coin device(s) 112 may display the expiration time period (e.g., expiration within "2 days"), as illustrated by FIG. 8A. In some embodiments, the smart coin device(s) 112 may have sensors similar to the smart fob device 106, in some embodiments for sensing one or more of (i) temperature, (ii) humidity, (iii) pressure, (iv) ambient light and/or (v) volatile organic content of contents of associated containers.

FIGS. 9A-9C illustrate the smart wand device 114, in accordance with some embodiments of the invention. Specifically, FIG. 9A illustrates front and side views 900A of the smart wand device 114. FIGS. 9B and 9C illustrate perspective views 900B and 900C of the smart wand device 114 in use, in accordance with some embodiments of the invention. Specifically, FIG. 9B illustrates the user utilizing the smart wand device 114 to scan a certain object (e.g., a packaged object, an unpackaged produce item (fruit/vegetable), etc.) for identifying the scanned object. FIG. 9C illustrates the user utilizing the smart wand device 114 to provide an audio input identifying/quantifying a certain object. The smart wand device 114 typically works in tandem with the central network device 102 and/or the directly with the device system 10 (via network 2) to provide real-time identification of objects.

In some embodiments, the smart wand device 114 is configured to identify objects (e.g., food products) by reading a barcode on the packaging of the object for barcoded objects and display the particulars of the identified object via the integrated object management user application 27. For non-barcoded objects, in some embodiments, the smart wand device 114 is configured to use one of or a combination of (i) image recognition and (ii) spectroscopy to identify the object/product. In this regard, the smart wand device 114 may be a pocket spectroscope/spectrometer with visual capture abilities. The smart wand device 114 may also identify food items by scanning a grocery receipt. The smart wand device 114 may also use voice recognition to allow a user to manually add objects/inventory items.

That said, in some embodiments, the system (e.g., the device system 10) is structured to identify objects (e.g., food products) based on retrieving and parsing, electronic communications (e.g., emails, texts, application notifications received at applications of the user device 20) received by the user (e.g., those associated with object/food purchase). In this regard, the system may analyze the sender and subject of the electronic communications to first identify relevant emails. The system may the analyze the body and/or any attachments of the relevant electronic communications to determine the objects (e.g., food products) purchased by the user. In this manner the system may also identify any objects returned by the user.

FIG. 10 illustrates a front perspective view 1000 of the smart countertop device 116, in accordance with some embodiments of the invention. Specifically, FIG. 10 illustrates the smart countertop device 116 comprising a work surface, a camera/visual capture device 1004, and a weight sensing device 116. The smart countertop device 116 is configured for use in the user's kitchen/home, or another suitable location. In some embodiments, the smart countertop device 116 is placed at a location where a consumer passes all objects/food through. The smart countertop device 116 uses a combination of weight, high fidelity imagery, and mass spectrometry/spectroscopy to identify what object/food (both unpackaged and packaged objects) a user 4 has used and what is remaining in inventory. This is a smart countertop device 116 that works with the central network device 102, using sub gigahertz communication. The smart countertop device 116 is configured for providing live inventory of food in the home. The central network device 102 communicates with the device system 10 for providing parameters identified by the smart countertop device 116 on the integrated object management user application 27.

FIG. 11 illustrates interfaces 1100 of the integrated object management user application 27 associated with the auxiliary devices, in accordance with some embodiments of the invention. From left to right, FIG. 11 illustrates interfaces displaying current real-time parameters of the central network device 102, a list/menu various auxiliary devices associated with or available to the user, current real-time parameters of the connected weight measurement device 108, current real-time parameters of the smart container device 110, current real-time parameters of the smart wand device 114, and current real-time parameters of the smart fob device 106.

The setup of the network 1 and operative communication processes between the devices 50 is described now with respect to FIGS. 12-13B. FIG. 12 illustrates a high-level process flow 1200 of the operative communication steps, in accordance with some embodiments of the invention. FIGS. 13A and 13B illustrate automatic baud rate adjustment, in accordance with some embodiments of the invention.

As an initial step, typically, the user downloads the integrated object management user application 27 onto the user device 20. Upon launching app, the user is guided through the commissioning process. Here, the user typically, creates a user name and password, enters details about appliances (e.g., refrigerator, freezer, oven, microwave, stove, etc.) they own, and/or enters user details such as address, phone number, etc.

Next, or before or in conjunction with the previous step, the user 20 may unbox the central network device 102 and plug it into a power source (alternatively a power source may be provided within the central network device 102). Typically, the central network device 102 indicates (e.g., via a visual indicator (e.g., LED light sequence), voice or other process) that it is ready for set-up. Next, the central network device 102 typically begins broadcasting a Wi-Fi access point and/or Bluetooth connection (different from the network 1 that is eventually implemented). The user 20 now joins the Wi-Fi network or pairs over Bluetooth with the central network device 102. The integrated object management user application 27 now opens a connection to the central network device 102 and completes commissioning.

The central network device 102 typically then identifies the user 20, and is able to access data associated with the user 20 at the entity system, 30, at the device system 10 and/or other systems 40. In some embodiments, the central network device 102 also performs a channel energy evaluation and selects an unoccupied 902-928 MHz channel to operate on for accessory device polling. The integrated object management user application 27 may then prompt the user 20 to pair any auxiliary devices (e.g., one or more of devices 104-118) they may have.

Subsequently, the device pairing process in implemented for the auxiliary device. First, either after commissioning the device to be paired, or via the integrated object management user application 27's options menu, a user 20 can begin pairing auxiliary devices (104-118, etc.) to the central network device 102. Initiating pairing from the user device 20 sends a message to the device system 10, which then informs the central network device 102 of the beginning of the pairing. The central network device 102 then begins broadcasting pairing packets in the upper 900 MHz band (likely 926.2 MHz). The user 20 may then hold down a button on the device (e.g., an auxiliary device) to be paired. The device will then enter receive mode at 926.2 MHz and listen for pairing messages. Upon hearing a pair message, the device responds and the central network device 102 is now aware of it. The device then reconfigures itself to operate on the actual polling channel specified. It will flash indicating pairing has completed successfully. The paired auxiliary device and central network device 102 now periodically exchange data at 900 MHz as is required by its function.

The features and functions of the radio frequency (RF) communication implement in network 1 will be described now, in accordance with some embodiments (e.g., as illustrated by FIG. 12). In some embodiments, during product commissioning the central network device 102 does an energy read across the 902-928 MHz spectrum, and selects a channel to operate on that has the least amount of detected interference. The pairing process informs each auxiliary device what channel to operate on. Here, the central network device 102 operates in receive mode on that channel with OFDM (Orthogonal frequency-division multiplexing) Option 1 modulation, listening to devices as they wake up and report in. The communication is a polled interface driven by the auxiliary devices. This is to accommodate the lowest power modes. During data exchange, RSSI (Received Signal Strength Indicator) is used to determine the channel health. The central network device 102 can dynamically inform a single auxiliary device that it needs to lower its modulation to improve receive sensitivity.

Continuing with the radio frequency (RF) communication implement in network 1, in other embodiments, data packets are encrypted with AES (Advanced Encryption Standard) encryption and randomly chooses an OFDM preamble pattern to assist with network isolation. The pairing process informs each auxiliary device what channel to operate on. The central network device 102 sits in receive mode on that channel with OFDM Option 1 modulation listening to devices as they wake up and report in. The communication is a polled interface driven by the auxiliary devices. This is also to accommodate the lowest power modes. During data exchange, RSSI is used to determine the channel health. Finally, the central network device 102 can dynamically inform a single auxiliary device that it needs to lower its modulation to improve receive sensitivity.

Now referring to FIG. 13A, RF automatic baud rate adjustment 1300A is now described, in accordance with some embodiments of the invention. For instance, as indicated by the elements "1" and "2", an auxiliary device may wake up and transmit its payload to the central network device 102. The central network device 102 responds and the auxiliary device acknowledges and then goes back to sleep. Next, as indicated by element "3", an auxiliary device wakes up and transmits its payload to the central network device 102. No response is received, so it backs off a random time and re-transmits the payload at a lower baud rate. If it still receives no response, so it backs off again for a random time and re-transmits at a lower baud rate. This time the central network device 102 receives it, and also responds at the lower baud rate. The device acknowledges and goes back to sleep. Next, as indicated by element "4", the auxiliary device continues to use the lower baud rate until the RSSI increases to a point supporting a faster baud rate again. That said, other devices can use whatever baud rate they need to when performing data exchanges. The network does not need to globally change baud rates.

Now referring to FIG. 13B, RF automatic baud rate adjustment 1300B is now described, in accordance with yet another embodiment of the invention. For instance, as indicated by the element "1", a fridge sensor or camera (or another appliance) wakes up and transmits a maintenance payload to the central network device 102. This transmission uses a low baud rate to improve sensitivity while the fridge door is closed. Next, as indicated by element "2", the sensor or camera is woken up by its accelerometer. Noticing a jump in RSSI, and having a large payload to send, it increases its baud rate to blast out the payload before going back to sleep. Next, as indicated by element "3", the device goes back into low power/low baud rate mode until the next event.

Although described as utilizing sub-gigahertz protocols, it should be understood that the devices 50 of network 1 described herein may communicate with each other through the use of Wi-Fi connections, Bluetooth, NFC, other wireless connections, physical connections, or the like.

Figure 14B:
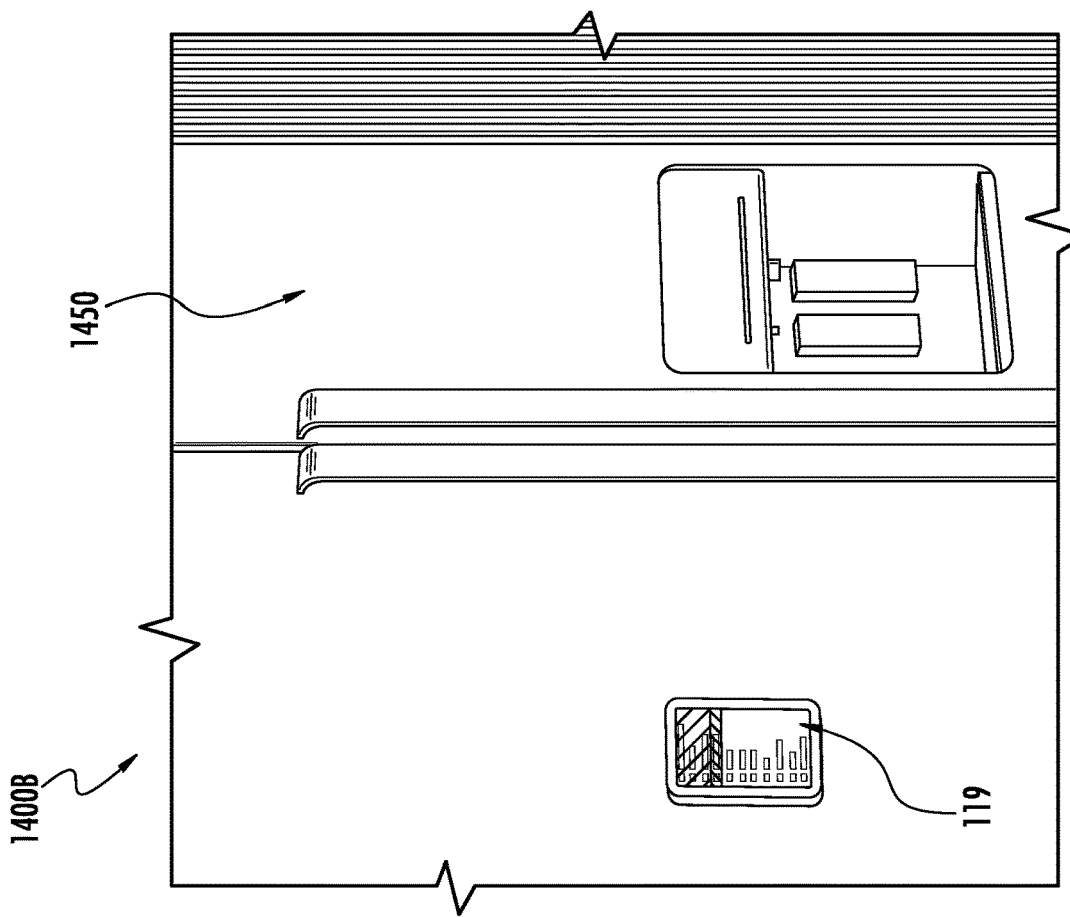
Figure 14A:
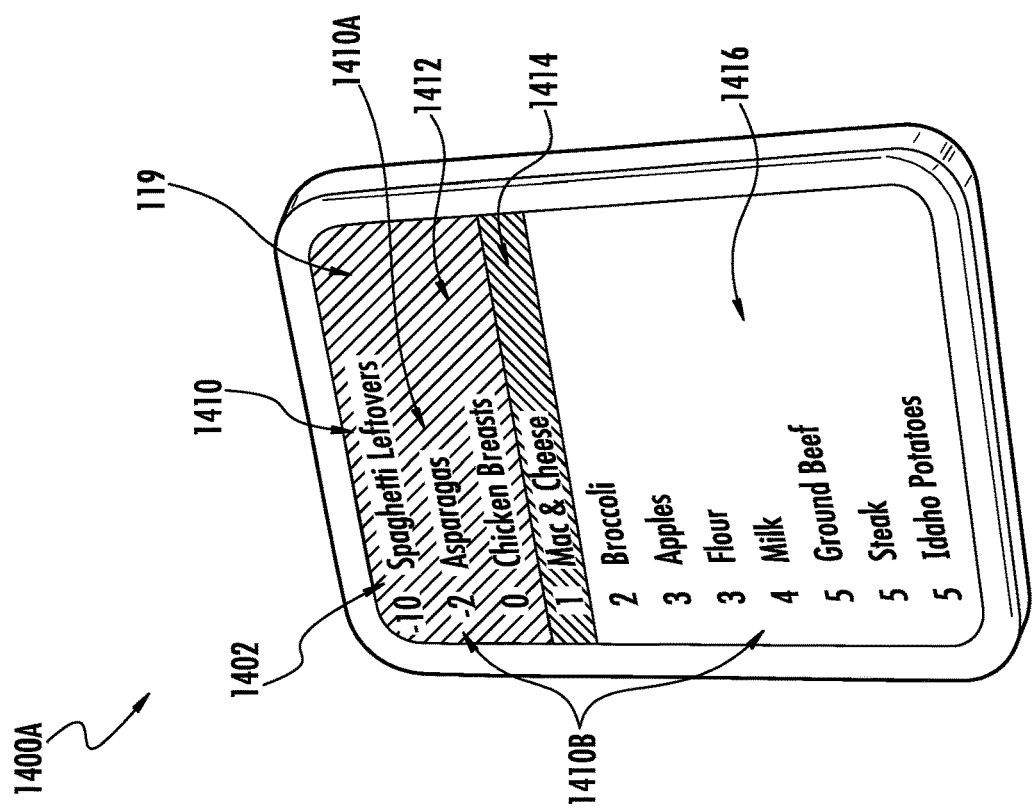
Figure 14C:
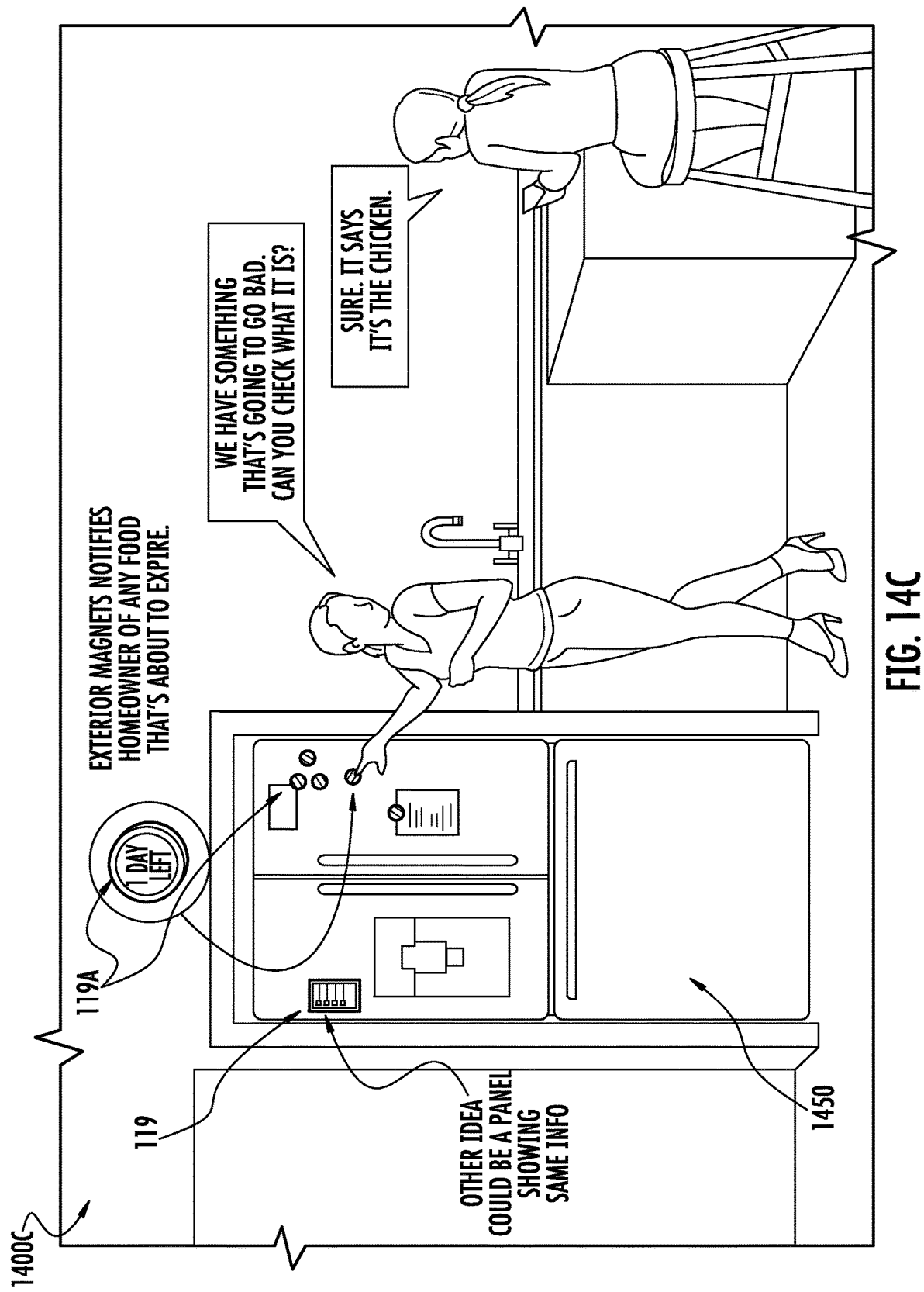

FIGS. 14A-14D illustrate the dynamic inventory display device(s) 119, in accordance with some embodiments of the invention. Specifically, FIG. 14A illustrates a perspective view 1400A of a dynamic inventory display device 119 having a display screen 1402, in accordance with some embodiments of the invention. FIG. 14B illustrates a perspective view 1400B of the dynamic inventory display device(s) 119 in use, in accordance with some embodiments of the invention. Specifically, FIG. 14B illustrates the dynamic inventory display device(s) 119 being assembled at a structure 1450 (such as a refrigerator, another appliance, a cabinet, etc.). FIG. 14C illustrates a perspective view 1400C of the dynamic inventory display device(s) 119 in use, in accordance with some embodiments of the invention. Specifically, FIG. 14C illustrates the dynamic inventory display device(s) 119 further comprising dynamic inventory display device(s) 119A having a circular shape (e.g., similar to smart coin device(s) 112 described previously) being assembled at a structure 1450 (such as a refrigerator, another appliance, a cabinet, etc.).

Figure 14D:
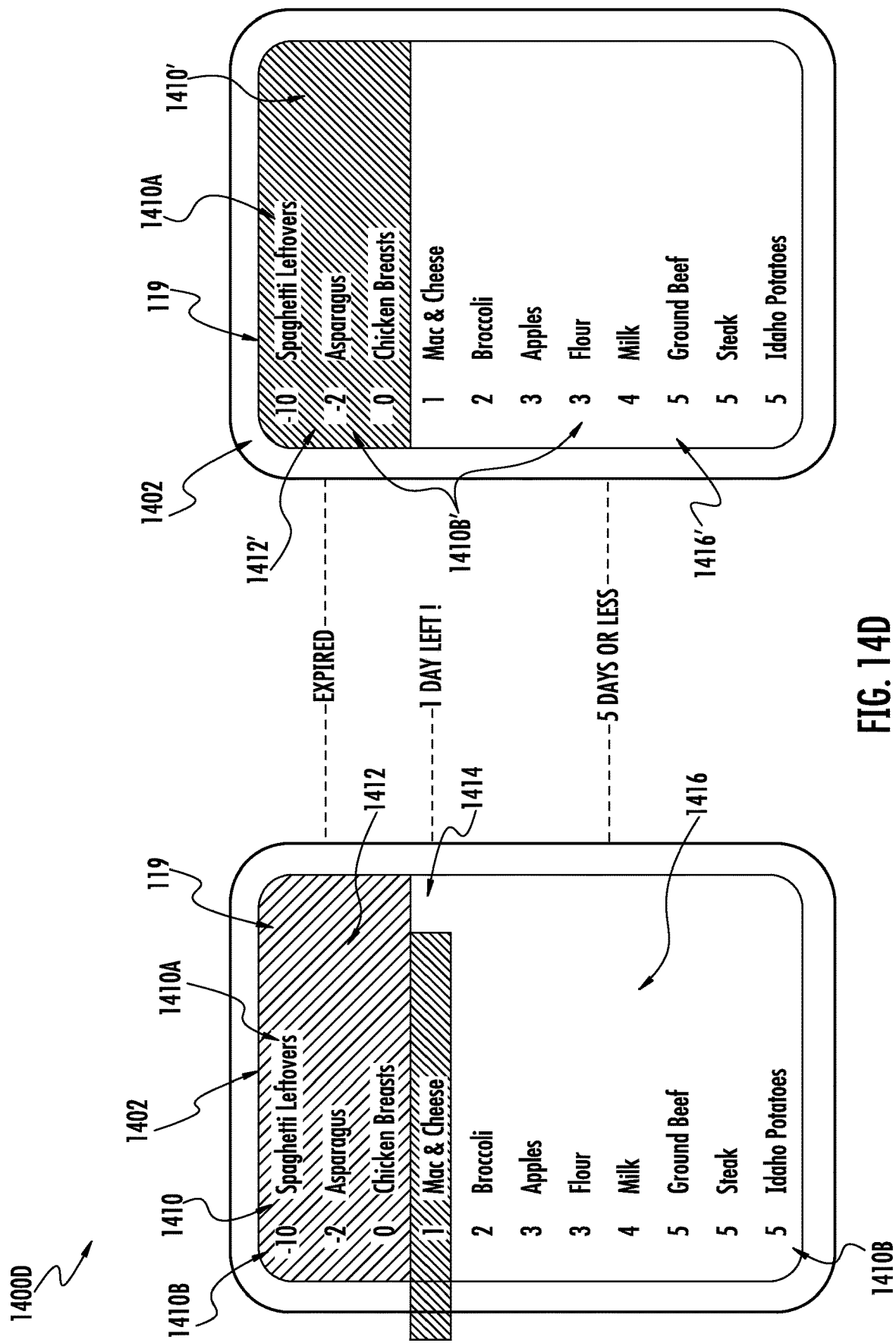

FIG. 14D illustrates a front view 1400C of two dynamic object interfaces 1410 and 1410' displayed on the display screen 1402 of the dynamic inventory display device(s) 119, in accordance with some embodiments of the invention. Specifically, the dynamic object interfaces 1410 and 1410' presented on the display screen 1402 of the dynamic inventory display device(s) 119 are associated with displaying current status/expiration of objects (inventory/grocery items) associated with the user. Here, the objects (inventory/grocery items) may be located at any suitable location (e.g., inside the refrigerator, inside a cabinet, inside, within a smart container device 110, upon a smart countertop device 116, upon a connected weight measurement device 108, at other auxiliary devices, and/or the like). Moreover, the dynamic object interfaces 1410 and 1410' may facilitate prioritization, item tracking, and shopping list/grocery list generation features.

The dynamic inventory display device(s) 119 are configured for displaying current status/expiration of objects (inventory/grocery items). Each dynamic inventory display device 119 is typically removably attached to a structure 1450 (such as a refrigerator, another appliance, a cabinet, etc.), e.g., via a magnetic component of the dynamic inventory display device 119. Typically, the dynamic inventory display device 119 is portable and can be displaced and repositioned easily on any suitable structure 1450, in any suitable orientation.

The device system 10 (e.g., through the integrated object management user application 27) tracks the expiration dates of the food items, and transmits the same for display to the dynamic inventory display device(s) 119. As illustrated in FIG. 14A, the dynamic object interface 1410 of the dynamic inventory display device 119 may display a list of one or more objects 1410A (e.g., grocery items) and their associated expiration time frames 1410B, in real-time. Moreover, the dynamic object interface 1410 of the dynamic inventory display device 119 may further display priority indicators, based on the priority date indicating the consumption priority. For example, as illustrated, the dynamic object interface 1410 may display that items of a predetermined expiration time frames associated with expired items with a first consumption priority 1412 (e.g., color red indicating that the items have expired and should be discarded). Moreover, as illustrated, the dynamic object interface 1410 may display that items of a predetermined expiration time frames associated with items expiring soon with a second consumption priority 1414 (e.g., color black indicating that the items have to be consumed soon). Moreover, as illustrated, the dynamic object interface 1410 may display that items of a predetermined expiration time frames associated with items not expiring soon with a third consumption priority 1416 (e.g., color white indicating that the items are not set to expire soon). In this manner, the dynamic inventory display device(s) 119 provide the user with an easy way of identifying particular items that may be close to expiring, and also, what items the user has on hand.

Now referring to FIG. 14D, the user may customize the predetermined expiration time frames and hence the consumption priority. For example, as illustrated by FIG. 14D, the user may customize the dynamic object interface 1410' such that that the interface display classifies the items into two consumption priorities: expired items having a first consumption priority 1412' and non-expired items having a second consumption priority 1416'.

Now referring to FIG. 14C, another type of dynamic inventory display device(s) 119A are illustrated. These dynamic inventory display device(s) 119A may also be suitably, removably assembled at with a structure 1450 (such as a refrigerator, another appliance, a cabinet, etc.), e.g., via a magnetic component of the dynamic inventory display device 119. Typically, the dynamic inventory display device(s) 119A are portable and can be displaced and repositioned easily on any suitable structure 1450, in any suitable orientation. Each dynamic inventory display device 119A may be associated with a particular object (e.g., grocery item). Moreover, each dynamic inventory display device 119A may comprise a lighting display device (e.g., a circumferential light) which may light-up based on expiration date of the corresponding object (e.g., green=good, yellow=almost expired, red=expired). Here, the user may press a button of the dynamic inventory display device 119A to receive (i) a pop-up notification on the user device, (ii) an audio output, and/or (iii) a notification on the display screen 1402 of the dynamic inventory display device 119, indicating the expiration status of the corresponding object (e.g., grocery item).

FIG. 15A illustrates a high-level representation 1500A of the dynamic object identification, analysis, tracking and expiration tracking, dynamic inventory construction and interactive meal planning provided by the present invention, in accordance with some embodiments of the invention. As discussed, the integrated object management user application 27 is configured for integrating dynamic object/kitchen inventory, meal planning, and guided cooking, in real-time. The integrated object management user application 27 uses parameters/information obtained from the above discussed auxiliary devices 104-118 to obtain this information. The integrated object management user application 27 comprises functionality and interfaces (e.g., interfaces 1500B-2400) relating to the concepts of (i) inventory tracking in a user's refrigerator, pantry and/or other storage as well as updating inventory based on identifying use of or addition of items (e.g., interface 1800, etc.), (ii) product expiration tracking of items such as produce and display of status via the integrated object management user application 27 (e.g., interfaces 1800, 2300-2400, etc.), (iii) meal planning/recipes and guided cooking, including making suggestions based on real-time inventory as well as previous recipes used by user (e.g., interfaces 1700-2400 etc.), and/or (iv) shopping list generation, which may be created manually or automatically (e.g., by identifying used inventory items or based on meals that the user has added to meal calendar) (e.g., interface 1800, etc.). As items are checked-off on a shopping list, these items may automatically be added to inventory. The integrated object management user application 27 may allow a user to scan a receipt, read a barcode, use voice commands, or manually add or remove inventory. The integrated object management user application 27 may include a social aspect that allows a user's friends and family to jointly plan meals, manage inventory, create and use shopping lists, etc. (e.g., interfaces 2100, 2300, etc.). Interfaces 1500B-2400 of the integrated object management user application 27 relating to the foregoing concepts are described below with respect to FIGS. 15B-24, respectively.

FIG. 15B illustrates an interface 1500B of the integrated object management user application 27, in accordance with some embodiments of the invention. Interface 1500B comprises an overall/main menu feature of the integrated object management user application 27.

Figure 16:
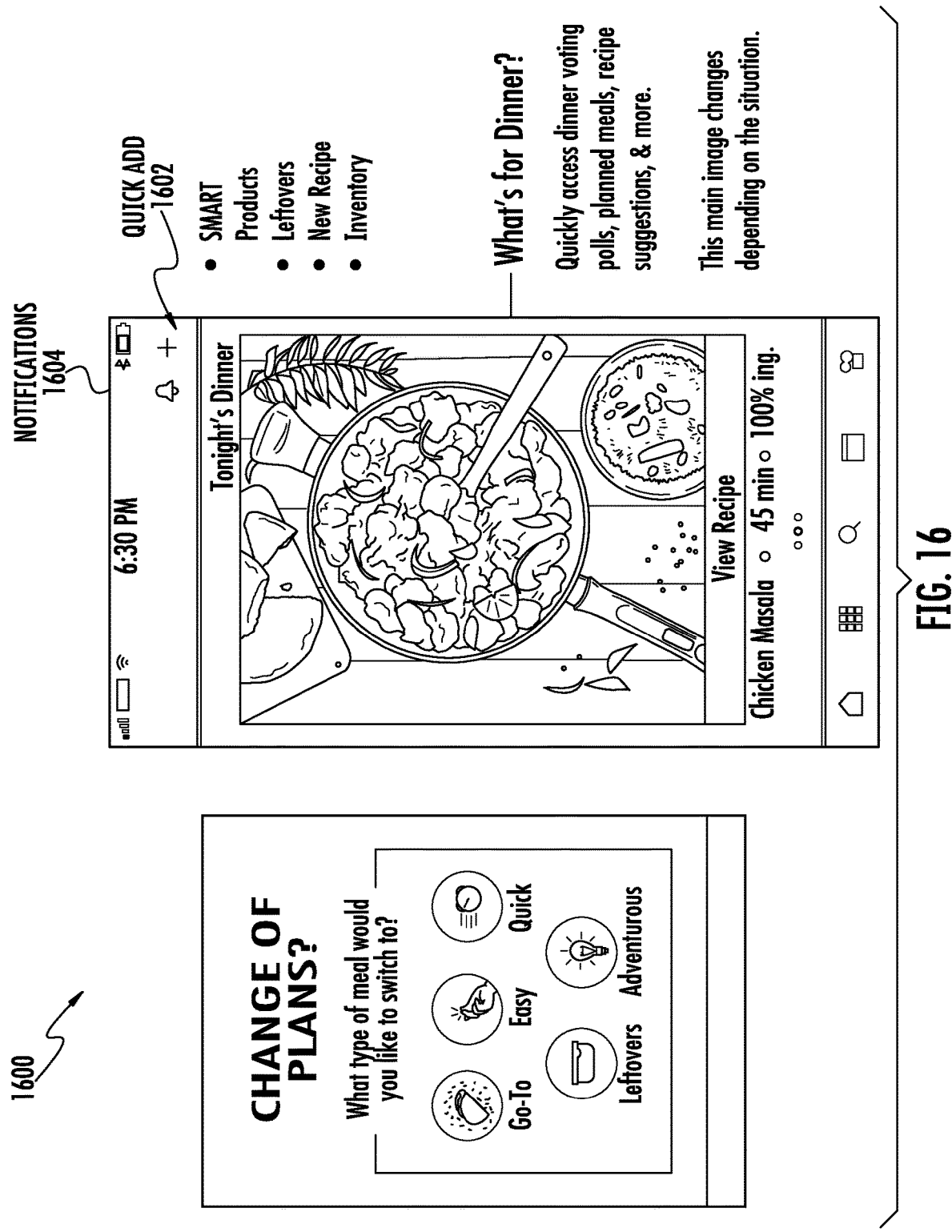

FIG. 16 illustrates an interface 1600 of the integrated object management user application 27, in accordance with some embodiments of the invention, relating to generation of relevant recipes based on current inventory (i.e., a recipe that answers "what's for dinner?"). Interface 1600 comprises a change of meal, notifications, recipe/guided cooking, addition of inventory items/objects (e.g., for shopping list generation purposes) features of the integrated object management user application 27. As illustrated, the interface 1600 may comprise a user input element 1602 that is structured for receiving user input (e.g., textual input, voice input, image input, gesture based input such as touch commands, etc.) associated with (i) adding a new recipe, (ii) adding objects (e.g., inventory items, newly purchased items/objects, etc.) to the inventory, (iii) adding objects (e.g., inventory items) to a list (e.g., a shopping list, a grocery list, a user specified list, etc.), (iv) creating a meal, and/or the like. Here, the interface 1600 allows the user to easily add, create, construct and modify a variety of features associated with meal planning, recipe generation, shopping list generation, etc., as will be described in detail below.

In some embodiments, the input element 1602 is structured for receiving user input associated with adding a new recipe. Here, the user may provide a user input associated with a new recipe that the user seeks to add. In this regard, the user may capture an image of the recipe (via a camera device/visual capture device of the user device) and the captured image is received as a user input by the interface 1600. The system may then perform a character, image and object analysis of the image to identify the recipe. Moreover, the user may input a link (e.g., a hyperlink, weblink, etc.) associated with the new recipe. The system may then extract the new recipe from its stored location via the link. Moreover, the user may input the new recipe using textual input (e.g., by typing), voice commands, etc. The system may then construct the new recipe based on the user input. Moreover, the interface 1600 is structured for allowing a user to create a new recipe by modifying existing recipes.

In some embodiments, the input element 1602 is structured for receiving user input associated with adding new objects (e.g., inventory items, newly purchased items/objects, etc.) to the inventory. The new objects may refer to newly added objects, increase in the quantity of existing objects, etc. Here, the user may provide a user input associated with one or more objects that the user seeks to add to the inventory. In this regard, the user may capture an image of a receipt associated with the purchase of the one or more objects (e.g., via a camera device/visual capture device of the user device, a scanning device, etc.) and the captured image is received as a user input by the interface 1600. The system may then perform a character, image and object analysis of the image to identify the one or more objects, and automatically add them to the inventory based on receiving user confirmation. Moreover, the interface 1600 allows for the user to split the cost of the one or more objects in the receipt and transmit the split cost to other users. Moreover, the user may grant access to the user's electronic communications (e.g., emails, email attachments, texts, application notifications, etc.) associated with the purchase of the one or more new objects. The system may then extract the one or more new objects from the electronic communications and add them to the inventory. Moreover, the user may input the new object(s) using textual input (e.g., by typing), voice commands, etc. The system may then add the new object(s) to the inventory based on the user input.

In some embodiments, the input element 1602 is structured for allowing the user to create lists (e.g., shopping lists), and also structured for receiving user input associated with adding new objects (e.g., inventory items, newly purchased items/objects, etc.) to the lists. Moreover, the interface allows for the user to search for objects/items within the list. The interface 1600 may also comprise a notification element 1604 that allows for the user to configure and view notifications. For example, through the notification element 1604, the system may indicate to the user that the user may need to undertake grocery shopping for a particular list at a certain timeframe (e.g., within the next day) (e.g., to replenish certain object/items whose quantities are or are likely to fall below a predetermined threshold).

In some embodiments, the input element 1602 is structured for allowing the user to create meals. In this regard, the interface 1600, via the input element 1602, is structured to allow the user to search recipe types (e.g., entree, sides, desserts, etc.) by providing a user request input, following which the system may determine one or more keywords (e.g., entree, sides, desserts, dinner, lunch, user skill level, preparation time, week/day/time that the recipe is likely to be prepared, etc.) associated with the user request input. The system may then analyze corresponding keywords of a global plurality of recipes to identify a first plurality of recipes that match the one or more keywords. Here, the one or more keywords may be associated with meal type (e.g., lunch, dinner, breakfast, etc.), preparation time (e.g., under 30 minutes, 15-30 minutes, about 1 hour, etc.), number of ingredients, type of cuisine, scheduled meal preparation time interval (between 6 PM to 8 PM on a particular day), required ingredient, recipe type (e.g., entree, sides, desserts), user rating (e.g., prior user rating of 4 stars or above), skill level (e.g., beginner, advanced, etc.), recipe nutrition information (e.g., % daily value of a particular macro nutrient or micro nutrient), and/or user health information (e.g., allergies, predetermined required calorie intake, etc.). The determined first plurality of recipes that correspond to the user request input may then may be presented on the interface 1600. The user may then select one or more recipes from the displayed first plurality of recipes to construct a meal and may also schedule a time for preparation of the meal. For example, the user may select a first recipe for a particular entree, a second recipe for a particular side, and the third recipe for a particular dessert to construct a meal having the first, second and third recipes. Here, the system may analyze the first, second and third recipes, and dynamically match and reorder the steps of each of the recipes such that when the user is preparing the meal: (i) like steps are performed together, (ii) like ingredients are prepared together, (iii) total meal preparation time is minimized (e.g., such that sum of individual preparation times of the first, second and third recipes is greater than the preparation time for the meal), (iv) waste is minimized, (v) leftovers are minimized, (vi) a maximum quantities of objects/items from the user's pantry are utilized, and/or the like.

Figure 17:
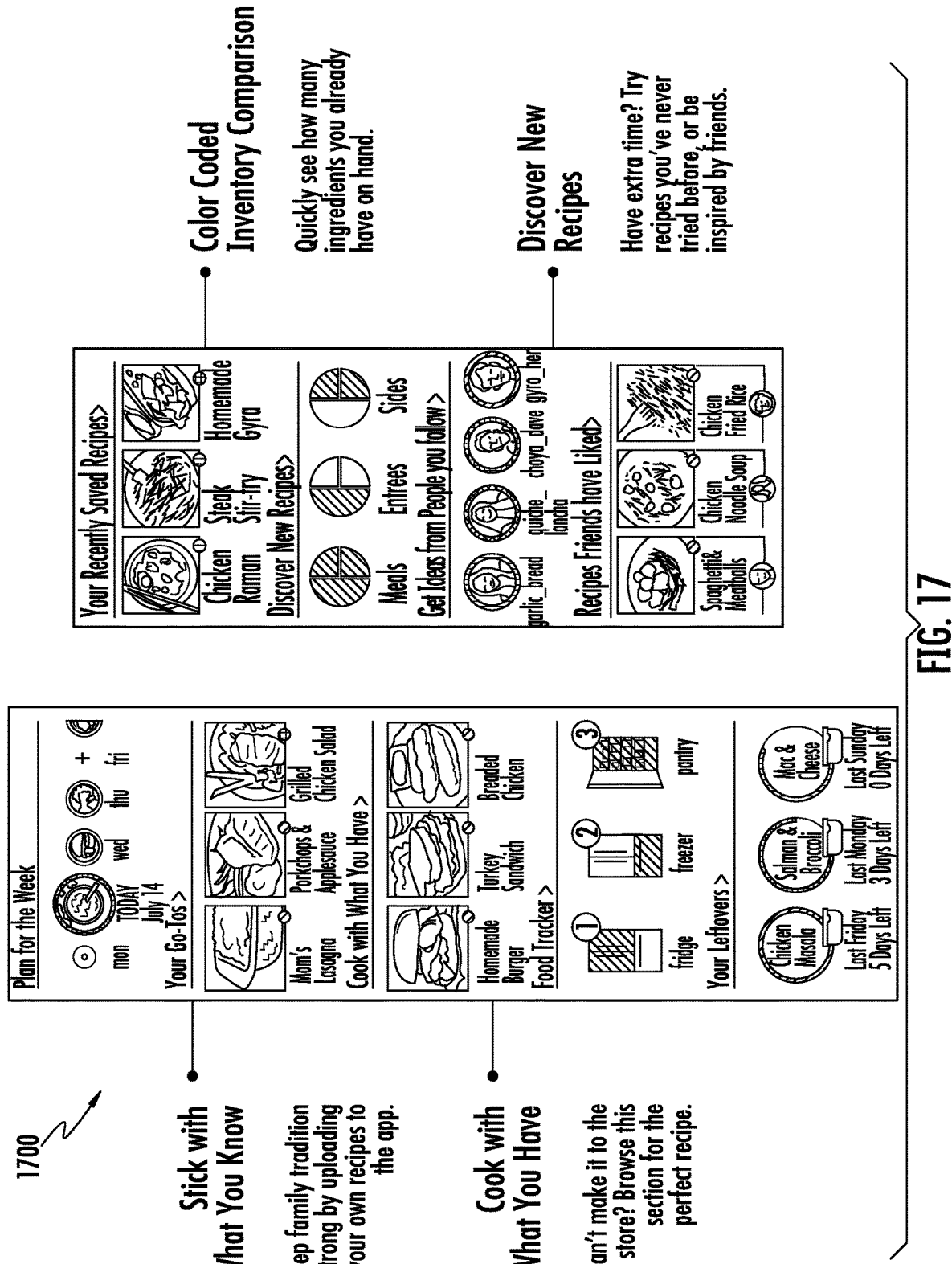

FIG. 17 illustrates an interface 1700 of the integrated object management user application 27, in accordance with some embodiments of the invention. Interface 1700 comprises preferred recipes, recipes generated based on current inventory, color coded inventory comparison, and new recipe features of the integrated object management user application 27.

Figure 18:
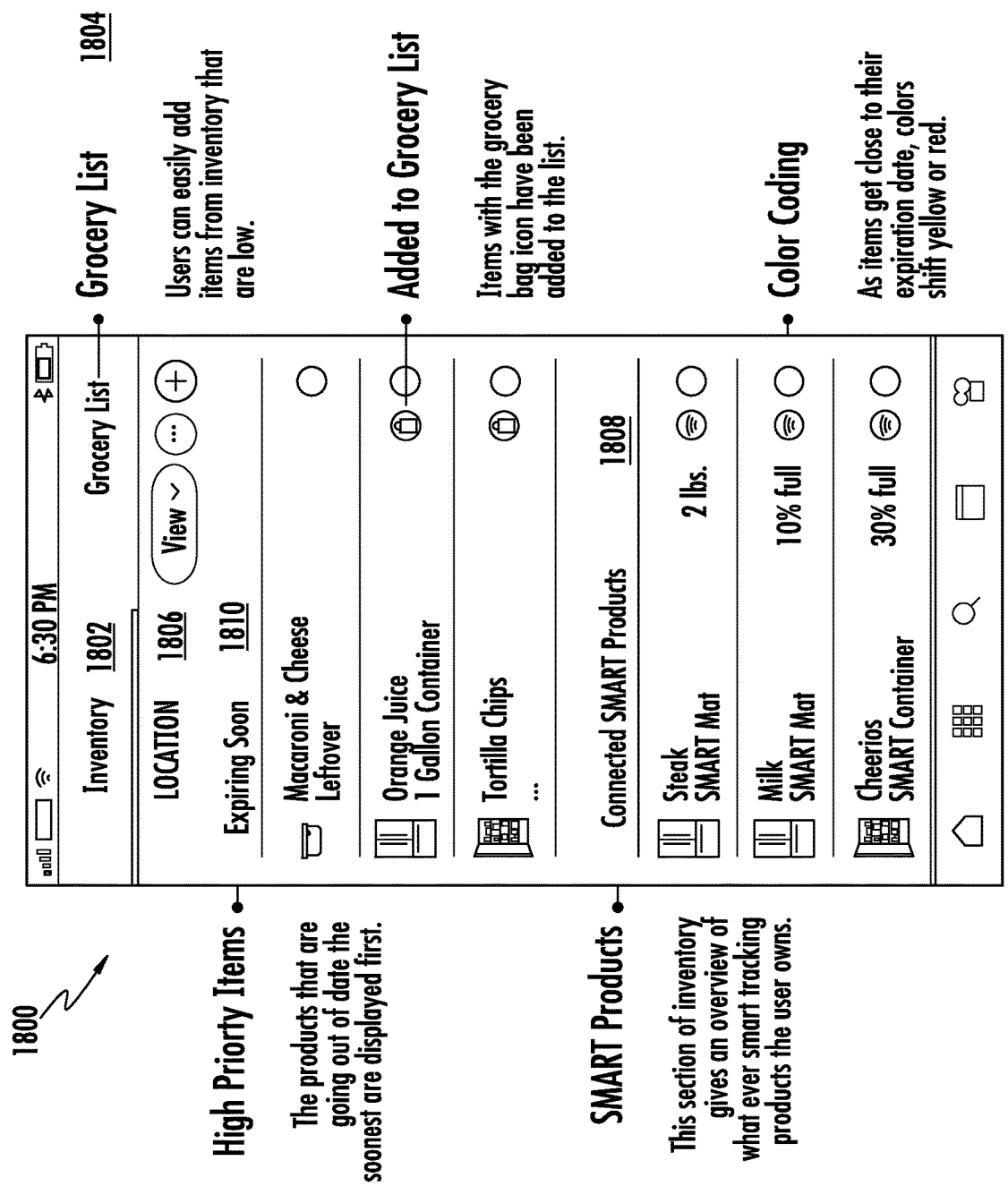

FIG. 18 illustrates an interface 1800 of the integrated object management user application 27, in accordance with some embodiments of the invention. Interface 1800 comprises item prioritization, item tracking based in auxiliary devices, shopping list/grocery list generation features of the integrated object management user application 27. As illustrated, the interface 1800 typically comprises a dynamic object inventory element 1802 comprising one or more objects (e.g., inventory items) in the user's inventory, and their location 1806 (e.g., user's home, refrigerator, freezer, kitchen pantry etc.).

In some embodiments, the dynamic object inventory element 1802 is structured for allowing the user to search within the one or more objects of the dynamic object inventory element 1802, share information associated with the inventory and/or one or more objects with other users, allow other users to edit the inventory and/or one or more objects, etc. In addition, the user may share and/or lend one or more objects or portions of the objects to other users, and/or receive objects from other users (indicated by the interface 1800 via a notification of receipt of object into inventory).

In some embodiments, the dynamic object inventory element 1802 is structured for receiving user input associated with adding new objects (e.g., inventory items, newly purchased items/objects, etc.) to the inventory. The new objects may refer to newly added objects, increase in the quantity of existing objects, etc. Here, the user may provide a user input associated with one or more objects that the user seeks to add to the inventory. In this regard, the user may capture an image of a receipt associated with the purchase of the one or more objects (e.g., via a camera device/visual capture device of the user device, a scanning device, etc.) and the captured image is received as a user input by the interface 1800. The system may then perform a character, image and object analysis of the image to identify the one or more objects, and automatically add them to the inventory based on receiving user confirmation. In some embodiments, the user may capture an image of the object itself or scan an identifier of the object (e.g., via the smart camera device 104, the wand device 114, a camera device/visual capture device of the user device, a scanning device, etc.). The system may then perform a character, image and object analysis of the image/capture/scan to identify the one or more objects, and automatically add them to the inventory based on receiving user confirmation.

Moreover, the user may grant access to the user's electronic communications (e.g., emails, email attachments, texts, application notifications, etc.) associated with the purchase of the one or more new objects. The system may then extract the one or more new objects from the electronic communications and add them to the inventory. Moreover, the user may input the new object(s) using textual input (e.g., by typing), voice commands, etc. Moreover, the user may add one or more objects to the dynamic object inventory element 1802 by providing an input comprising one or more links, hyperlink, website information associated with the object, etc. The system may then add the new object(s) to the dynamic object inventory element 1802 based on the user input. In some embodiments, the interface 1800 may allow the user to add one or more leftover items as objects to the dynamic object inventory element 1802 and allow for the leftovers to be utilized within recipes, allocated/scheduled for consumption at a particular day (e.g., by linking to interface 2000), etc.

In some embodiments, the dynamic object inventory element 1802 is structured for receiving user input associated with modifying or removing objects (e.g., spent items, used items/quantities, expired items/objects, etc.) from the inventory. Here, the user may provide a user input associated with modifying one or more objects of the dynamic object inventory element 1802. In this regard, the user may provide textual input (e.g., by typing), voice commands, etc.

In some embodiments, the interface 1800 is structured to allow the user to select a particular object (or multiple objects) from the dynamic object inventory element 1802, and subsequently display one or more recipes that utilize the selected object (or multiple objects). Here, the interface 1800 may further allow the user to schedule a date/time for preparation of the recipe (e.g., by linking to interface 2000), or prepare the recipe right away (e.g., by linking to interface 2200). In some embodiments, the interface 1800 is structured to allow the user to select a particular object (or multiple objects) from the dynamic object inventory element 1802, and subsequently add the selected object to a grocery list 1804 (e.g., a shopping list). In some embodiments, the interface 1800 is structured to allow the user to select a particular object (or multiple objects) from the dynamic object inventory element 1802, and put the object on hold for preparation of a particular recipe at a later date or time.

In some embodiments, the interface 1800 may display one or more recipes that the user may prepare using the one or more items on hand as indicated by the dynamic object inventory element 1802. In some embodiments, the interface 1800 may display one or more recipes that the user may prepare using the one or more items on hand that are associated with or located at the user's pantry. In some embodiments, the interface 1800 may display one or more recipes that the user may prepare using the one or more items on hand that are associated with or located at the user's freezer. In some embodiments, the interface 1800 may display one or more recipes that the user may prepare using the one or more items on hand that are associated with or located at another specified location.

In some embodiments, the interface 1800 is structured to allow the user to add or select a particular object from the dynamic object inventory element 1802 and display available and suitable auxiliary devices to contain, accommodate, or otherwise associated with the object. Here, the interface 1800 may display (i) available and (ii) suitable auxiliary device such as connected weight measurement devices 108 to place the object on (e.g., for objects such as milk, objects structured for multiple use, objects with whole packaging etc.), smart container devices 110 to place the object within (e.g., for objects such as flour, sugar, etc., objects structured for multiple use, objects without packaging etc.), smart coin device(s) 112 to be coupled to the objects themselves or containers or packaging of the objects, etc. (e.g., for objects such as produce, perishable objects, etc.) The interface 1800 may then allow the user to select a particular auxiliary device, and guide the user in associating and/or coupling the selected auxiliary device with the object and placing/positioning of the coupled auxiliary device-object pair. The interface 1800 may then display all of such coupled auxiliary device-object pairs at the device-object pair element 1808 of the dynamic object inventory element 1802. The interface 1800 may then update the device-object pair element 1808 with real-time characteristics of the auxiliary device-object pairs, such as quantity of object available (e.g., % of occupation or fullness for smart container devices 110, current weight of the object for connected weight measurement devices 108, days to expiration timers for smart coin device(s) 112), expiration dates (e.g., color-coded expiration indicators), etc. Based on determining that the quantity of object available for a particular object is below a particular threshold, the system may automatically notify the user via the interface 1800 and/or add the object to the shopping list 1804.

In some embodiments, the interface 1800 may display one or more items that are set to expire within a predetermined time interval (or already expired) at the dynamic expiration indicator element 1810 of the dynamic object inventory element 1802. The interface 1800 may then update the dynamic expiration indicator element 1810 with real-time expiration characteristics of the items. The dynamic expiration indicator element 1810 may also allow for the user to select one or more displayed items and add them to the shopping list 1804. The dynamic expiration indicator element 1810 may also allow for the user to swap one or more expired objects in recipes with other non-expired objects.

In some embodiments, the system may automatically construct the shopping list 1804 for the user as described previously, and or allow for the user to add one or more objects to the shopping list 1804 (in a similar manner to adding objects to the dynamic object inventory element 1802). In some embodiments, the system may automatically add commonly used/bought items/objects by the user to the shopping list 1804 based on analyzing historical user purchases, historical purchase frequency, historical consumption rate, offers/rebates on items being offered by stores, etc. Moreover, the system may allow for the shopping list 1804 to be shared with other users, designate a particular user for purchasing the objects/items, and/or may automatically transmit notifications to the users when the purchase of objects within the shopping list 1804 commences. In some embodiments, the system may also automatically add a grocery shopping trip to a calendar of the user (e.g., at interface 2000) associated with the shopping list 1804. In some embodiments, the system may allow the user to assign a budget associated with the shopping list 1804. In some embodiments, the system may also automatically initiate a delivery order associated with the shopping list 1804. In some embodiments, the system may automatically initiate a presentation of the shopping list 1804, in response to determining that the user is currently located proximate a geographic location of a grocery store.

Figure 19:
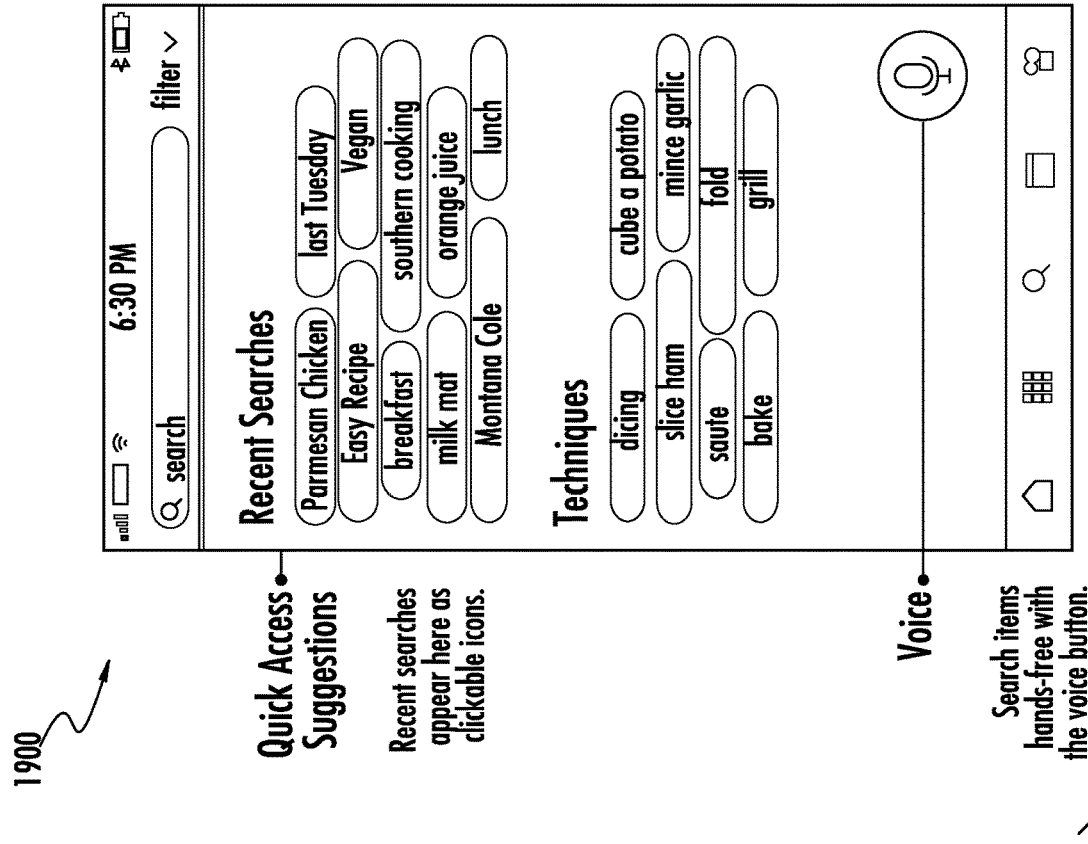

FIG. 19 illustrates an interface 1900 of the integrated object management user application 27, in accordance with some embodiments of the invention. Interface 1900 comprises quick access recipes, hands-free voice search, and saved recipes features of the integrated object management user application 27. The interface 1900 is structured to allow the user to search for one or more recipes (e.g., based on voice commands, text input, etc.), view recommended recipes, view go-to recipes (e.g., recipes flagged as favorites by the user), etc.

In some embodiments, the interface 1900 is structured for allowing the user to search for recipes or request to view recipes. In this regard, the interface 1900 is structured to allow the user to search a global recipe database by providing a user request input, following which the system may determine one or more keywords (e.g., entree, sides, desserts, dinner, lunch, user skill level, preparation time, week/day/time that the recipe is likely to be prepared, request to utilize items/objects whose expiration is imminent, number of ingredients, etc.) associated with the user request input. The system may then analyze corresponding keywords of a global plurality of recipes to identify a first plurality of recipes that match the one or more keywords. Here, the one or more keywords may be associated with meal type (e.g., lunch, dinner, breakfast, etc.), preparation time (e.g., under 30 minutes, 15-30 minutes, about 1 hour, etc.), number of ingredients, type of cuisine, scheduled meal preparation time interval (between 6 PM to 8 PM on a particular day), required ingredient, recipe type (e.g., entree, sides, desserts), user rating (e.g., prior user rating of 4 stars or above), skill level (e.g., beginner, advanced, etc.), recipe nutrition information (e.g., % daily value of a particular macro nutrient or micro nutrient), user health information (e.g., allergies, predetermined required calorie intake, etc.), preparation technique (e.g., dicing, grilling, baking, etc.), number of servings, dietary preference, and/or the like. The determined first plurality of recipes that correspond to the user request input may then may be presented on the interface 1900. The user may then select one or more recipes from the displayed first plurality of recipes for preparation, either right away or for a future time. In some embodiments, the interface 1900 is structured to allow the user to add tags (e.g., custom keywords) to the displayed recipes such as healthy, quick, etc.

In some embodiments, the system may automatically determine and display nutritional information associated with a particular recipe or meal. In some embodiments, the system may automatically determine and display supplementary items/objects (e.g., recommended wine pairing) that are associated with or are suitable for consumption along with a particular recipe or meal.

In some embodiments, in response to determining that one or more ingredients of a recipe selected by the user are not included in the inventory, the system may automatically add the missing ingredients to the shopping list. In some embodiments, in response to determining that one or more ingredients of a recipe selected by the user are not included in the inventory, the system may allow the user to swap the missing ingredients with other available objects from the inventory.

Figure 20:
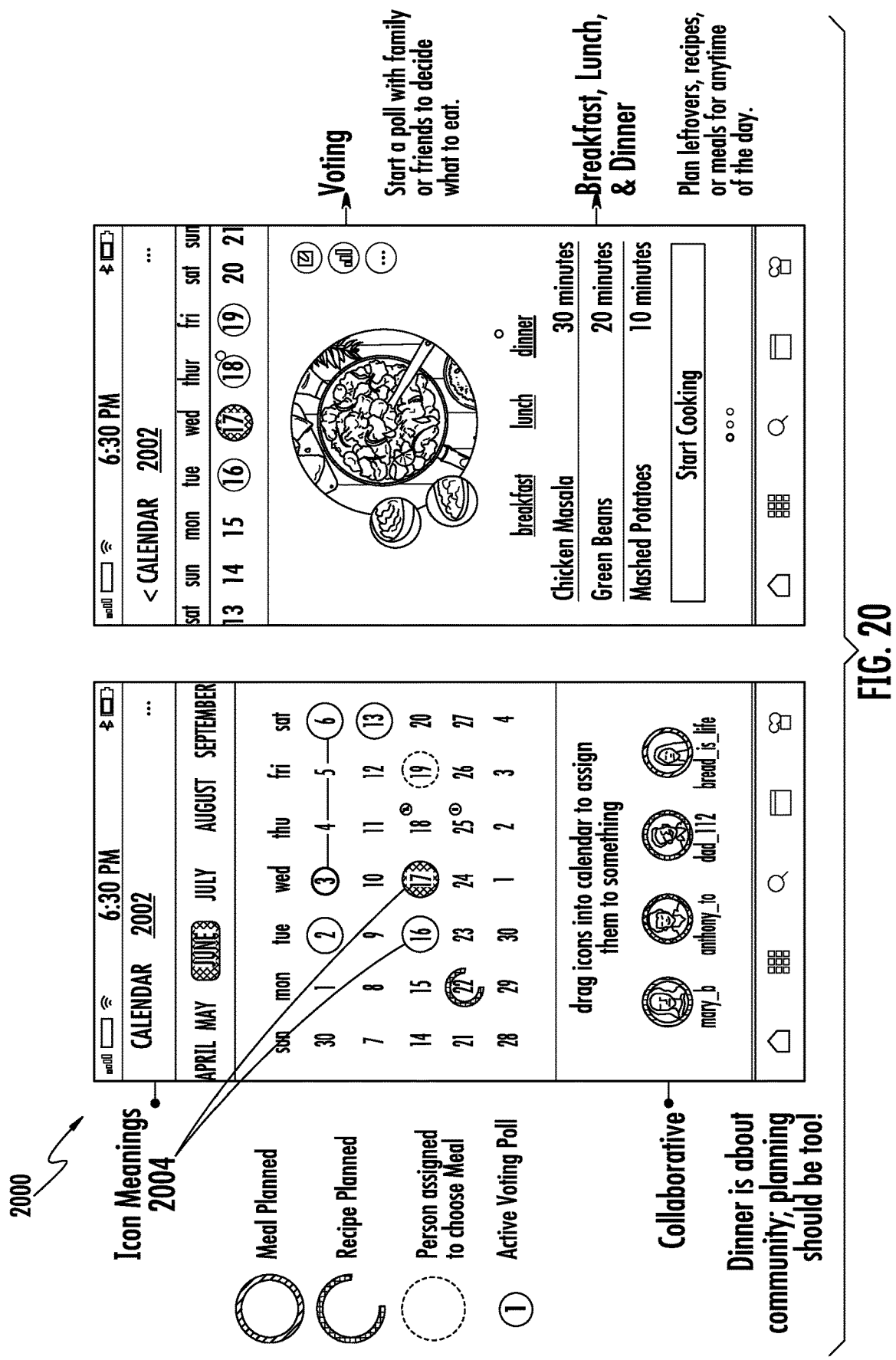

FIG. 20 illustrates an interface 2000 of the integrated object management user application 27, in accordance with some embodiments of the invention. Interface 2000 comprises recipe planning/calendar, social media/collaboration with multiple users, recipe polls, and leftover planning features of the integrated object management user application 27. As illustrated, the interface 2000 may comprise an interactive calendar plan element 2002, which is structured for temporal organization and display of recipes and meals selected and/or scheduled by the user. The interactive calendar plan element 2002 may overlay a variety of icon elements 2004 proximate corresponding temporal elements (e.g., date, day, time, month, etc.) indicating the recipe events (e.g., meal planned, recipe planned, particular user assigned to choose the meal, active voting poll events, etc.) associated with the particular temporal element, as illustrated by FIG. 20. Moreover, the system may transmit and present notifications (e.g., reminders, alerts, etc.) to the user, via the interactive calendar plan element 2002, at a predetermined time and frequency prior to the respective meal event. For instance, the notification may indicate an upcoming meal event such as a scheduled recipe, pre-preparation (e.g., soaking) steps to be performed prior to the scheduled day/time period of the recipe, grocery shopping to be performed, etc. The interactive calendar plan element 2002 is typically structured such that, the user may add recipe events to the interactive calendar plan element 2002, from any of the interfaces 100B-1900 and 2100-2400.

In some embodiments, the interface 2000 is structured for allowing the user to select a meal or recipe, and subsequently, send invitation notifications to other users inviting them to vote on the selected meal or recipe. In some embodiments, the interface 2000 is also structured for allowing the user and/or the other invited user to edit the meal or recipe, thereby providing a collaborative platform for meal planning, in real time. In some embodiments, the system may retrieve user events from other calendars of the user, from user electronic communications, etc., and embed/insert the events into the interactive calendar plan element 2002, as well.

Moreover, in some embodiments, the system may further generate a meal plan for one or more days (or other temporal elements such as one or more weeks, months etc.) based on user inventory and update the interactive calendar plan element 2002 with the generated meal plan based on the scheduled time for the meal plan. In some embodiments, the system may also allow the user to specify recurring meals and/or recipes that are repeated periodically (e.g., every week, every 10$^{th}$ day, etc.). In some embodiments, the system may determine meal preparation elements for a particular recipe or meal and also populate them at the interactive calendar plan element 2002. For example, the system may determine that a recipe scheduled for day 4 requires pre-preparation steps (e.g., soaking of certain ingredients) on the previous day 3. In this regard, the system may include a meal event of pre-preparation and the corresponding detailed steps and ingredients at day 3 on the interactive calendar plan element 2002. In some embodiments, the system may allow the user to schedule consumption of left overs from already prepared meals to a particular day or time via the interactive calendar plan element 2002.

In some embodiments, based on determining that no meals or recipes are currently scheduled for a particular temporal element such as a week, upcoming 10 days, etc., the system may present a notification to the user via the interactive calendar plan element 2002 to add meals or recipes for the particular temporal element. In some embodiments, the system may allow the user to schedule a particular day or time for grocery shopping via the interactive calendar plan element 2002. In some embodiments, the system may also allow the user to designate person(s) preparing the meals, conducting grocery shopping, etc.

Figure 21:
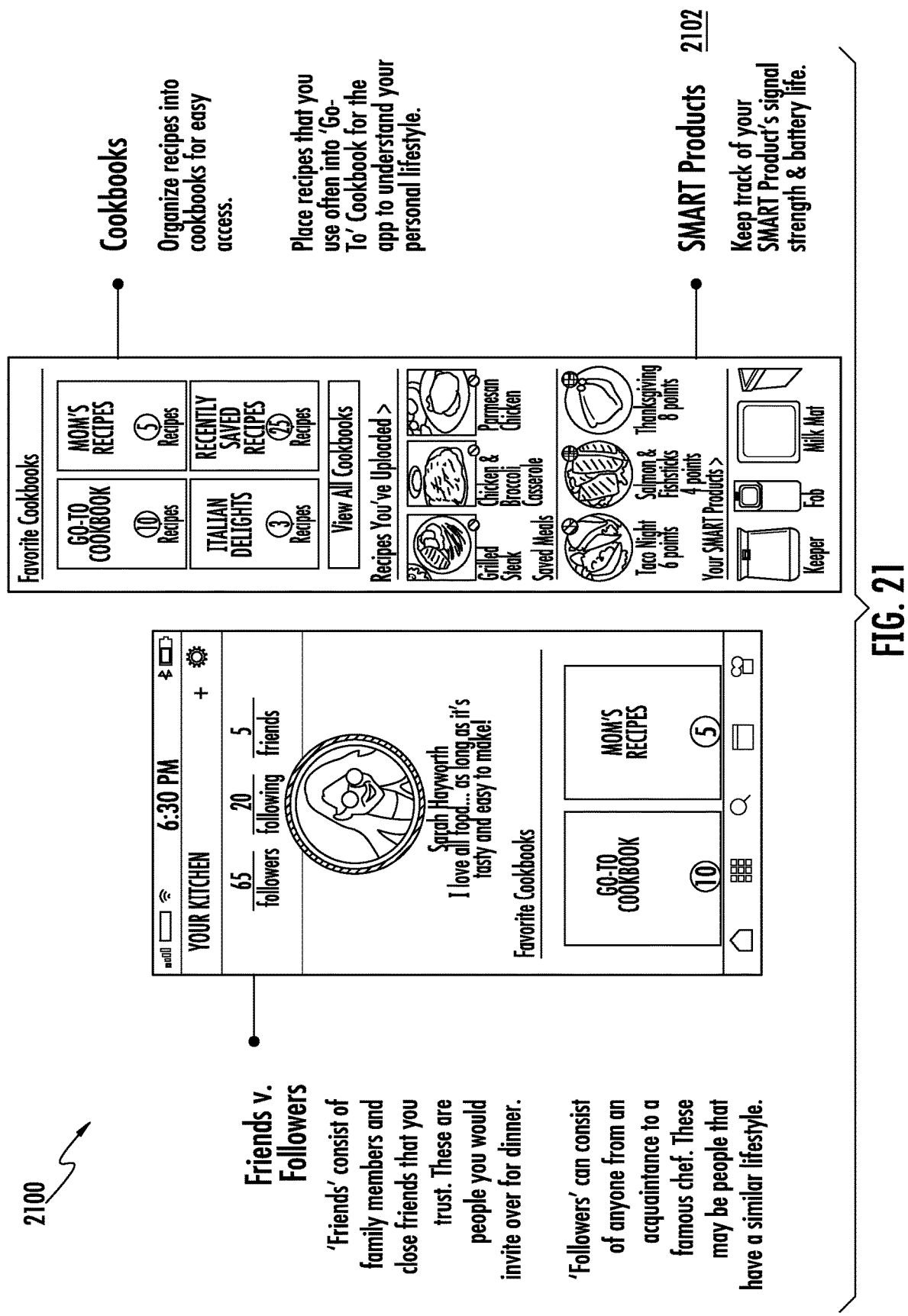

FIG. 21 illustrates an interface 2100 of the integrated object management user application 27, in accordance with some embodiments of the invention. Interface 2100 comprises social aspect that allows a user's friends and family to jointly plan meals, manage inventory, create and use shopping lists, etc., cookbook features, and auxiliary device tracking features of the integrated object management user application 27. In some embodiments, the interface 2100 is structured to allow the user to correlate and share user recipes and meals with other users, track meals with other users, form user groups, designate user groups as public, private etc. In some embodiments, the interface 2100 is structured to allow the user to connect with contacts, send invites or messages, invite contacts to meals (e.g., via direct messaging, group chat, text messages, etc.), borrow and give objects/items, view past inventory activities/transactions, newsfeeds of other users, view inventories of other users, suggest a group meal or recipe for the day, map recipes with recent meals of contacts, add recipes to cookbook, post created meal plan, post recipe pictures, receive comments/suggestions from other users, view how-to recipe preparation videos, and/or the like.

The interface 2100 is also structured to allow the user to track and monitor objects and the associated auxiliary devices at tracking element 2102. The interface 2100 is structured display, in real-time, objects of the inventory and auxiliary devices that contain, accommodate, or that are otherwise associated with the objects (connected weight measurement devices 108 having objects based upon them, smart container devices 110 having objects within, smart coin device(s) 112 coupled to the objects, etc.). As such, tracking element 2102 may display all of such coupled auxiliary device-object pairs, and allow the user to (i) select an object to view its corresponding auxiliary device, its location, its picture, etc., and/or (ii) select auxiliary device to view the corresponding object its location, its picture, etc. The interface 2100 may update the device-object pairs displayed at the tracking element 2102 with real-time characteristics of the auxiliary device-object pairs, such as quantity of object available (e.g., % of occupation or fullness for smart container devices 110, current weight of the object for connected weight measurement devices 108, days to expiration timers for smart coin device(s) 112), expiration dates (e.g., color-coded expiration indicators), etc.

The interface 2100 is also structured to allow the user to input user preferences, allergies, dislikes, etc., and also preferences, allergies, dislikes of other related users (e.g., persons in the user's family).

Figure 22:
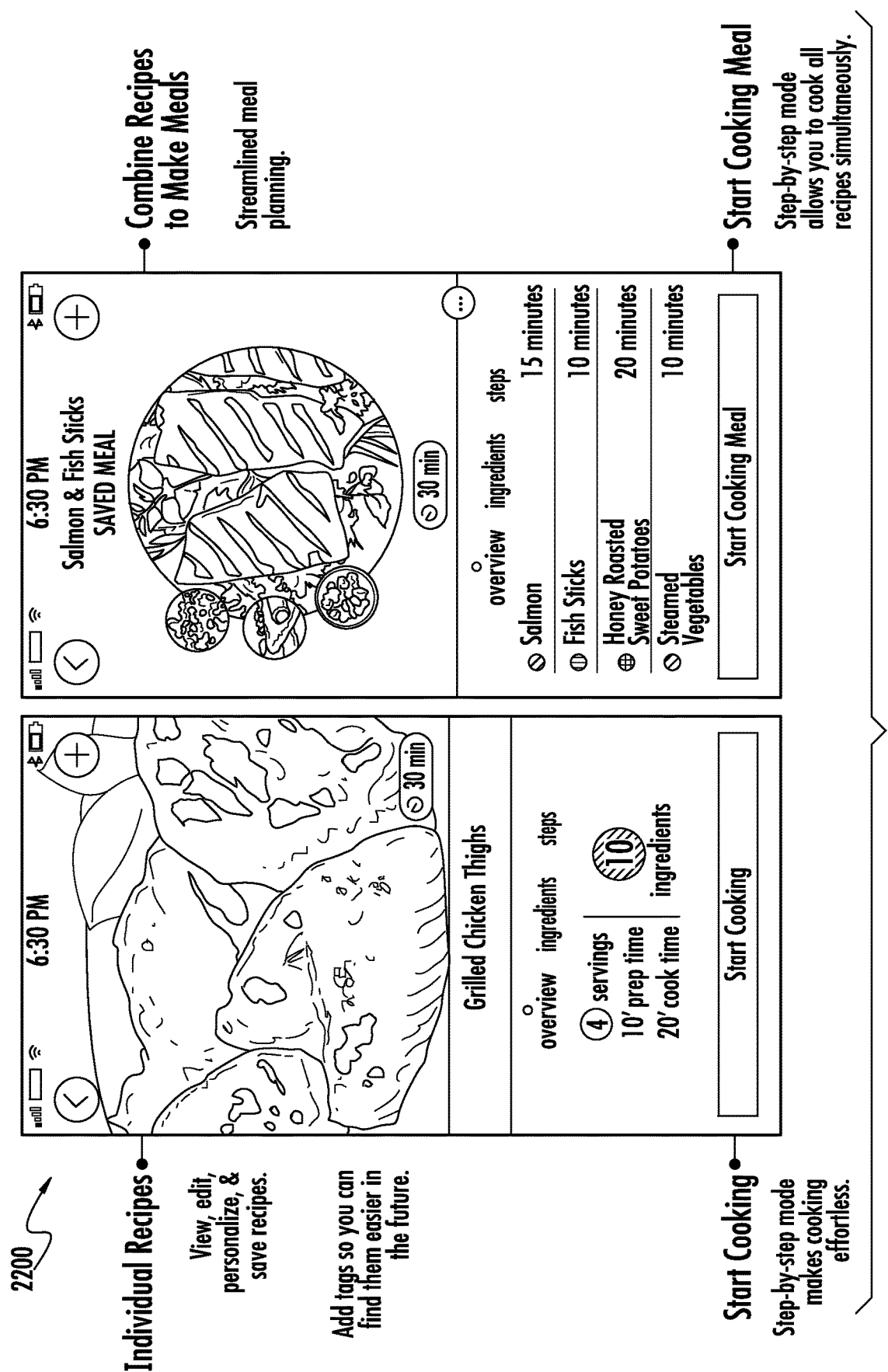

FIG. 22 illustrates an interface 2200 of the integrated object management user application 27, in accordance with some embodiments of the invention. Interface 2200 comprises recipe personalization/editing, step-by-step guided cooking, combination of recipes to create meals for streamlined meal planning features of the integrated object management user application 27.

In some embodiments, the interface 2200 is structured for allowing the user to create meals. In this regard, the interface 2200 is structured to allow the user to search recipe types (e.g., entree, sides, desserts, etc.) by providing a user request input, following which the system may determine one or more keywords (e.g., entree, sides, desserts, dinner, lunch, user skill level, preparation time, week/day/time that the recipe is likely to be prepared, etc.) associated with the user request input. The system may then analyze corresponding keywords of a global plurality of recipes to identify a first plurality of recipes that match the one or more keywords. Here, the one or more keywords may be associated with meal type (e.g., lunch, dinner, breakfast, etc.), preparation time (e.g., under 30 minutes, 15-30 minutes, about 1 hour, etc.), number of ingredients, type of cuisine, scheduled meal preparation time interval (between 6 PM to 8 PM on a particular day), required ingredient, recipe type (e.g., entree, sides, desserts), user rating (e.g., prior user rating of 4 stars or above), skill level (e.g., beginner, advanced, etc.), recipe nutrition information (e.g., % daily value of a particular macro nutrient or micro nutrient), and/or user health information (e.g., allergies, predetermined required calorie intake, etc.). The determined first plurality of recipes that correspond to the user request input may then may be presented on the interface 2200. The user may then select one or more recipes from the displayed first plurality of recipes to construct a meal and may also schedule a time for preparation of the meal. For example, the user may select a first recipe for a particular entree, a second recipe for a particular side, and the third recipe for a particular dessert to construct a meal having the first, second and third recipes. Here, the system may analyze the first, second and third recipes, and dynamically match and reorder the steps of each of the recipes such that when the user is preparing the meal: (i) like steps are performed together, (ii) like ingredients are prepared together, (iii) total meal preparation time is minimized (e.g., such that sum of individual preparation times of the first, second and third recipes is greater than the preparation time for the meal), (iv) waste is minimized, (v) leftovers are minimized, (vi) a maximum quantities of objects/items from the user's pantry are utilized, and/or the like.

In some embodiments, the interface 2200 is structured for guided cooking to facilitate preparation of one or more recipes or meals by the user. In some embodiments, the interface 2200 may present detailed steps for preparing the recipes. Here, the preparation steps may be presented in a suitable preparation order. In some embodiments, the system tracks the user's progress in completing a first preparation step, and automatically presents a second preparation step in response to determining that the user has completed the first preparation step. Moreover, the system may present one or more timers indicating the time elapsed, time for performing a particular step, etc. In some embodiments, each preparation step may be accompanied with pictures, videos, voiceover, etc., for demonstrating the preparation step. In some embodiments, prior to commencing the preparation of the recipe (at a predetermined time interval preceding the start of recipe preparation), the system may present notifications via the interface 2200 guiding the user to perform certain pre-preparation steps (e.g., pre-heating the oven, ingredient preparation steps, etc.). In some embodiments, the user may dynamically adjust the quantities, number of servings, etc. of the recipe, prior to or during preparation. In some embodiments, the system may also present cleaning steps and suggestions.

FIG. 23 illustrates an interface 2300 of the integrated object management user application 27, in accordance with some embodiments of the invention. Interface 2300 comprises notifications, social alerts, and dynamic inventory updates features of the integrated object management user application 27. The interface 2300 is structured to display real-time notifications associated with reminders to being meal or recipe preparation, social alerts, expiration of items/objects, items to be shopped, alerts indicating abnormal conditions (e.g., based on the smart fob device 106), object/items that are running low, and/or the like.

Figure 24:
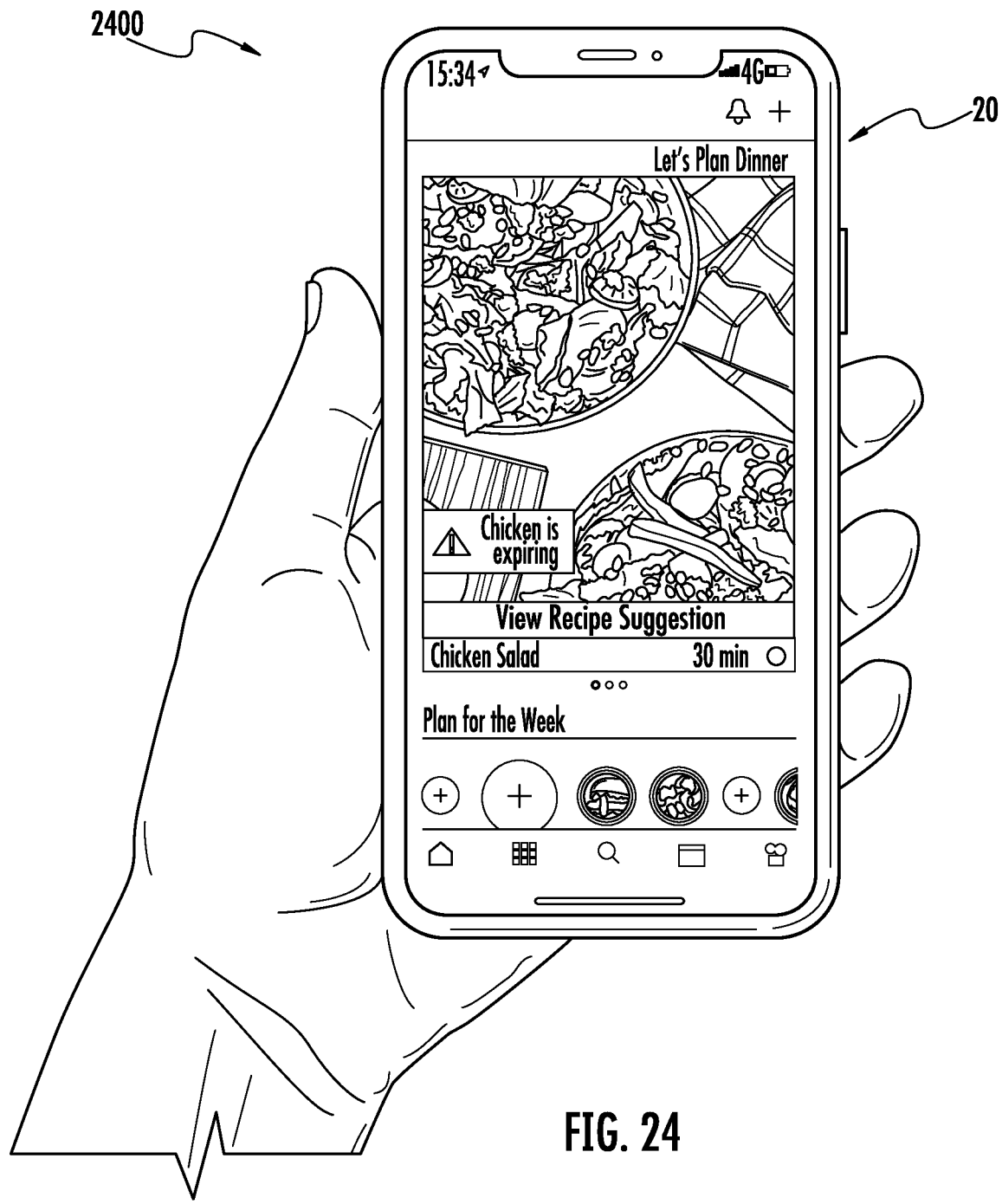

FIG. 24 illustrates an interface 2400 of the integrated object management user application 27 displayed on the user device 20, in accordance with some embodiments of the invention. Interface 2400 comprises a recipe suggestion feature based on items that will be expiring soon.

Typically, the user may be required to authenticate identity for access to an application or device, or for access to a particular feature, function or action of an application or device. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

FIG. 25 illustrates a high level process flow 2500 for integrated device connectivity and agile device control for dynamic object tracking and management, in accordance with some embodiments of the invention. In some embodiments, some or all of the steps associated with integrated device connectivity and agile device control for dynamic object tracking and management, described below, are performed by the device system 10 (referred to as "the system"). Here, specifically, the steps may be performed by the processing component 14, also referred to as at least one processing device 14) in response to executing computer readable/executable instructions stored at the memory component 16, and via utilizing the communication component 12 (communication device 12). Moreover, the device system 10, via the communication component 12, is typically in (i) operative communication with a first local communication network (e.g., network 1) via a central network device 102 of the first local communication network (e.g., network 1), wherein the first local communication network (e.g., network 1) further comprises one or more auxiliary devices (e.g., devices 104-118), and (ii) operative communication with and connected to a second network (e.g., network 2). In some embodiments, some or all of the steps associated with integrated device connectivity and agile device control for dynamic object tracking and management, described below, are performed by the entity system 30. In some embodiments the entity system and the device system may refer to the same system. As discussed previously, a user is typically associated with a user device 20 (e.g., a smartphone, a mobile device, a computer, etc.). In some embodiments, the high level process flow 2500 may be implemented as a computerized method by the processing component 14. In some embodiments, the high level process flow 2500 may be implemented a computer program product, based on executing computer executable instructions stored in a non-transitory memory (e.g., memory component 16).

As described previously with respect to FIG. 1, in accordance with some embodiments of the present invention, one or more device systems 10 (e.g., associated with appliance manufacturers, manufacturers or providers of devices 50) are operatively coupled, via a network 2, to one or more user computer systems 20, one or more entity systems 30 (e.g., associated with appliance manufacturers, manufacturers or providers of devices 50), one or more other systems 40 (e.g., third party systems), and/or one or more devices 50. In this way, the user 4 (or one or more customers of the entity, device systems, entity systems, and/or the like) may allow the device application 17 to take actions and/or utilize the device application 17 to communicate with (e.g., send or receive data from, control, or the like) the user application 27 and/or devices 50 associated with the user 4. The device application 17 may utilize the network 2 to communicate with applications 27 on the user computer systems 20, financial applications on the entity systems 30, other applications on other systems, or specific devices 50. In this way, the system establishes a first type of operative communication, via the second network (e.g., network 2), with the central network device 102 of first local communication network (e.g., network 1), as indicated by block 2510.

As described previously with respect to FIG. 2, the plurality of devices 50 are typically configured for communication via a network 1 (e.g., a communication network different from the network 2, such as a specific home communication network implemented by the invention that utilizes sub-gigahertz protocols). In some embodiments of the invention, the network 1 is associated with a sub-gigahertz communication protocol. The plurality of devices 50 typically comprise: (i) at least one central network device 102 (also referred to as a "central hub device 102") and/or (ii) one or more auxiliary devices (e.g., devices 104-118). In some embodiments, the auxiliary devices 50 are configured to communicate with the device system 10 (and/or user computer systems 20, and entity systems 30), via the central network device 102 of the plurality of devices 50. Specifically, each auxiliary device of the one or more auxiliary devices is typically configured for communication with the central network device 102 via the network 1, while the central network device 102 is in turn configured for communication with the device system 10 and/or the user device 20 through a communication device of the central network device 102, via the network 2. In some embodiments, the auxiliary devices (e.g., devices 104-119) typically comprise a full suite of kitchen inventory management tools that will also utilize the sub-gigahertz communication protocol. In this way, the system establishes an additional second type of operative communication, via the central network device 102 of the first local communication network (e.g., network 1), with the one or more auxiliary devices (e.g., devices 104-118) of the first local communication network (e.g., network 1), as indicated by block 2510.

In some embodiments, each of the auxiliary devices comprise (i) one or more sensors for sensing at least one parameter associated with the objects or for sensing at least one parameter associated with an appliance of the user, and (ii) a communication device configured for establishing operative communication with the central network device 102 of the plurality of devices 50 via the network 1, as described previously. As such, the one or more auxiliary devices may comprise one or more of (i) a smart camera device 104, (ii) a smart fob device 106, (iii) a connected weight measurement device 108, (iv) a smart container device 110, (v) a smart coin device 112, (vi) a smart wand device 114, (vii) a smart countertop device 116, (viii) a smart dongle device 118, and/or other devices 50. In some embodiments, the one or more auxiliary devices may further comprise one or more dynamic inventory display devices 119.

Next, as indicated by block 2520, the system typically receives, via the second network (e.g., network 2), device data from the central network device 102. Typically, the device data comprises one or more parameters sensed by the one or more auxiliary devices (e.g., devices 104-118) of the first local communication network (e.g., network 1). The device data may refer to raw sensor signals/data (e.g., electrical signals), object data (determined based on processing sensor signals, such as measured weight, measured temperature, determined quantity/volume, determined ambient light, timer value, etc.), and/or the like. The term "object" as used herein may refer to food items, produce items, perishable items, groceries, pantry items, consumable items, products, meals, nutritious substances, commodities, and/or other substances or objects associated with a user, in accordance with some embodiments. In some embodiments, the term "object" relates items that are configured for consumption by the user (e.g., food items such as produce items, perishable items, groceries, consumable items, products, meals, nutritious substances, medication, pantry items, etc.), such that consumption of the objects may result in depletion or reduction in the quantity/inventory of the object. Here, the objects that are configured for consumption by the user, are typically associated with an expiration date (or time interval) or use-by date (or time interval). That said, in some embodiments, the term "object" relates items that are configured for utilization by the user, such that utilization of the objects may result in depletion or reduction in the quantity/inventory of the object (e.g., household consumable items such as products, detergents, etc.), and/or such that utilization of the objects does not typically result in substantial depletion or reduction in the quantity/inventory of the object (e.g., non-consumable items such as household articles, kitchen tools/utensils, etc.). It is noted that the one or more objects may indicate (i) one or more different types of items, and/or (ii) one or more count (discrete indivisible quantity) of a particular type of item.

As non-limiting examples of device data transmitted by auxiliary devices, the one or more smart camera devices 104 may transmit device data in the form of captured image data of the one or more objects placed in its corresponding capture region/area. The one or more smart fob devices 106 may transmit device data in the form of captured ambient temperature data, ambient humidity data, ambient light data and/or ambient volatile organic content data associated with an enclosed space (e.g., refrigerator) having the one or more objects placed in the corresponding capture region/area of the fob device(s) 106. Similarly, the one or more connected weight measurement devices 108 may transmit device data in the form of sensed weight data associated with the one or more objects placed thereon (placed within a corresponding capture region/area atop the device(s) 108). The one or more smart container devices 110 may transmit device data in the form of measured quantity data (e.g., volume) associated with the one or more objects placed within (placed within the enclosed space of the container devices 110, i.e., its capture region/area). The one or more smart coin devices 112 may transmit device data in the form of tracked expiration data, timer data, etc. associated with the one or more objects. The one or more smart wand devices 114 may transmit device data in the form of image item data scanned from the one or more objects (the image item data may comprise spectroscopy data and/or machine-readable optical label data (e.g., QR code, Barcode, etc.), and/or the like) placed in its corresponding capture region/area. Similarly, the one or more smart countertop devices 116 may transmit device data in the form of captured image data, weight data and quantity data associated with the one or more objects placed in the vicinity/capture region/area.

As described previously, the device data is typically transmitted to the central network device 102 by the one or more auxiliary devices (e.g., devices 104-118) of the first local communication network (e.g., network 1). Upon receipt of the device data, the system may also transmit, via the second network (e.g., network 2), the received device data to the user device for presentation of the device data on the integrated object management user application interface of the user device (e.g., as described previously with respect to interfaces 1600-1800, 2100, 2300, etc.).

Here, in some embodiments, the device data is transmitted by the one or more auxiliary devices (e.g., devices 104-118) automatically and in real time upon identifying a change in the device data (e.g., referred to as updated device data). In some embodiments, the device data is transmitted by the one or more auxiliary devices (e.g., devices 104-118) periodically, e.g., automatically in response to elapse of a predetermined time interval after the prior transmission time. In some embodiments, the device data is transmitted by the one or more auxiliary devices (e.g., devices 104-118) in response to a receiving a request for updated device data from the system.

In some embodiments, the invention is structured for dynamically (temporarily and/or permanently) optimizing communication transmission in accordance with current conditions for individual auxiliary devices without requiring global changes to the network (e.g., as described previously with respect to FIGS. 12-13B). Specifically, for instance, a first auxiliary device and a second auxiliary device of the one or more auxiliary devices (e.g., devices 104-118) may be typically structured to transmit first device data via a first communication channel having a first frequency range. In response to encountering a trigger condition such as (i) lack of receipt of a response signal transmitted by the central network device 102 at the first auxiliary device, and/or (ii) the first auxiliary device being in an enclosed location (e.g., within the refrigerator or freezer), the first auxiliary device may automatically switch to a second communication channel having a second frequency range lower than the first frequency range (e.g., until the trigger condition remains active after which it may revert back to the first communication channel). The system may then receive the first device data from the first auxiliary device via the second communication channel having the second frequency range, and the second device data from the second auxiliary device via the first communication channel having the first frequency range.

As another instance, a first auxiliary device and a second auxiliary device of the one or more auxiliary devices (e.g., devices 104-118) may be typically structured to transmit first device data via a first communication channel having a first frequency range. In response to encountering a trigger condition such as having to transmit the first device data having a payload size greater than a predetermined threshold, the first auxiliary device may automatically switch to a second communication channel having a second frequency range higher than the first frequency range (e.g., until the trigger condition remains active (until the data transmission is completed) after which it may revert back to the first communication channel). The system may then receive the first device data from the first auxiliary device via the second communication channel having the second frequency range, and the second device data from the second auxiliary device via the first communication channel having the first frequency range.

As described above and illustrated by block 2530, in response to receiving the device data, the system typically constructs a dynamic object inventory based on at least the device data, wherein the dynamic object inventory is associated with one or more objects associated with a user. The dynamic object inventory may also be referred to as an inventory or an user inventory. The dynamic object inventory of the user's current one or more objects may similar to the inventor described with respect to dynamic object inventory element 1802 of interface 1800. The dynamic object inventory may be constructed based on device data, user input data, data retrieved from user electronic communications, data retrieved from user purchase receipts, and/or the like.

The dynamic object inventory may comprise the list of the one or more objects correlated with current information associated with the objects (e.g., quantity, expiration date, associated recipes, purchase date, associated auxiliary device (pair), current location, user defined swap objects, scheduled recipe events in the user's calendar, etc.). In some embodiments, the system may dynamically activate and utilize multiple auxiliary devices and/or user input for (i) identifying the object and (ii) determining its characteristics (e.g., quantity). For instance, the system may receive first device data from a first auxiliary device (e.g., smart camera devices 104, smart wand devices 114, smart countertop devices 116, etc.), via the second network (e.g., network 2) and central network device 102. The system may analyze the first device data to determine that the first device data is associated with a first object of the one or more objects and hence identify the first object (e.g., "milk", "apple", etc.). Alternatively, the user may input the identifying information for the object. The system may also receive second device data from a second auxiliary device (e.g., smart fob devices 106, connected weight measurement devices 108, container devices 110, smart countertop devices 116, etc.). The system may analyze the second device data to determine that the second device data is also associated with the first object (e.g., "milk", "apple", etc.) and that based on the second device data determine its characteristics (e.g., quantity such as "1 gallon of milk", "5 apples," etc.).

In some embodiments, the system may initially construct the dynamic object inventory at a first time including one or more objects associated with the user at the first time. In response to receiving the device data from an auxiliary device at a second time after the first time, the system may determine whether the device data indicates any change in the information/state of the objects. In this regard, the system may determine at least one of (i) addition of a new object to the one or more objects associated with the user, (ii) removal of an object from the one or more objects associated with the user, (iii) use of an object of the one or more objects by the user, (iv) change in quantity of an object of the one or more objects, (v) change in location of an object of the one or more objects, and/or the like, to determine that the status/information of the object has changed. In response to determining that the received device data indicates updates/changes to the information/state of the objects, the system modify the dynamic object inventory, in real-time, with the current object information as of the second time.

In some embodiments, prior to or during the construction of the dynamic object inventory, the system may transmit, via the second network (e.g., network 2) and the central network device 102, a control signal to the one or more auxiliary devices (e.g., devices 104-118) requesting the updated device data reflecting the most recent information associated with the objects.

In some embodiments, the system may construct the dynamic object inventory based on receiving user device data from the user device, such as (i) data input by the user at the integrated object management user application interface, (ii) image data captured by a visual capture device of the user device, (iii) data retrieved from a user electronic communication application (e.g., email inbox) of the user device, and/or the like.

In some embodiments, the system may determine a location for each of the one or more objects. Here the system may determine that the first device data from a first auxiliary device is associated with a first object. The system may that the first auxiliary device is associated with a first location (e.g., user's kitchen, pantry, freezer, refrigerator, shelf number 5, over the counter, etc.). The system may then associate the first object with the first location. In addition, the system may dynamically track movement of the objects from one location to another. Here, the system may receive second device data from a second auxiliary device. The system may then determine that the second device data is associated with the first object, and also determine its location (e.g., second location). In response the system may modify/update the dynamic object inventory such that the dynamic object inventory associates the first object with the second location, in real-time.

Moreover, the system may automatically and in real time update the dynamic object inventory in response to determining that one or more of the objects have expired or are set to expire within a subsequent time interval. Here, the system may identify an expiration date associated with each of the one or more objects. In response to determining that a first object of the one or more objects expires within a predetermined subsequent time interval, the system may modify, in real time, the dynamic object inventory such that the dynamic object inventory indicates that the first object expires within the predetermined subsequent time interval (e.g., as described previously with respect to interface 1800).

Subsequently, at block 2540, the system may generate a first recipe for the user based on the dynamic object inventory such that the dynamic object inventory of the user comprises at least one ingredient item associated with the first recipe. The system may generate the recipe either automatically or in response to receiving a user request (e.g., as described previously with respect to interfaces 1600-2400).

In some embodiments, the system may receive a user request input (e.g., recipe for dinner) associated with determining a recipe for the user. The system may then analyze a first plurality of recipes (e.g., recipes for dinner) associated with the user request input and identify, for each of the first plurality of recipes, one or more ingredient items. The system may then identify the first recipe (e.g., a dinner recipe for a dish "abcd") of the first plurality of recipes based on at least determining that the user's inventory contains least one object that is an ingredient item of the one or more ingredient items associated with the first recipe. Alternatively, the system mays elect the first recipe based on determining that the user's inventory contains a predetermined portion (50%, 100%, 90%, etc.) of ingredient items associated with the first recipe.

In some embodiments, as described previously, the system may determine one or more keywords associated with the user request input. The system may then identify the first plurality of recipes from a global plurality of recipes based on determining that the first plurality of recipes are associated with the one or more keywords. Typically, the one or more keywords are associated with meal type, preparation time, number of ingredients, type of cuisine, scheduled meal preparation time interval, required ingredient, recipe type, user rating, skill level, recipe nutrition information, user health information, and/or the like. In some embodiments, alternatively or in combination with the foregoing, the system may identify the first plurality of recipes from a global plurality of recipes based on determining that the first plurality of recipes are associated with (i) recipes previously prepared by the user, and/or (ii) recipes previously tagged by the user. In some embodiments, alternatively or in combination with the foregoing, the system may identify the first plurality of recipes from a global plurality of recipes based on determining that at least a portion of each of the first plurality of recipes matches that of (i) recipes previously prepared by the user, and/or (ii) recipes previously tagged by the user.

In some embodiments, the system ensures that the objects in the user's inventory that are ingredients for a particular recipe are not expired. Here, the system may identify the first recipe of the first plurality of recipes based on determining that an expiration date of the at least one object of the one or more objects that matches the at least one ingredient item, does not match a preparation time interval associated with the first recipe.

If one or more ingredients for a selected recipe are not available within the user's inventory, the system may automatically generate a shopping list comprising the one or more ingredient items of the first recipe not in the dynamic object inventory of the user.

Next, as indicated by block 2550, the system may transmit, via the second network (e.g., network 2), the generated first recipe to a user device associated with the user for presentation on an integrated object management user application interface of the user device. The recipe may then be displayed on the integrated object management user application interface, such as interfaces 1600-2400.

Here, in some embodiments, the system may present the recipe in the form of step-by-step guided cooking. The system may first identify one or more guided cooking steps associated with the first recipe. The system may then transmit, via the second network (e.g., network 2), a first guided cooking step of the one or more guided cooking steps to the user device for presentation on the integrated object management user application interface of the user device. The system may continually monitor the user's progress, e.g., via the smart countertop device 116. For instance, the system monitor, via the one or more auxiliary devices (e.g., devices 104-118) and/or the user device, user progress associated with the first guided cooking step. In response to determining that the first guided cooking step has been completed by the user, the system may then transmit, via the second network (e.g., network 2), a second guided cooking step of the one or more guided cooking steps to the user device for presentation on the integrated object management user application interface of the user device.

FIG. 26 illustrates a high level process flow 2600 for integrated device connectivity and agile device control for dynamic object tracking and management, in accordance with some embodiments of the invention. In some embodiments, some or all of the steps associated with integrated device connectivity and agile device control for dynamic object tracking and management, described below, are performed by the device system 10 (referred to as "the system"). In some embodiments, some or all of the steps associated with integrated device connectivity and agile device control for dynamic object tracking and management, described below, are performed by the entity system 30. In some embodiments the entity system and the device system may refer to the same system. As discussed previously, a user is typically associated with a user device 20 (e.g., a smartphone, a mobile device, a computer, etc.). In some embodiments, some or all of the steps associated with integrated device connectivity and agile device control for dynamic object tracking and management, described below, are performed by the user. In some embodiments, some or all of the steps associated with integrated device connectivity and agile device control for dynamic object tracking and management, described below, are performed by devices 50, one or more auxiliary devices (e.g., devices 104-118), and/or the like.

As indicated by block 2610, as a first step, the system and/or the user may establish operative communication between a device system of a second network (e.g., network 2) and one or more auxiliary devices (e.g., devices 104-118) of a first local communication network, via a central network device 102 of the first local communication network, as described previously.

Next, a sensor device of a first auxiliary device of the one or more auxiliary devices (e.g., devices 104-118) may capture device data associated with one or more objects associated with a user, as indicated by block 2620. Next, as indicated by block 2630, the auxiliary device may transmit via the central network device 102 and the second network (e.g., network 2), the device data to the device system.

As described above and illustrated by block 2640, a first recipe for may be presented on an integrated object management user application interface of the user device based on at least the device data associated with one or more objects.

Here, the user may place the one or more objects within a predetermined capture region associated with the first auxiliary device of the one or more auxiliary devices (e.g., devices 104-118). The user may then provide a user request input associated with determining the first recipe for the user. In response, the system may display a presentation of the first recipe on the integrated object management user application interface of the user device. The user may then select a first object of the one or more object associated with the first recipe, and prepare it according to the recipe steps. In this manner, the user may complete the first recipe using the first object of the one or more objects.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for integrated device connectivity and agile device control for dynamic object tracking and management, whereby the system provides a comprehensive integrated platform for dynamic food item identification, expiration tracking, dynamic inventory construction, recipe generation, interactive meal planning and guided cooking, in real-time, the system comprising:

at least one memory device;

at least one communication device in (i) operative communication with a first local communication network via a central network device of the first local communication network, wherein the first local communication network further comprises one or more auxiliary devices, and (ii) operative communication with and connected to a second network, wherein first device data is transmitted from a first auxiliary device via a first communication channel having a first frequency range, wherein the first auxiliary device is structured to automatically switch to a second communication channel having a second frequency range lower than the first frequency range in response to a trigger condition;

at least one processing device operatively coupled to the at least one memory device and the at least one communication device; and a module stored in the at least one memory device comprising executable instructions that when executed by the at least one processing device, cause the at least one processing device to:

establish (i) operative communication, via the second network, with the central network device of first local communication network, and (ii) operative communication, via the central network device of the first local communication network, with the one or more auxiliary devices of the first local communication network;

receive, via the second network, device data from the central network device, wherein the device data comprises one or more parameters sensed by the one or more auxiliary devices of the first local communication network, wherein the device data is transmitted to the central network device by the one or more auxiliary devices of the first local communication network, wherein receiving the device data further comprises:
  in response to the trigger condition comprising (i) lack of receipt of a response signal transmitted by the central network device at the first auxiliary device, and/or (ii) the first auxiliary device being in an enclosed location, receiving the first device data from the first auxiliary device via the second communication channel having the second frequency range; and
  receiving, by the first auxiliary device, the response signal from the central network device;
in response to receiving the device data, construct a dynamic object inventory based on at least the device data, wherein the dynamic object inventory is associated with one or more objects associated with a user;
generate a first recipe for the user based on the dynamic object inventory such that the dynamic object inventory of the user comprises at least one ingredient item associated with the first recipe; and
transmit, via the second network, the generated first recipe to a user device associated with the user for presentation on an integrated object management user application interface of the user device.

2. The system of claim 1, wherein constructing the dynamic object inventory further comprises:
  constructing the dynamic object inventory at a first time, wherein the dynamic object inventory is associated with one or more objects associated with the user at the first time;
  receiving at a second time after the first time, via the second network, updated device data from the central network device, wherein the updated device data comprises one or more updated parameters sensed by the one or more auxiliary devices; and
  in response to receiving the updated device data at the second time, in real time, modifying the dynamic object inventory based on at least the updated device data such that the dynamic object inventory is associated with one or more objects associated with the user at the second time.

3. The system of claim 2, wherein modifying the dynamic object inventory comprises identifying at least one of (i) addition of a new object to the one or more objects associated with the user, (ii) removal of an object from the one or more objects associated with the user, (iii) use of an object of the one or more objects by the user, (iv) change in quantity of an object of the one or more objects, and/or (v) change in location of an object of the one or more objects.

4. The system of claim 1, wherein receiving the device data further comprises, receiving the first device data from the first auxiliary device of the one or more auxiliary devices, via the second network and central network device, wherein constructing the dynamic object inventory further comprises:
  determining a first object associated with the first device data from the first auxiliary device;
  determining a first location associated with the first auxiliary device; and
  constructing the dynamic object inventory such that the dynamic object inventory associates the first object with the first location.

5. The system of claim 4, the module further comprises instructions that cause the at least one processing device to:
  receive second device data from a second auxiliary device of the one or more auxiliary devices, via the second network and central network device;
  determine that the second device data is associated with the first object;
  determine a second location associated with the second auxiliary device; and
  modify the dynamic object inventory such that the dynamic object inventory associates the first object with the second location.

6. The system of claim 1:
  wherein receiving the device data further comprises:
    receiving the first device data from the first auxiliary device of the one or more auxiliary devices, via the second network and central network device; and
    receiving second device data from a second auxiliary device of the one or more auxiliary devices, via the second network and central network device;
  wherein constructing the dynamic object inventory further comprises:
    analyzing the first device data to determine that the first device data is associated with a first object of the one or more objects;
    determining an identifying parameter associated with the first object based on the first device data;
    analyzing the second device data to determine that the second device data is associated with the first object of the one or more objects; and
    determining a quantity associated with the first object based on the second device data.

7. The system of claim 1, wherein the one or more auxiliary devices are selected from a group comprising:
  one or more smart camera devices structured for capturing image data associated with the one or more objects;
  one or more smart fob devices structured for capturing ambient temperature data, ambient humidity data, ambient light data and/or ambient volatile organic content data associated with the one or more objects;
  one or more connected weight measurement devices structured for capturing weight data associated with the one or more objects;
  one or more smart container devices structured for capturing quantity data associated with the one or more objects;
  one or more smart coin devices structured for tracking expiration data associated with the one or more objects;
  one or more smart wand devices structured for reading image item data associated with the one or more objects, wherein image item data comprises spectroscopy data and/or machine-readable optical label data; and
  one or more smart countertop devices structured for capturing image data, weight data and quantity data associated with the one or more objects.

8. The system of claim 1, wherein generating the first recipe for the user based on the dynamic object inventory further comprises:
  receiving, via the user device, a user request input associated with determining a recipe for the user;
  analyzing a first plurality of recipes associated with the user request input, wherein analyzing comprises identifying, for each of the first plurality of recipes, one or more ingredient items; and
  identifying the first recipe of the first plurality of recipes based on at least determining that at least one object of the one or more objects of the dynamic object inventory matches at least one ingredient item of the one or more ingredient items associated with the first recipe.

9. The system of claim 8, the module further comprises instructions that cause the at least one processing device to:
identify the first plurality of recipes from a global plurality of recipes based on determining that at least a portion of each of the first plurality of recipes matches that of (i) recipes previously prepared by the user, and/or (ii) recipes previously tagged by the user.

10. The system of claim 8, wherein identifying the first recipe of the first plurality of recipes further comprises determining that an expiration date of the at least one object of the one or more objects that matches the at least one ingredient item, does not match a preparation time interval associated with the first recipe.

11. The system of claim 1, wherein the module further comprises instructions that cause the at least one processing device to:
identify one or more guided cooking steps associated with the first recipe;
transmit, via the second network, a first guided cooking step of the one or more guided cooking steps to the user device for presentation on the integrated object management user application interface of the user device;
monitoring, via the one or more auxiliary devices and/or the user device, user progress associated with the first guided cooking step; and
in response to determining that the first guided cooking step has been completed, transmit, via the second network, a second guided cooking step of the one or more guided cooking steps to the user device for presentation on the integrated object management user application interface of the user device.

12. A method for integrated device connectivity and agile device control for dynamic object tracking and management, whereby the method provides for dynamic food item identification, expiration tracking, dynamic inventory construction, recipe generation, interactive meal planning and guided cooking, in real-time, the method comprising the steps of:
establishing (i) operative communication between central network device of first local communication network and a device system of a second network, and (ii) operative communication between the device system of the second network and one or more auxiliary devices of the first local communication network, via the central network device of the first local communication network;
receiving, at the device system via the second network, device data from the central network device, wherein the device data comprises one or more parameters sensed by the one or more auxiliary devices of the first local communication network, wherein the device data is transmitted to the central network device by the one or more auxiliary devices of the first local communication network, wherein first device data is transmitted from a first auxiliary device via a first communication channel having a first frequency range, wherein the first auxiliary device is structured to automatically switch to a second communication channel having a second frequency range higher than the first frequency range in response to a trigger condition, wherein receiving the device data further comprises;
in response to the trigger condition comprising determining that the first device data comprises a payload size greater than a predetermined threshold, re-transmitting the device data via the second communication channel having the second frequency range:
in response to receiving the device data, constructing, by the device system, a dynamic object inventory based on at least the device data, wherein the dynamic object inventory is associated with one or more objects associated with a user;
generating, by the device system, a first recipe for the user based on the dynamic object inventory such that the dynamic object inventory of the user comprises at least one ingredient item associated with the first recipe; and
transmitting, by the device system via the second network, the generated first recipe to a user device associated with the user for presentation on an integrated object management user application interface of the user device.

13. The method of claim 12, wherein constructing the dynamic object inventory by the device system further comprises:
constructing the dynamic object inventory at a first time, wherein the dynamic object inventory is associated with one or more objects associated with the user at the first time;
receiving at a second time after the first time, via the second network, updated device data from the central network device, wherein the updated device data comprises one or more updated parameters sensed by the one or more auxiliary devices;
in response to receiving the updated device data at the second time, in real time, modifying the dynamic object inventory based on at least the updated device data such that the dynamic object inventory is associated with one or more objects associated with the user at the second time.

14. The method of claim 13, wherein modifying the dynamic object inventory comprises identifying at least one of (i) addition of a new object to the one or more objects associated with the user, (ii) removal of an object from the one or more objects associated with the user, (iii) use of an object of the one or more objects by the user, (iv) change in quantity of an object of the one or more objects, and/or (v) change in location of an object of the one or more objects.

15. The method of claim 12, wherein the one or more auxiliary devices are selected from a group comprising:
one or more smart camera devices structured for capturing image data associated with the one or more objects;
one or more smart fob devices structured for capturing ambient temperature data, ambient humidity data, ambient light data and/or ambient volatile organic content data associated with the one or more objects;
one or more connected weight measurement devices structured for capturing weight data associated with the one or more objects;
one or more smart container devices structured for capturing quantity data associated with the one or more objects;
one or more smart coin devices structured for tracking expiration data associated with the one or more objects;
one or more smart wand devices structured for reading image item data associated with the one or more objects, wherein image item data comprises spectroscopy data and/or machine-readable optical label data; and
one or more smart countertop devices structured for capturing image data, weight data and quantity data associated with the one or more objects.

16. A method for integrated device connectivity and agile device control for dynamic object tracking and management, whereby the method provides for dynamic food item identification, expiration tracking, dynamic inventory construction, recipe generation, interactive meal planning and guided cooking, in real-time, the method comprising the steps of:

establishing operative communication between a device system of a second network and one or more auxiliary devices of a first local communication network, via a central network device of the first local communication network;

capturing, via a sensor device of a first auxiliary device of the one or more auxiliary devices, device data associated with one or more objects associated with a user;

transmitting, via the central network device and the second network, the device data to the device system from the first auxiliary device of the one or more auxiliary devices, wherein first device data is transmitted from the first auxiliary device via a first communication channel having a first frequency range, wherein the first auxiliary device is structured to automatically switch to a second communication channel having a second frequency range lower than the first frequency range in response to a trigger condition, wherein transmitting the device data further comprises:

in response to the trigger condition comprising (i) lack of receipt of a response signal transmitted by the central network device at the first auxiliary device, and/or (ii) the first auxiliary device being in an enclosed location, re-transmitting the first device data from the first auxiliary device via the second communication channel having the second frequency range; and receiving, by the first auxiliary device, the response signal from the central network device; and receiving, at a user device associated with the user, a first recipe for the user for presentation on an integrated object management user application interface of the user device based on at least the device data associated with one or more objects.

17. The method of claim 16, wherein the method further comprises:

selecting a first object of the one or more object associated with the first recipe; and completing the first recipe using the first object of the one or more objects.

18. The method of claim 17, wherein completing the first recipe further comprises:

displaying a presentation of a first guided cooking step of the one or more guided cooking steps on the integrated object management user application interface of the user device;

completing the first guided cooking step of the one or more guided cooking steps; and in response to completing the first guided cooking step, displaying a presentation of a second guided cooking step of the one or more guided cooking steps on the integrated object management user application interface of the user device.

19. The method of claim 16, wherein the method further comprises adding a new object to a predetermined capture region associated with the first auxiliary device of the one or more auxiliary devices, (ii) removing at least one object of the one or more objects from the predetermined capture region associated with the first auxiliary device of the one or more auxiliary devices, (iii) changing a quantity of at least one object of the one or more objects in the predetermined capture region, and/or (iv) changing a location of at least one object of the one or more objects at the predetermined capture region.

* * * * *